(12) United States Patent
Song et al.

(10) Patent No.: US 12,091,845 B2
(45) Date of Patent: Sep. 17, 2024

(54) FAUCET CONTROL DEVICE AND METHOD, AND FAUCET

(71) Applicant: THE SL CO., LTD., Seoul (KR)

(72) Inventors: Kyeong Keun Song, Seongnam-si Gyeonggi-do (KR); Jong Geun Lim, Seoul (KR)

(73) Assignee: THE SL CO., LTD., Seoul (KR)

( * ) Notice: Subject to any disclaimer, the term of this patent is extended or adjusted under 35 U.S.C. 154(b) by 175 days.

(21) Appl. No.: 17/785,806

(22) PCT Filed: Dec. 15, 2020

(86) PCT No.: PCT/KR2020/018364
§ 371 (c)(1),
(2) Date: Jun. 15, 2022

(87) PCT Pub. No.: WO2021/125750
PCT Pub. Date: Jun. 24, 2021

(65) Prior Publication Data
US 2023/0074686 A1 Mar. 9, 2023

(30) Foreign Application Priority Data

Dec. 16, 2019 (KR) .......................... 10-2019-0167432
Jul. 24, 2020 (KR) .......................... 10-2020-0092533
(Continued)

(51) Int. Cl.
*E03C 1/044* (2006.01)
*E03C 1/04* (2006.01)
*E03C 1/05* (2006.01)

(52) U.S. Cl.
CPC .............. *E03C 1/044* (2013.01); *E03C 1/041* (2013.01); *E03C 1/057* (2013.01)

(58) Field of Classification Search
CPC ........... E03C 1/044; E03C 1/041; E03C 1/057
See application file for complete search history.

(56) References Cited

U.S. PATENT DOCUMENTS 10,619,887 B2 * 4/2020 Sugatani .................. F28G 9/00
2003/0213850 A1 * 11/2003 Mayer ............... G05D 23/1393
236/12.12
(Continued)

FOREIGN PATENT DOCUMENTS

JP   2009079360 A   4/2009
JP   2014194317 A   10/2014
(Continued)

*Primary Examiner* — Janie M Loeppke
(74) *Attorney, Agent, or Firm* — WILLIAM PARK & ASSOCIATES LTD.

(57) ABSTRACT

The faucet control device and method, and faucet are disclosed The faucet control device has a first and a second flow sensors measuring quantity of hot and cold water respectively, a first and a second temperature sensors measuring temperature of hot and cold water respectively, a heating tank heating hot water supplied from a hot water pile with a heater installed therein and storing heated water, a third temperature sensor measuring temperature of the heated water, a hot water direct supplying pipe outputting the hot water supplied from a hot water pipe, a electronic valve outputting mixed water by selectively mixing the heated water, the hot water and the cold water, and a controller controlling operation of the heater based on the temperature of the heated water and controlling opening amount of the electronic valve to make quantity and temperature of discharged water equal to target quantity and temperature.

10 Claims, 30 Drawing Sheets

(30) Foreign Application Priority Data

Sep. 23, 2020 (KR) ........................ 10-2020-0122704
Nov. 5, 2020 (KR) ........................ 10-2020-0147067

(56) References Cited

U.S. PATENT DOCUMENTS

2006/0054217 A1    3/2006  Vogel
2006/0138246 A1    6/2006  Stowe et al.

FOREIGN PATENT DOCUMENTS

JP          2015190204      11/2015
KR           101617659 B1    5/2016

\* cited by examiner

FIG. 2
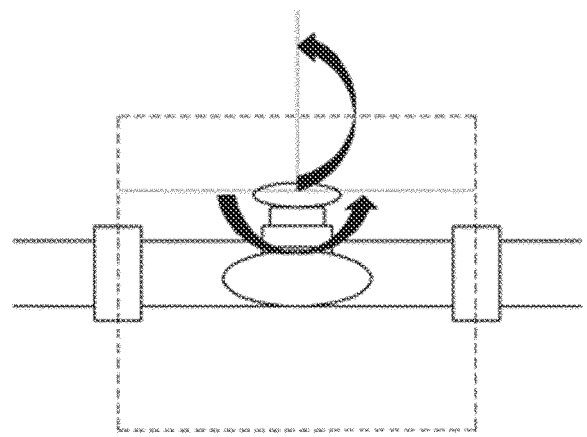
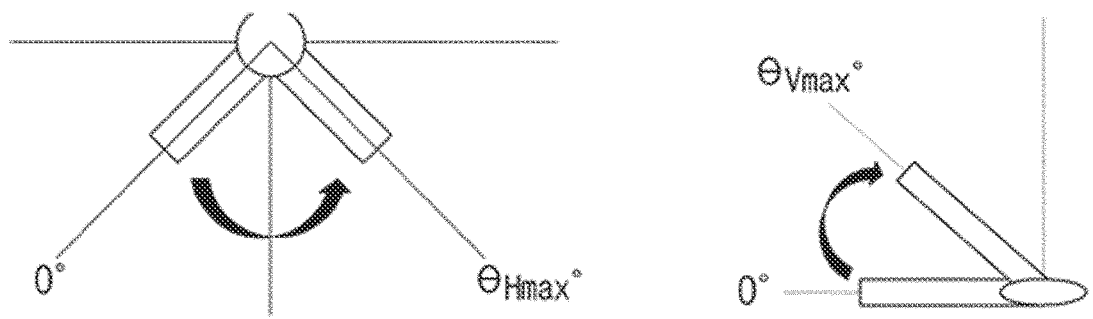

FIG. 7
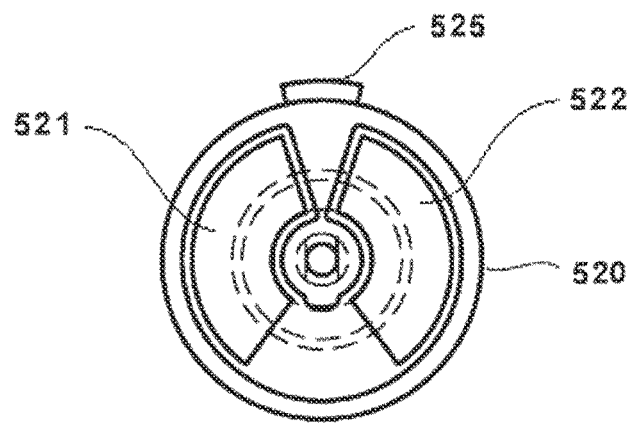
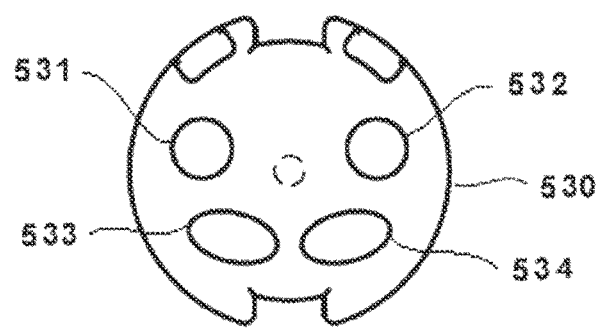
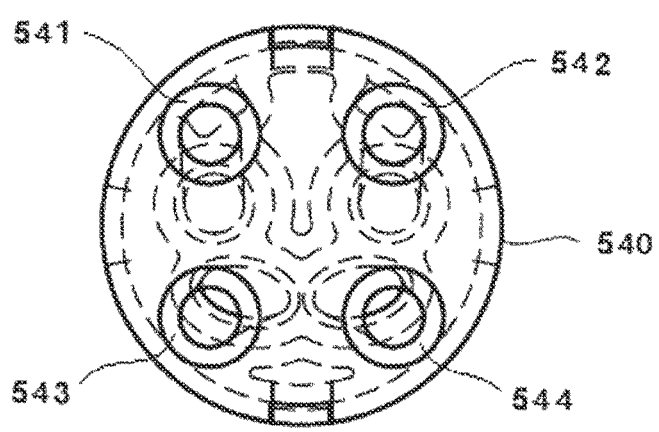

FIG. 20
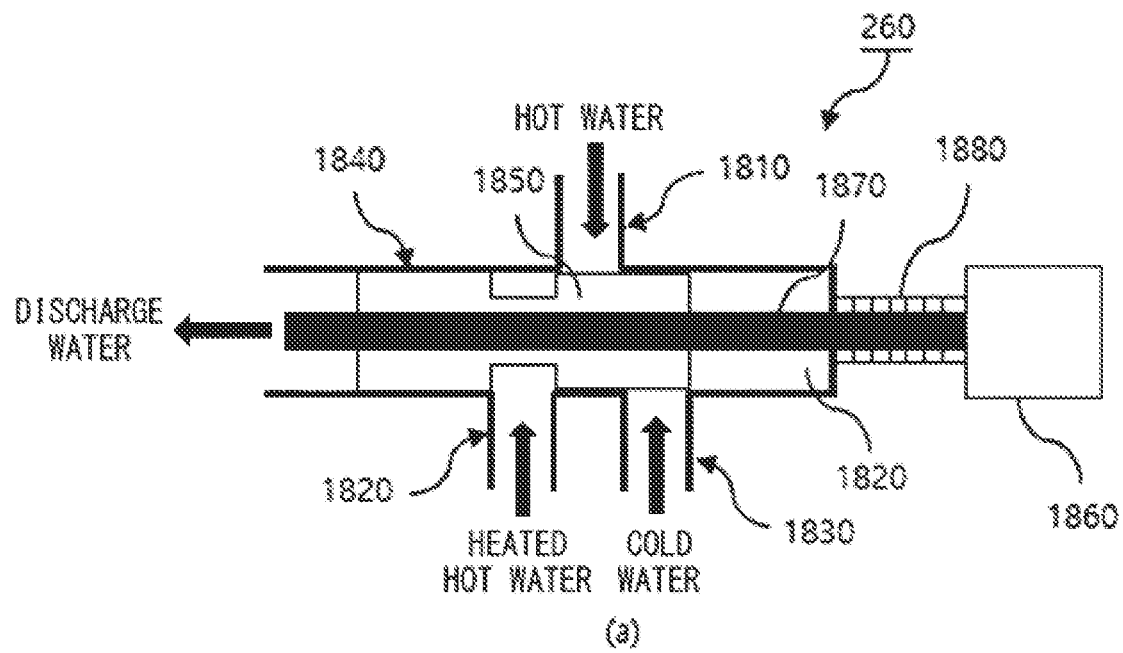
(a)
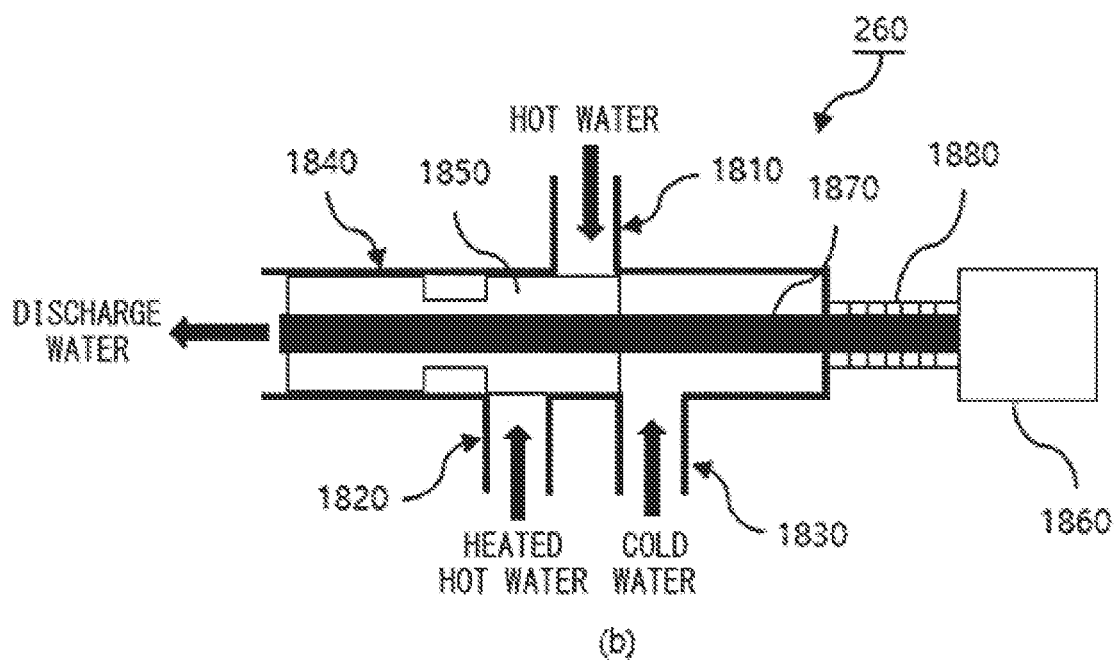
(b)

FIG. 21
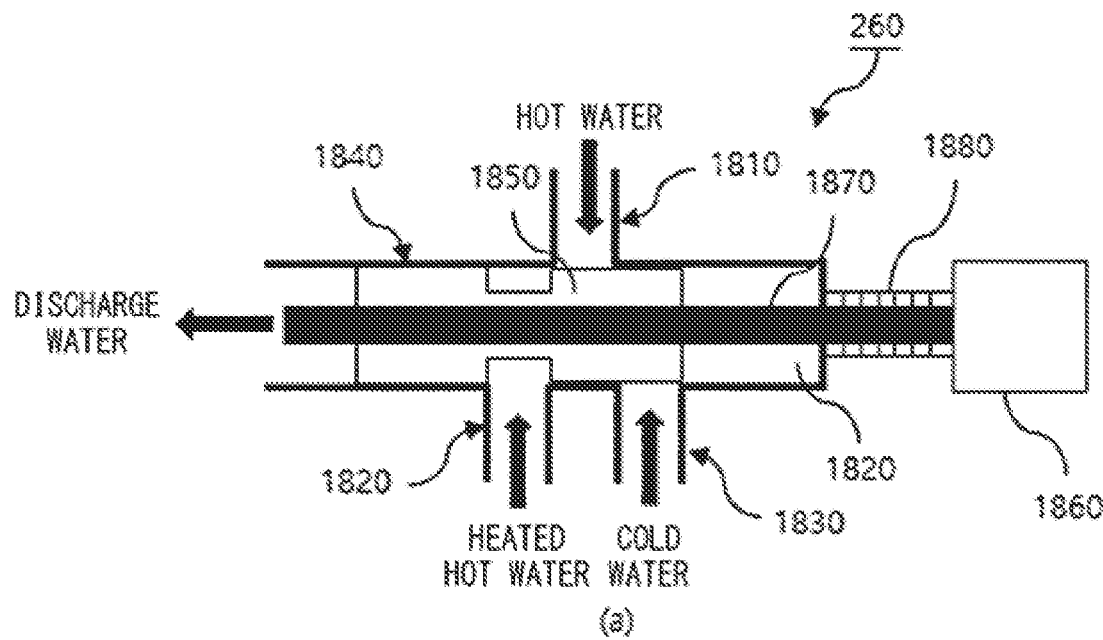
(a)
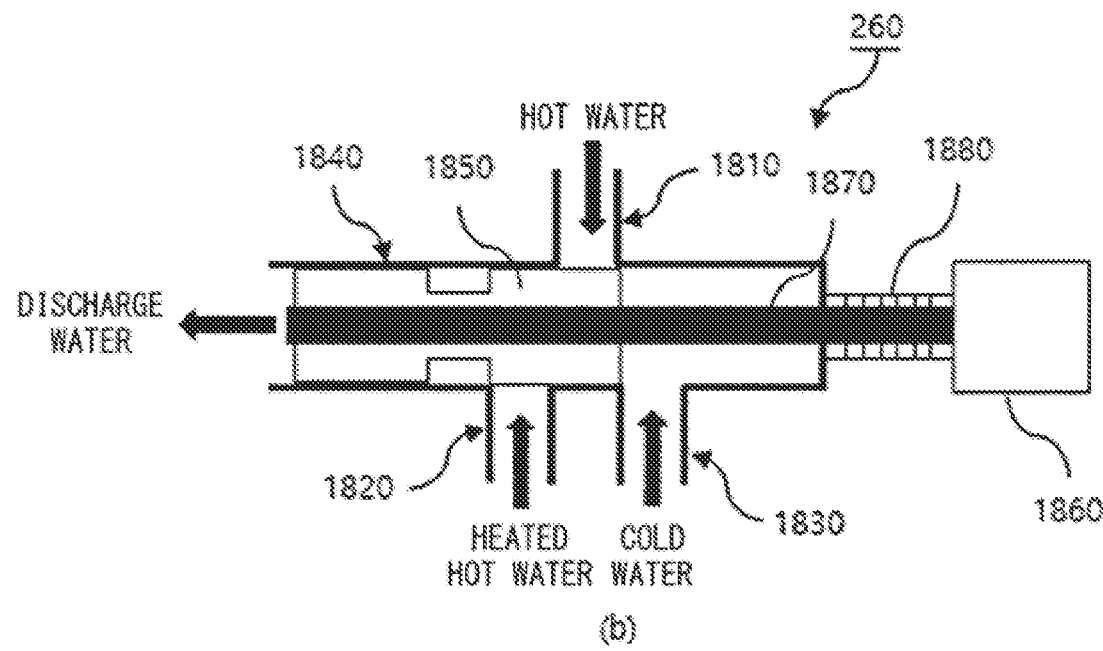
(b)

FAUCET CONTROL DEVICE AND METHOD, AND FAUCET

TECHNICAL FIELD

The present invention relates to a faucet control device and method, and a faucet that can automatically adjust temperature.

BACKGROUND ART

Faucets that are installed in a sink, a washstand, etc. are composed of a body configured to be supplied with cold water and hot water through cold water and hot water pipelines, and a lever installed on the body to connect/disconnect water and select cold water and hot water. When a user holds and turns or moves up/down a lever, it is possible to stop or supply water and control the temperature of water that is supplied. When the amount of water is adjusted by opening/closing a lever and hot water and cold water are both supplied through one faucet, the temperature of water is adjusted by adjusting the rotation angle of the lever.

In an individual supply system, hot water that is supplied through a faucet is influenced by the state of a boiler. For example, when hot water is secured by sufficiently operating a boiler, hot water is supplied simultaneously with operating a faucet; however, when a boiler is operated for a short time, cold water is supplied at the early stage and is reached a predetermined temperature while the amount of hot water gradually increases. Meanwhile, a central supply system is influenced by the distance from a hot water supplier to a hot water consumer, external temperature, water pressure, whether hot water is used by households, etc.

Further, when the internal temperature of a hot water hydrant is not uniform, high-temperature water is suddenly supplied through a faucet or the temperature of water changes while hot water is supplied in some cases. Such a rapid change of the temperature of hot water may cause a burn on a skin due to high-temperature hot water, and a rapid drop of the temperature of water may cause a user's inconvenience. Further, there is a problem that the temperature of water changes even when the supply pressure of hot water changes.

In relation to this, a faucet that can automatically adjust temperature and an apparatus and method of controlling the faucet have been disclosed in Korean Patent No. 10-1986942. However, there is limitation in that the faucet disclosed in the patent can perform target operation in an environment in which power is sufficiently supplied. That is, when the maximum power in home is about 5 Kw and the maximum power of a socket for home use is about 3 Kw, as in Korean, it is possible to increase temperature by about 12° C. when heating water of 50 ㎖ for 1 second with a ㎖ heater. When hot water temperature in a hot water pipe decreases to 20° C. in this situation, it is possible to increase the hot water temperature up to 32° C. for 1 second even if controlling a valve such that hot water is discharged by 50 ㎖ per second from the hot water pipe. The temperature is considerably lower than desired temperature of a user, so it is difficult to achieve the target expected from the faucet.

DISCLOSURE

Technical Problem

An objective of the present invention is to provide a faucet control device and method that can automatically adjust temperature.

Further, an objective of the present invention is to provide a faucet control device and method that can automatically adjust temperature to keep a discharge temperature constant even if the supply pressure of hot water or cold water changes.

Further, an objective of the present invention is to provide a faucet that can automatically adjust temperature to keep a discharge temperature constant even if the supply pressure of hot water or cold water changes.

Technical Solution

According to an aspect of the present invention, a faucet control device that can automatically control temperature is provided.

According to an aspect of the present invention, there is provided a faucet control device that includes: an input unit receiving a desired water amount and a desired temperature of discharge water set from a user; a first water amount sensor and a second water amount sensor installed in a hot water pipe and cold water pipe and measuring water amounts of hot water and cold water, respectively; a first temperature sensor and a second temperature sensor installed in a hot water pipe and cold water pipe and measuring temperatures of hot water and cold water, respectively; a heating water tank including a heater therein and primarily heating and storing hot water that is supplied from the hot water pipe; a third temperature sensor measuring temperature of water in the heating water tank; a heating module including a heater therein and secondarily heating and providing hot water that is supplied from the hot water pipe; a distributor distributing hot water, which is supplied from the hot water pipe, to the heating water tank and the heating module in accordance with a preset ratio; a fourth temperature sensor measuring the temperature of mixed hot water in which primarily heated hot water discharged from the heating water tank and secondarily heated hot water discharged from the heating module are mixed; an automatic actuating valve module installed at outlets of the hot water and the cold water; and a controller controlling whether to drive a heater disposed in the heating water tank on the basis of temperature of water in the water tank, controlling whether to drive a heater provided in the heating water tank on the basis of temperature of water in the heating water tank and controlling whether to drive the heating module and the degree of opening of the automatic actuating valve module on the basis of water amounts of the hot water and cold water and values measured by the first to fourth temperature sensors such that a water amount and a temperature of the discharge water become a target water amount and a target temperature that are set in correspondence to a desired water amount and a desired temperature of discharge water set by a user.

Preferably, the input unit is an angle sensor that measures at least one of a horizontal rotation angle and a vertical rotation angle when a faucet knob finishes being operated.

Preferably, the controller sets a maximum horizontal rotation angle of the faucet knob with respect to a horizontal rotation reference point, sets a lowermost point of the faucet knob with respect to a vertical rotation reference point, and calculates the horizontal rotation angle and the vertical rotation angle of the faucet knob using the horizontal rotation reference point and the vertical rotation reference point.

Preferably, the controller calculates a target water amount and a target temperature of discharge water corresponding to a stop position of the faucet knob, and controls the degree of opening of the automatic actuating valve module on the basis of water amounts of the hot water and the cold water and temperatures of the hot water and cold water, which are calculated using water pressures of the hot water and the cold water, such that a water amount and a temperature of the discharge water become the target water amount and the target temperature.

Preferably, the input unit is a wireless control device that has a wireless communication function and transmits a desired water amount and a desired temperature of discharge water set by a user to the controller.

Preferably, the input device is an input panel that receives and displays a desired water amount and a desired temperature of discharge water from a user on an output device thereof, and provides the desired water amount and a desired temperature of discharge water to the controller.

Preferably, the distributor distributes hot water that is supplied from the hot water pipe to the heating water tank and the heating module at a water amount ratio of 1:1 to 1:4.

Preferably, the automatic actuating valve module includes a first electronic valve and a second electronic valve, which are installed at outlets of the hot water and the cold water, respectively, and the controller controls the degrees of opening of the first electronic valve and the second electronic valve using the water amounts of the heated hot water and the cold water and values measured by the first to fourth temperature sensors.

Preferably, the automatic actuating valve module includes a third electronic valve that mixes and discharges hot water and cold water that are supplied from the outlet of the hot water and the cold water, and the controller controls the electronic valve on the basis of water amounts of the hot water and the cold water and values measured by the first to fourth temperature sensors such that a water amount and a temperature of the discharge water become the target water amount and the target temperature.

Preferably, when a hot water temperature measured by the first temperature sensor is higher than a target temperature of the discharge water, the controller calculates an increase amount of cold water using a target water amount of the discharge water, a temperature of the hot water, a temperature of the cold water, a water amount of the hot water, and a water amount of the cold water, sets a reduction amount of hot water by the increase amount of the cold water, and controls the degree of opening of the automatic actuating valve module by reflecting the increase amount of the cold water and the reduction amount of the hot water.

Preferably, when a hot water temperature measured by the first temperature sensor is less than a target temperature of the discharge water, the controller drives the heating module and controls the automatic actuating valve module such that cold water is not discharged until a hot water temperature measured by the fourth temperature sensor reaches a target temperature of discharge water corresponding to a desired temperature of discharge water set by a user; controls the automatic actuating valve module such that hot water is completely discharged when a water amount of the hot water is less than a target water amount of the discharge water; controls the automatic actuating valve module such that a water amount of the discharge water is the same as a target water amount of the discharge water when a water amount of the hot water is larger than a target water amount of the discharge water; stops driving the heating module when a hot water temperature measured by the first temperature sensor reaches a target temperature of the discharge water; and controls the automatic actuating valve module on the basis of water amounts of the hot water and the cold water and temperatures of the hot water and the cold water measured by the first temperature sensor and the second temperature sensor such that a water amount and a temperature of the discharge water become the target water amount and the target temperature.

Preferably, when a water amount of the hot water and a water amount of the cold water are both increased, the controller controls the degree of opening of the automatic actuating valve module such that a water amount of the hot water and a water amount of the cold water are decreased by a water amount of the hot water and a water amount of the cold water increased to maintain a water amount of the discharge water; when a water amount of the hot water is decreased, the controller controls the automatic actuating valve module such that a water amount of the cold water is decreased by the reduction water amount of hot water to maintain a temperature of the discharge water; and when a water amount of the cold water is decreased, the controller controls the automatic actuating valve module such that a water amount of the hot water is decreased by the reduction amount of the cold water to maintain a temperature of the discharge water.

Preferably, when a water amount of the hot water is increased, the controller controls the automatic actuating valve module such that a water amount of the cold water is increased by the reduction amount of the hot water to maintain a water amount of the discharge water, and drives the heating module in correspondence to a temperature of the discharge water to maintain a temperature of the discharge water.

Preferably, when water pressure of the hot water or the cold water is changed, the controller controls the degree of opening of the automatic actuating valve module by calculating a temperature variation of the discharge water according to the pressure variation.

Preferably, the heating module is disposed between the distributor and a point at which primarily heated hot water is discharged from the heating water tank.

Preferably, the heating module is composed of a plurality of heaters, and the heaters are sequentially or selectively driven from the heater adjacent to the distributor.

According to another aspect of the present disclosure, there is provided a faucet control device that includes: a heating water tank that controls a heater therein and primarily heats and stores hot water supplied from a hot water pipe, a mixer that supplies primarily heated hot water that is discharged from the heating water tank and hot water that is supplied from the hot water pipe after mixing them at a predetermine mixing ratio, a heating module that secondarily heats and provides mixed hot water provided and discharged from the mixer, and an automatic actuating valve module that is installed at outlets of hot water and cold water, the faucet control device including a processor and a memory connected to the processor, in which the memory stores program commands that can be executed by the process controlling the automatic actuating valve module on the basis of water amounts of hot water and cold water and values measured by the first to fifth temperature sensors such that a water amount and a temperature of discharge water become a target water amount and a target temperature set in correspondence to a desired water amount and a desired temperature set by a user.

According to another aspect of the present disclosure, there is provided a faucet control device that includes: an input unit receiving a desired water amount and a desired temperature of discharge water set from a user; a first water amount sensor and a second water amount sensor installed in a hot water pipe and cold water pipe and measuring water amounts of hot water and cold water, respectively; a first temperature sensor and a second temperature sensor installed in a hot water pipe and cold water pipe and measuring temperatures of hot water and cold water, respectively; a heating water tank including a heater therein and primarily heating and storing hot water that is supplied from the hot water pipe; a third temperature sensor measuring temperature of water in the heating water tank; a mixer a mixer supplying primarily heated hot water that is discharged from the heating water tank and hot water that is supplied from the hot water pipe after mixing them at a predetermine mixing ratio; a fourth sensor measuring temperature of heated hot water that is discharged from the mixer; a heating module secondarily heating and providing mixed hot water provided and discharged from the mixer; a fifth temperature sensor measuring temperature of secondarily heated hot water that is discharged from the heating module; an automatic actuating valve module installed at outlets of the hot water and the cold water; and a controller controlling whether to drive a heater disposed in the heating water tank on the basis of temperature of water in the water tank, controlling whether to drive a heater provided in the heating water tank on the basis of temperature of water in the heating water tank and controlling whether to drive the heating module and the degree of opening of the automatic actuating valve on the basis of water amounts of the hot water and cold water and values measured by the first to fifth temperature sensors such that a water amount and a temperature of the discharge water become a target water amount and a target temperature that are set in correspondence to a desired water amount and a desired temperature of discharge water set by a user, in which the controller adaptively controls the degree of opening of the automatic actuating valve module by monitoring water amounts of hot water and cold water and temperatures of hot water and cold water; (a) when temperature of mixed hot water measured by the fourth temperature sensor is less than a target temperature of the discharge water, (a1) the controller drives the heating module and controls the automatic actuating valve module such that cold water is not discharged until temperature of hot water measured by the fifth temperature sensor reaches a target temperature of the discharge water, controls the automatic actuating valve module such that hot water is completely discharged when a water amount of the hot water is less than a target water of the discharge water, and controls the automatic actuating valve module such that a water amount of the discharge water becomes the same as a target amount of the discharge water when a water amount of the hot water is larger than a target amount of the discharge water, and (a2) when temperature of hot water measured by the fourth temperature sensor reaches a target temperature of the discharge water, the controller stops driving the heating module and controls the automatic actuating valve module on the basis of water amounts of the hot water and the cold water and temperatures of the heated hot water and the cold water measured by the fourth temperature sensor and the second temperature sensor such that a water amount and a temperature of the discharge water become the target water amount and the target temperature; and (b) when a hot water temperature measured by the fourth temperature sensor is a target temperature of the discharge water or more, (b1) the controller controls the automatic actuating valve module on the basis of water amounts of the hot water and the cold water and temperatures of the heated hot water and the cold water such that a water amount and a temperature of the discharge water become the target water amount and the target temperature, and when at least one of a water amount of the hot water and a water amount of the cold water is changed with a water amount and a temperature of the discharge water being the same as the target water amount and the target temperature, (b21) when a water amount of hot water and a water amount of cold water are both increased, the controller decreases a water amount of hot water and a water amount of cold water such that a water amount and a temperature of the discharge water become a target water amount and a target temperature of the discharge water, (b22) when a water amount of hot water is decreased, the controller controls the automatic actuating valve module such that a temperature of the discharge water becomes a target temperature of the discharge water by decreasing a water amount of cold water by the reduction water amount of hot water, or controls the automatic actuating valve module to increase a water amount of cold water by the reduction amount of hot water and drives the heating module to increase a temperature of the hot water, and (b23) when a water amount of cold water is decreased, the controller controls the automatic actuating valve module to decrease a water amount of hot water by the reduction water amount of cold water.

According to another aspect of the present disclosure, a faucet control method that can automatically control temperature is provided.

According to an aspect of the present disclosure, faucet control method includes: (a) receiving desired temperature and water amount of discharge water from a user; (b) measuring water amounts of hot water and cold water in a hot water pipe and a cold water pipe; (c) measuring temperatures of hot water and cold water in the hot water pipe and the cold water pipe; (d) calculating a target water amount and a target temperature of discharge water corresponding to desired temperature and water amount of discharge water from the user; (e) providing mixed hot water by mixing hot water in the hot water pipe with hot water in a heating water tank storing hot water heated at a preset temperature; and (f) controlling an automatic actuating valve module installed at outlets of the hot water and the cold water using water amounts and temperatures of the mixed hot water and the cold water such that a temperature and a water amount of the discharge water become the same as a target water amount and a target temperature of the discharge water, wherein (f) when a temperature of the mixed hot water is higher than a target water of the discharge water, an increase amount of hot water is calculated using a target water amount of the discharge water, a temperature of the mixed hot water, a temperature of the cold water, a water amount of the mixed hot water, and a water amount of the cold water, a reduction amount of the mixed hot water is set by the increase amount of the cold water, and the automatic actuating valve module is controlled by reflecting the increase amount of the cold water and the reduction amount of the mixed hot water, (f2) when a temperature of the mixed hot water is less than a target temperature of the discharge water, the mixed hot water is heated by a heating module disposed behind the heating water tank until a target temperature of the discharge water is reached and the automatic actuating valve module is controlled such that cold water is not discharged, in which when a water amount of the heated hot water is less than a target water amount of the discharge water, the automatic actuating valve module is controlled such that hot water is completely discharged, and when a water amount of the hot water is larger than a target amount of the discharge water, the automatic actuating valve module is controlled such that a water amount of the discharge water becomes the same as a target water amount of the discharge water; and (g1) when a water amount of the mixed hot water and a water amount of the cold water are both increased, the degree of opening of the automatic actuating valve module is controlled such that a water amount of the mixed hot water and a water amount of the cold water are decreased by the increased water amount of the mixed hot water and a water amount of cold water to maintain a water amount of the discharge water, (g2) when a water amount of the mixed hot water is decreased, the automatic actuating valve module is controlled such that a water amount of the cold water is decreased by the reduced water amount of the mixed hot water to maintain a temperature of the discharge water, and (g3) when a water amount of the cold water is decreased, the automatic actuating valve module is controlled such that a water amount of the mixed hot water is decreased by the reduced water amount of the cold water to maintain a temperature of the discharge water.

Preferably, when a water amount of the mixed hot water is decreased, the automatic actuating valve module is controlled such that a water amount of cold water is increased by the reduced water amount of the hot water to maintain a water amount of the discharge water and the mixed hot water is heated by the heating module such that a temperature of the discharge water becomes a target temperature.

Preferably, when a water amount of the mixed hot water or the cold water is changed, the degree of opening of the automatic actuating valve module is controlled by calculating a temperature variation of the discharge water according to the water amount variation.

Another preferred embodiment of a faucet control device according to the present invention includes: an input unit receiving a desired water amount and a desired temperature of discharge water set from a user; a first water amount sensor and a second water amount sensor measuring water amounts of hot water and cold water that are supplied from a hot water pipe and cold water pipe, respectively; a first temperature sensor and a second temperature sensor measuring temperatures of hot water and cold water that are supplied from a hot water pipe and cold water pipe; a heating water tank including a heater therein, heating and storing hot water that is supplied from the hot water pipe, and supplying heated hot water to a faucet when the faucet is used by a user; a third temperature sensor measuring temperature of water in the heating water tank; a direct hot water pipe supplying hot water, which is supplied from the hot water pipe, to the faucet; a distributor distributing hot water, which is supplied from the hot water pipe, to the heating water tank and the direct hot water pipe in accordance with a preset ratio; an electronic valve supplying discharge water at a desired water amount of a desired temperature input from a user to the faucet through a discharge pipe by mixing heated hot water that is supplied from the heating water tank, hot water that is supplied from the direct hot water pipe, and cold water that is supplied from the cold water pipe; a fourth temperature sensor measuring temperature of discharge water that is supplied through a discharge pipe of the electronic valve; and a controller controlling whether to drive a heater disposed in the heating water tank on the basis of temperature of water in the water tank, and controlling the degree of opening of the electronic valve such that a water amount and a temperature of the discharge water become a target water amount and a target temperature that are set in correspondence to a desired water amount and a desired temperature of discharge water set by a user.

Preferably, the electronic valve includes: a hosing having a cylindrical accommodation space therein; a first inlet pipe receiving and providing heated hot water, which is supplied from the heating water tank, to the accommodation space; a second inlet pipe receiving and providing hot water, which is supplied from the direct hot water pipe, to the accommodation space; a third inlet pipe receiving and providing cold water, which is supplied from the cold water pipe, to the accommodation space; a discharge pipe for outputting the discharge water to the faucet; a switch inserted in the cylindrical accommodation space to be movable in a longitudinal direction of the housing and determining the degree of opening of one or two inlet pipes of the first to third inlet pipes in accordance with a position in the accommodation space; a motor being controlled to rotate by the controller; and a rotary shaft mechanically connecting the motor and the switch and converting a rotation motion of the motor into a straight motion of the switch.

Preferably, the faucet control device further includes a second electronic valve installed between the faucet and the electronic valve and providing discharge water input from the electronic valve to the faucet, and the controller controls the second electronic valve such that a water amount of discharge water input through a discharge pipe of the electronic valve corresponds to a target water amount of the discharge water.

Preferably, in the accommodation space, the position of the switch is determined within a first movement range in which an open ratio of the first inlet pipe and the second inlet pipe is determined from 1:0 to 0:1, a second movement range in which an open ratio of the second inlet pipe and the third inlet pipe is determined from 1:0 to 0:1, and a third movement range in which an open ratio of first inlet pipe and the third inlet pipe is determined from 1:0 to 0:1, in accordance with a rotation direction and a rotation amount of the motor.

Preferably, the controller determines the position of the switch by controlling a rotation direction and a rotation amount of the motor on the basis of measurement values of the first temperature sensor to the third temperature sensor, in which, i) the position of the switch is determined within the first movement range when a difference between the measurement value of the first temperature sensor and the measurement value of the third temperature sensor is a preset first reference error or less and the target temperature is the measurement value of the first temperature sensor or more; ii) the position of the switch is determined within the second movement range when a difference between the measurement value of the first temperature sensor and the measurement value of the third temperature sensor is a preset first reference error or less and the target temperature is lower than the measurement value of the first temperature sensor; and iii) when a difference between the measurement value of the first temperature sensor and the measurement value of the third temperature sensor is larger the first reference error and the measurement value of the third temperature sensor is higher than the measurement value of the first temperature sensor, the position of the switch is determined within the first movement range when the target temperature is the measurement value of the first temperature sensor or more, the position of the switch is determined within a second movement range when the target temperature is lower than the measurement value of the first temperature sensor, and the position of the switch is determined within the third movement range from a time point at which the target temperature becomes higher than the measurement value of the first temperature sensor; and iv) the position of the switch is determined within the third movement range when a difference between the measurement value of the first temperature sensor and the measurement value of the third temperature sensor is larger than a preset first reference error and the measurement value of the third temperature sensor is lower than the measurement value of the first temperature sensor.

Preferably, the controller: calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives the heater disposed in the heating water tank when determining that a measurement value measured by the fourth temperature sensor cannot be maintained at a target temperature of discharge water or more until the remaining hot water is completely used on the basis of a water amount of the remaining hot water.

Preferably, a heater is disposed at the direct hot water pipe, and the controller: calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives at least one of a heater disposed in the heating water tank and a heater disposed in the direct hot water pipe when determining that a measurement value measured by the fourth temperature sensor cannot be maintained at a target temperature of discharge water or more until the remaining hot water is completely used on the basis of a water amount of the remaining hot water.

Preferably, the controller changes a mixing ratio of heated hot water that is supplied through the heating water tank and hot water that is supplied through the direct hot water pipe, a mixing ratio of heated hot water that is supplied through the heating water tank and cold water that is supplied through the cold water tank, or a mixing ratio of hot water that is supplied through the direct hot water pipe and cold water that is supplied through the cold water pipe by controlling the electronic valve when a difference between a measurement value of the fourth temperature sensor and a target temperature of the discharge water is a second reference error or more such that the difference between a measurement value of the fourth temperature sensor and the target temperature of the discharge water becomes the second reference error or less.

Preferably, a blocking device for blocking heat is disposed between the distributor and the heating water tank.

Preferably, the blocking device is a one-way valve.

Preferably, a pressure sensor measuring pressure in the heating water tank is provided at the heating water tank, and the controller removes pressure in the heating water tank by connecting the first inlet pipe and the third inlet pipe by driving the electronic valve when the pressure in the heating water tank reaches a preset reference pressure.

Preferably, the controller removes pressure in the heating water tank by connecting the first inlet pipe and the third inlet pipe every time a measurement value measured by the third temperature sensor increases by a preset reference temperature.

Preferably, the controller determines the position of the switch by controlling a rotation direction and a rotation amount of the motor on the basis of measurement values of the first temperature sensor to the third temperature sensor, in which, i) the position of the switch is determined within the first movement range when a difference between the measurement value of the first temperature sensor and the measurement value of the third temperature sensor is a preset first reference error or less and the target temperature is the measurement value of the first temperature sensor or more; ii) the position of the switch is determined within the second movement range when a difference between the measurement value of the first temperature sensor and the measurement value of the third temperature sensor is a preset first reference error or less and the target temperature is lower than the measurement value of the first temperature sensor; and iii) when a difference between the measurement value of the first temperature sensor and the measurement value of the third temperature sensor is larger than the first reference error, the position of the switch is determined within the third movement range when the measurement value of the first temperature sensor is the target temperature or more, and the position of the switch is determined within the first movement range when the measurement value of the first temperature sensor is lower than the target temperature.

Preferably, the controller: calculates a heating temperature of hot water in the heating water tank that is supplied to a faucet on the basis of a water amount of remaining hot water existing in the hot water pipe connecting a hot water supply position and the faucet, a capacity of the heating water tank, a measurement value of the first temperature sensor, a measurement value of the third temperature sensor, a supply amount of the remaining hot water, and a minimum supply temperature set for discharge water; and determines whether to drive a heater provided in the heating water tank on the basis of the calculated heating temperature and the measurement value of the third temperature sensor.

Preferably, the electronic valve includes: a first inlet pipe receives mixed hot water in which heated hot water that is supplied from the heating water tank and hot water that is supplied from the direct hot water pipe are mixed at a preset volume ratio; a second inlet pipe receiving cold water that is supplied from the cold water pipe; a discharge pipe for outputting the discharge water to the faucet; a switch determines a mixing ratio of heated hot water that is input from the first inlet pipe and cold water that is input from the second inlet pipe and provides water to the discharge pipe; a motor being controlled to rotate by the controller; and an actuating module mechanically connecting the motor and the switch and determining a mixing ratio of heated hot water and cold water by the switch in correspondence to a rotation motion of the motor.

Preferably, the faucet control device further includes a second electronic valve installed between the faucet and the electronic valve and providing discharge water input from the electronic valve to the faucet, and the controller controls the second electronic valve such that a water amount of discharge water input through a discharge pipe of the electronic valve corresponds to a target water amount of the discharge water.

Preferably, the controller calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives the heater disposed in the heating water tank when determining that a measurement value measured by the fourth temperature sensor cannot be maintained at a target temperature of discharge water or more until the remaining hot water is completely used on the basis of a water amount of the remaining hot water.

Preferably, a heater is disposed at the direct hot water pipe, and the controller calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives at least one of a heater disposed in the heating water tank and a heater disposed in the direct hot water pipe when determining that a measurement value measured by the fourth temperature sensor cannot be maintained at a target temperature of discharge water or more until the remaining hot water is completely used on the basis of a water amount of the remaining hot water.

Preferably, the controller changes a mixing ratio of the heated hot water and the cold water by controlling the electronic valve when a difference between a measurement value of the fourth temperature sensor and a target temperature of the discharge water is a preset second reference error or more such that the difference between a measurement value of the fourth temperature sensor and a target temperature of the discharge water becomes the preset second reference error or less.

Preferably, a blocking device for blocking heat is disposed between the distributor and the heating water tank.

Preferably, the blocking device is a one-way valve.

Preferably, a pressure sensor measuring pressure in the heating water tank is provided at the heating water tank, and the controller removes pressure in the heating water tank by connecting the first inlet pipe and the second inlet pipe by driving the electronic valve when the pressure in the heating water tank reaches a preset reference pressure.

Preferably, the controller removes pressure in the heating water tank by connecting the first inlet pipe and the second inlet pipe every time a measurement value measured by the third temperature sensor increases by a preset reference temperature.

Preferably, the controller calculates a heating temperature of hot water in the heating water tank that is supplied to a faucet on the basis of a water amount of remaining hot water existing in the hot water pipe connecting a hot water supply position and the faucet, a capacity of the heating water tank, a measurement value of the first temperature sensor, a measurement value of the second temperature sensor, a measurement value of the third temperature sensor, a supply amount of the remaining hot water, and a minimum supply temperature set for discharge water; and determines whether to drive a heater provided in the heating water tank on the basis of the calculated heating temperature and the measurement value of the third temperature sensor.

Preferably, the electronic valve includes: a first electronic valve having a first input pipe receiving heated hot water from the heating water tank and a second input pipe receiving remaining hot water from the direct hot water pipe, and mixing and outputting the heated hot water and the remaining hot water at a volume ratio from 1:0 to 0:1 in response to a control signal of the controller; a second electronic valve adjusting a discharge amount of heated hot water input from an output pipe of the first electronic valve, and discharging the heated hot water to a faucet; and a third electronic valve adjusting a discharge amount of cold water input from the cold water pipe, and outputting the cold water to a faucet.

Preferably, the controller controls an open ratio of the first electronic valve such that temperature of heated hot water that is output from the electronic valve becomes a target temperature of discharge water until temperature of hot water, which is supplied from the hot water pipe, measured by the first temperature sensor becomes a maximum supply temperature, controls the third electronic valve to close such that cold water is not discharged to the faucet, and control an open ratio of the second electronic valve such that a water amount of heated hot water that is supplied from the second electronic valve to the faucet becomes a target water amount of the discharge water; and the controller controls the open ratio of the first electronic valve such that hot water that is input from the heating water tank is completely output, and controls open ratios of the second electronic valve and the third electronic valve in correspondence to a target temperature and a target water amount of the discharge water, when temperature of hot water, which is supplied from the hot water pipe, measured by the first temperature sensor becomes a maximum supply temperature.

Preferably, the controller calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives the heater disposed in the heating water tank when determining that a measurement value measured by the fourth temperature sensor cannot be maintained at a target temperature of discharge water or more until the remaining hot water is completely used on the basis of a water amount of the remaining hot water.

Preferably, a heater is disposed at the direct hot water pipe, and the controller calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives at least one of a heater disposed in the heating water tank and a heater disposed in the direct hot water pipe when determining that a measurement value measured by the fourth temperature sensor cannot be maintained at a target temperature of discharge water or more until the remaining hot water is completely used on the basis of a water amount of the remaining hot water.

Preferably, the controller changes a mixing ratio of the heated hot water and the cold water by controlling the electronic valve when a difference between a measurement value of the fourth temperature sensor and a target temperature of the discharge water is a preset second reference error or more such that the difference between a measurement value of the fourth temperature sensor and a target temperature of the discharge water becomes the preset second reference error or less.

Preferably, a pressure sensor measuring pressure in the heating water tank is provided at the heating water tank, and the controller removes pressure in the heating water tank by connecting the first inlet pipe and the second inlet pipe by driving the electronic valve when the pressure in the heating water tank reaches a preset reference pressure.

Preferably, the controller removes pressure in the heating water tank by connecting the first inlet pipe and the second inlet pipe every time a measurement value measured by the third temperature sensor increases by a preset reference temperature.

Preferably, the controller calculates a heating temperature of hot water in the heating water tank that is supplied to a faucet on the basis of a water amount of remaining hot water existing in the hot water pipe connecting a hot water supply position and the faucet, a capacity of the heating water tank, a measurement value of the first temperature sensor, a measurement value of the second temperature sensor, a measurement value of the third temperature sensor, a supply amount of the remaining hot water, and a minimum supply temperature set for discharge water; and determines whether to drive a heater provided in the heating water tank on the basis of the calculated heating temperature and the measurement value of the third temperature sensor.

Advantageous Effects

A faucet control device and method that can automatically adjust temperature according to an embodiment of the present invention, and a faucet are provided, whereby it is possible to automatically adjust a discharged temperature to be constantly maintained even if supply pressure of hot water or cold water is changed.

DESCRIPTION OF DRAWINGS

FIG. 2 is a view illustrating a horizontal rotation angle and a vertical rotation angle of a faucet knob according to an embodiment of the present disclosure.

FIG. 7 is a view showing main parts of the electronic valve according to an embodiment of the present disclosure.

FIG. 20 is a view showing the position of a switch that is installed in an electronic valve which corresponds to a situation in which only hot water is heated or only heated hot water is supplied.

FIG. 21 is a view showing the position of a switch that is installed in an electronic valve which corresponds to a situation in which only heated hot water is supplied or only cold water is supplied.

BEST MODE

Singular forms that are used in this specification are intended to include plural forms unless the context clearly indicates otherwise. In the specification, terms "configured", "include", or the like should not be construed as necessarily including several components or several steps described herein, in which some of the components or steps may not be included or additional components or steps may be further included. Further, the terms "~part", "module", and the like mean a unit for processing at least one function or operation and may be implemented by hardware or software or by a combination of hardware and software. Hereinafter, exemplary embodiments of the present invention will be described in detail with reference to the accompanying drawings.

Figure 1:
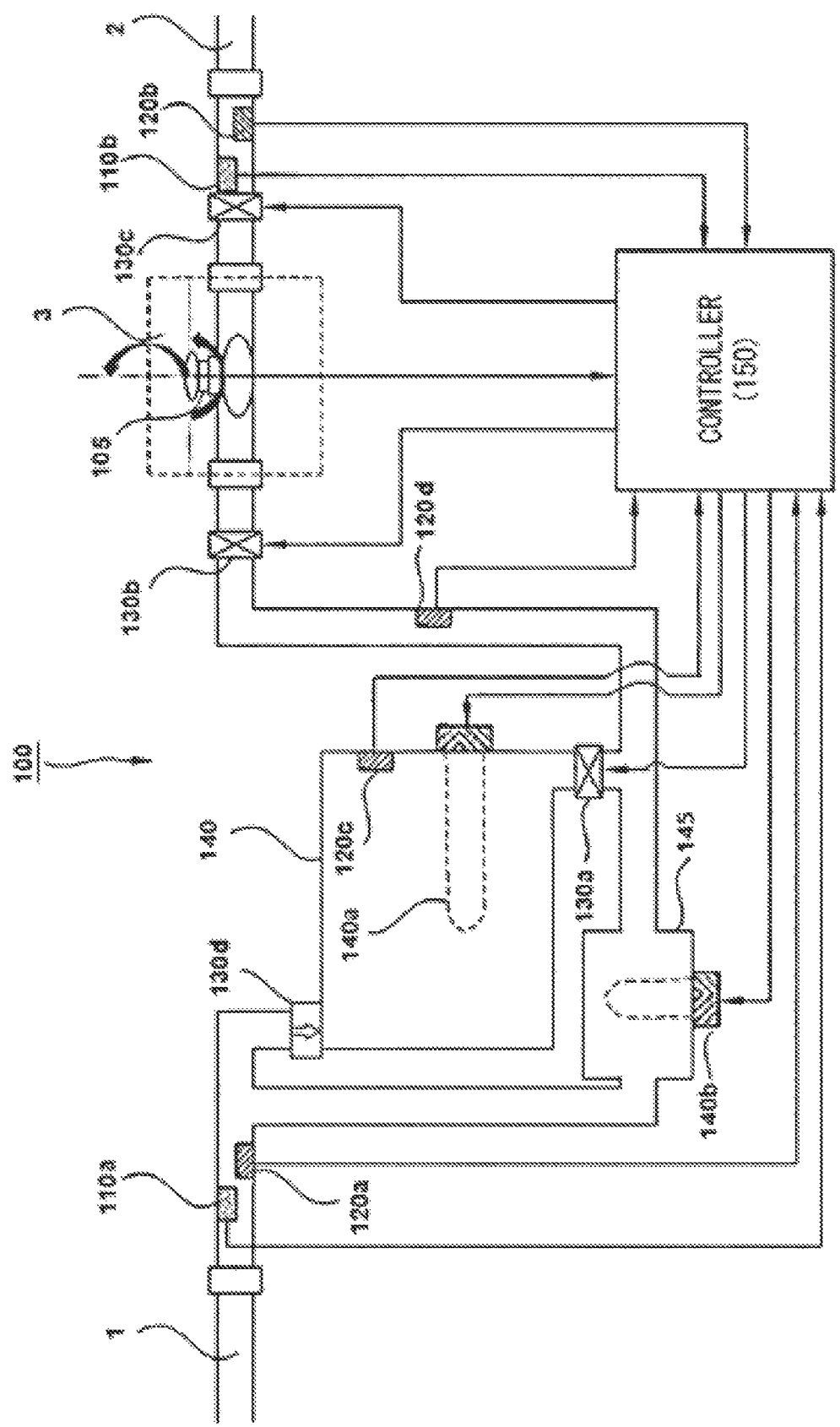
FIG. 1 is a view showing the configuration of a faucet control device according to an embodiment of the present disclosure.

FIG. 1 is a view showing the configuration of a faucet control device according to an embodiment of the present disclosure.

Referring to FIG. 1, a faucet control device 100 according to an embodiment of the present invention includes a temperature/water amount setter 105, a plurality of water amount sensors 110a and 110b, a plurality of temperature sensors 120a to 120d, a plurality of electronic valves 130a, 130b, and 130c, a direction control valve 130d, a heating water tank 140, a heating module 145, and a controller 150.

The temperature/water amount setter 105 is a component through which a user sets a desired water amount and a desired temperature of discharge water. The temperature/water amount setter 105 shown in FIG. 1 is a rotation sensor coupled to a common faucet knob 3. The rotation sensor is a component for measuring a horizontal rotation angle and a vertical rotation angle of the faucet knob 3. For example, the faucet control device 100 can detect the stop position of the faucet knob 3 on the basis of a previous stop position (the horizontal and vertical rotation amounts at the previous time point of end of operation) and a current movement amount (horizontal and vertical rotation amounts) of the faucet knob 3.

Referring to FIG. 2, for the horizontal rotation amount of the faucet knob 3, it is assumed that the angle when the faucet knob 3 is maximally rotated to the left is 0° and is the angle when the faucet knob 3 is maximally rotated to the right $\theta_{Hmax}°$. Under this assumption, when the faucet knob 3 is positioned at the center, the angle of the faucet knob 3 is $0.5\theta_{Hmax}°$. That is, when the horizontal rotation angle of the faucet knob 3 is 0°~90° and when the faucet knob 3 is positioned at the center, the angle is 45°. Further, for the vertical rotation angle of the faucet knob 3, the angle when the faucet knob 3 is positioned at the lowermost end is set as 0° and the angle when the faucet knob 3 is positioned at the highest end (upper end) is set as $\theta_{Vmax}°$. For example, the vertical rotation amount of the faucet knob 3 may be set as the range of 0°~45°.

When a stop position is calculated on the basis of a previous stop position and a current movement amount of the faucet knob 3, there is a problem that an error gradually increases over time. Accordingly, the faucet control device 100 sets an intermediate angle (0.5 $\theta_{Hmax}°$) as a horizontal reference angle of the horizontal rotation angle of the faucet knob 3 and sets 0°, at which the faucet knob 3 is positioned at the lowermost end, as a vertical reference angle of the vertical rotation angle, and then initializes the movement amount of the faucet knob when the faucet knob 3 is positioned at the horizontal reference angle and the vertical reference angle. Further, it is possible to minimize an error by calculating the current rotation amount of the faucet knob 3 by measuring the vertical and horizontal rotation amounts of the faucet knob 3 on the basis of the initialized movement amount of the faucet knob 3.

Further, the faucet control device 100 can determine a stop position, which is detected when a predetermined time (e.g., 1 second) passes after the faucet knob 3 is stopped, as a final position.

As described above, the faucet control device 100 calculates desired temperature and water amount of discharge water of a user by measuring the horizontal rotation angle and the vertical rotation angle of the faucet knob 3.

Meanwhile, various types of input devices may be used as the temperature/water amount setter 105. For example, when a hot water knob and a cold water knob are separated, it is possible to find out the desired temperature and water amount of discharge water of a user by measuring the rotation amounts of the hot water knob and the cold water knob. Further, it is possible to receive desired temperature and water amount from a user through a touch panel, and when the faucet control device 100 is equipped with a communication module, it is also possible to receive desired temperature and water amount of discharge water from a user through a smartphone, a wireless controller, etc.

The water amount sensors 110a and 110b measure the water amounts of hot water and cold water that flow in a hot water pipe 1 and a cold water pipe 2, respectively. In the following description, the water amount sensor 110a installed in the hot water pipe 1 is referred as a first water amount sensor and the water amount sensor 110b installed in the cold water pipe 2 is referred to as a second water amount sensor. Meanwhile, it is possible to measure the water amounts of hot water and cold water using pressure sensors instead of the water amount sensors 110a and 110b. The water pressures of the hot water pipe 1 and the cold water pipe 2 are separately measured by installing a pressure sensor in each of the hot water pipe 1 and the cold water pipe 2 instead of the water amount sensors. Hereinafter, the pressure sensor installed in the hot water pipe 1 is referred to as a first pressure sensor and the pressure sensor installed in the cold water pipe 2 is referred to as a second pressure sensor. The first pressure sensor and the second pressure sensor measure the water pressures in the hot water pipe 1 and the cold water pipe 2, respectively, and output the measured values (hereinafter referred to as measurement values) to the controller 150.

The temperature sensors 120a to 120d are installed in the hot water pipe 1, the cold water pipe 2, the heating water tank 140, and a hot water pipe finally connected to the faucet, respectively.

The first temperature sensor 120a is installed at a hot water inlet through which hot water flows inside, and measures the temperature of hot water that is supplied through the hot water pipe 1 (hereinafter referred to as 'initial hot water temperature'). Further, the second temperature sensor 120b is installed in the cold water pipe 2 and measures the temperature of cold water that is supplied through the cold water pipe 2 (hereinafter referred to as 'cold water temperature'). The initial hot water temperature and the cold water temperature measured by the first temperature sensor 120a and the second temperature sensor 120b, respectively, are output to the controller 150.

The third temperature sensor 120c measures the temperature of the water in the heating water tank 140. The heating water tank 140 has a heater 140a therein, thereby primarily heating and keeping hot water supplied from the hot water pipe 1. As described above, when the maximum power in home is limited, it may be difficult to increase the temperature of hot water using only the heating module 145. That is, when the maximum allowable power of a specific electric product is 3 kW, it is possible to increase the temperature of hot water of 50 ㎖ by about up to 12° C. per second using a 3 kW heater. In this case, if the initial hot water temperature is 20° C., the temperature of the hot water can be increased up to 32° C. when only the heating module 145 is used. Accordingly, there is a problem that when a user sets desired temperature as 40° C., discharge water at the desired temperature of the user cannot be supplied. Further, even when desired temperature of a user is 32° C., the temperature of hot water is slowly increased when the temperature of the hot water is increased by only the heating module 145, so there is a problem that standby time is required until the temperature of discharge water reaches 32° C.

These problems can be solved by employing the heating water tank 140. The water in the heating water tank 140 is heated to preset first temperature (e.g., 80° C.) by driving a heater 140a (hereinafter referred to as a 'first heater')

installed in the heating water tank 140 while the faucet is not operated (a user does not use water). If the temperature of the water in the heating water tank 140 reaches the first temperature, the controller 150 stops operation of the first heater 140*a*. In this state, when the temperature of the water in the heating water tank 140 drops to the preset second temperature (e.g., 40° C.), the controller 150 drives again the first heater 140*a*, thereby repeating the operation of heating the water in the heating water tank 140 up to the preset first temperature (e.g., 80° C.). The first temperature and the second temperature are determined on the basis of the water amount of hot water remaining in the pipeline from an initial inflow point of hot water (the point at which pipes diverge to households from a central pipeline when hot water is supplied by a district heating corporation and the hot water outflow point of a boiler installed in a household when it is individual heating) to the faucet 3, the initial hot water temperature, the capacity of the heating water tank 140, the water amounts of hot water and cold water, the capacity of the first heater 140*a*, etc. In this case, it is advantageous to set the first temperature as high as possible in order to secure desired temperature of discharge water, but it is preferable to set the first temperature to 100° C. or lower, if possible, considering the possibility that a user gets burned, heat resistance of the heating water tank 140, etc. Meanwhile, although only one heater is mounted in the heating water tank 140 in FIG. 1, a plurality of heaters may be mounted in the heating water tank 140.

The first heater 140*a* installed in the heating water tank 140 may be controlled to be driven while the faucet is not operated, and whether to drive the first heater 140*a* may be determined on the basis of the water amount of hot water remaining in the pipeline from the initial inflow point of hot water to the faucet 3, the initial hot water temperature, cold water temperature, the capacity of the heating water tank 140, desired temperature and water amount of discharge water set by a user, the water amounts of hot water and cold water, the capacity of the first heater 140*a*, the capacity of the second heater 140*b* installed in the heating module 145, etc. Further, the capacity of the first heater 140*a* may be determined fundamentally on the basis of the capacity of the heating water tank 140 and the initial hot water temperature. For example, when the capacity of the heating water tank 140 is 1 L, the capacity of the first heater 140*a* has only to be 503 W to increase temperature up to 80° C. by heating hot water of 20° C. for 10 minutes. As described above, the primarily heated hot water heated at the first temperature is kept in the heating water tank 140, and the controller 150 controls the first electronic valve 130*a* in correspondence to operation of the faucet 1 by a user such that the primarily heated hot water is supplied to the faucet 3 from the heating water tank 140.

The first electronic valve 130*a* is closed to prevent the heated hot water in the heating water tank 140 from being transmitted to the second electronic valve 130*b* when the faucet 3 is not used. Further, the first electronic valve 130*a* is controlled such that the heated hot water in the heating water tank 140 flows to the second electronic valve 130*b* when the faucet 3 is used. The distribution ratio at which hot water supplied through the hot water pipe 1 is distributed to the heating water tank 140 and the heating module 145 depends on the degree of opening of the first electronic valve 130*a*. That is, when the first electronic valve 130*a* is fully opened, the hot water supplied through the hot water pipe 1 is distributed at 1:1 to the heating water tank 140 and the heating module 145. More detailed control operation of the first electronic valve 130*a* by the controller 150 will be described below.

Meanwhile, it is possible to set the distribution ratio of hot water by appropriately determining the inner diameter of the pipeline diverging from the hot water pipe 1 to the heating water tank 140 and the inner diameter of the pipeline diverging from the hot water pipe 1 to the heating module 145. In this case, it is preferable to set the distribution ratio of the hot water, which flows inside from the hot water pipe 1, to the heating water tank 140 and the heating module 145 within the range of 1:1 to 1:4. In this case, it is preferable to install a direction control valve 130*d*, which allows hot water to flow only to the heating water tank 140 from the hot water pipe 1, at the hot water inlet of the heating water tank 140 in order to prevent the heat of the heated hot water in the heating water tank 140 from transferring to the hot water pipe 1 and the heating module 145. However, when the direction control valve 130*d* is installed at the hot water inlet of the heating water tank 140, there is a problem that heat continuously transfers from the hating water tank 140 because the pipelines going to the hot water outlet of the heating water tank 140, the heating module 145, and the hot water pipe 1 communicate with each other. This may result in waste of energy because the hot water remaining in the hot water pipe 1, the hot water supplied in the heating water tank 140, the hot water in the heating module 145, etc. are all heated by the first heater 140*a* installed in the heating water tank 140. Accordingly, in this case, it is preferable to install a direction control valve also at the water discharge point of the heating module 145. Meanwhile, this problem can be solved by installing a direction control valve before the point at which the pipeline connected to the hot water pipe 1 diverges to the heating water tank 140 and the heating module 145. According to this configuration, the hating water tank 140 and the heating module 145 are thermally isolated from the hot water pipe 1 by the direction control valves and the first electronic valve 130*a*, so the first heater 140*a* installed in the heating water tank 140 heats only the hot water supplied in the heating water tank 140 and the hot water in the heating module 145.

Unlikely, it is possible to distribute hot water to the heating water tank 140 and the hating module 145 at a preset ratio (e.g., a volume ratio of 1:2 of hot water that is distributed to the heating water tank 140 and the heating module 145) by installing a fourth electronic valve (not shown) at a point at which the hot water that is supplied through the hot water line 1 diverges to the heating water tank 140 and the heating module 145. This distribution ratio is determined on the basis of the water amount of hot water remaining in the pipeline from the initial inflow point of hot water to the faucet 3, the initial hot water temperature, the capacity of the heating water tank 140, desired temperature and water amount of discharge water set by a user, the water amounts of hot water and cold water, the capacity of the first heater 140*a*, the capacity of the second heater 140*b* installed in the heating module 145, etc. In this case, the fourth electronic valve is a component that is selectively applied.

Meanwhile, the fourth electronic valve is controlled such that the hot water that is supplied through the hot water pipe 1 flows into the heating module 145 when the faucet 3 is not used. Further, the fourth electronic valve is controlled such that the hot water that is supplied through the hot water pipe 1 is distributed at a preset ratio to the heating water tank 140 and the heating module 145 when the faucet 3 is used. Accordingly, it is preferable to prevent the heat of the heated hot water in the heating water tank 140 from transferring to the hot water pipe 1 and the heating module 145 when a user does not use the faucet 3.

The heating module 145 secondarily heats the hot water inflowing therein and supplies secondarily heated hot water to the second electronic valve 130b. Although the heating module 1450 is equipped with one second heater 140b in FIG. 1, a plurality of heaters may be installed at the heating module 145. When a plurality of second heaters 140b is provided, the controller 150 can control the plurality of second heaters 140b to be sequentially or selectively driven and increase temperature along a water supply pipe. Further, a plurality of second heaters 140b may be separately configured in one device and may be mounted in a plurality of separate heating modules 145. When a plurality of second heaters 140b is provided, it is preferable to sequentially increase the temperature of hot water by sequentially driving the heaters from the one close to the inflow point of the hot water. Accordingly, there is an advantage that it is possible to precisely control the temperature of hot water. For example, assuming that the temperature of hot water that is discharged to a requested faucet in accordance with desired temperature and desired water amount set by a user is 44° C., when the volume ratio for distributing hot water, which flows inside at 90 ㎖ per second through the hot water pipe, to the heating water tank 140 and the heating module 145 is 1:2, the temperature of primarily heated water discharged from the heating water tank 140 is 43° C., and the temperature of hot water flowing in to the heating module 145 is 40° C., the heating module 145 should increase the temperature of the hot water flowing inside up to 44.5° C. If the heating module 145 is equipped with two heaters of which the capacities are 1 kW and 0.5 kW, respectively, the 1 kW heater can increase the temperature of hot water of 60 ㎖ by about 3.3° C. per second and the 0.5 kW heater can the temperature of hot water of 60 ㎖ by about 1.65° C. per second. Accordingly, the 1 kW heater keeps being operated while this condition is maintained, and the 0.5 kW heater is controlled to repeatedly operate for 3 seconds and then stop for 1 second. Assuming that the temperature of hot water that is discharged to a requested faucet in accordance with desired temperature and desired water amount set by a user in the above condition is 43.2° C., only the 1 kW heater has to be operated.

Further, in FIG. 1, the heating module 145 is disposed at the position where the secondarily heated hot water discharged from the heating module 145 and the primarily heated hot water discharged from the heating water tank 140 are mixed and then discharged to the faucet 3. However, the heating module 145 may be positioned between the point at which hot water flows inside form the hot water pipe 1 and the point at which hot water is distributed to the heating water tank 140 and the heating module 145, or between the point at which hot water is distributed to the heating water tank 140 and the heating module 145 and the heating water tank 140, or between the point at which the primarily heated hot water is discharged from the heating water tank 140 and the second electronic valve 130b. Considering the heating time of hot water by the second heater 140b of the heating module 145 (i.e., a time that the second heater 140b takes to increase the temperature of the hot water flowing in the heating module 145 up to target temperature), it is preferable that the heating module 145 is installed to be biased to the hot water pipe 1 from the point at which the primarily heated hot water discharged from the heating water tank 140 and the secondarily heated hot water that has passed through the heating module 145 are mixed in FIG. 1. Meanwhile, the fourth temperature sensor 120d measures the temperature of mixed hot water of the primarily heated hot water discharged from the heating water tank 140 and the secondarily heated hot water discharged from the heating module 145, and provides the temperature to the controller 150.

The second electronic valve 130b and the third electronic valve 130c are installed at the point at which mixed hot water is supplied to the faucet 3 and the point at which cold water is supplied to the faucet 3, respectively, and adjust the supply amounts of mixed hot water and cold water in response to a control signal from the controller 150. Although the second electronic valve 130b and the third electronic valve 130c are installed at the points at which mixed hot water and cold water are supplied to the faucet 3, respectively, in FIG. 1, mixed hot water and cold water may be supplied to the faucet 3 by one electronic valve for temperature adjustment. In this case, the electronic valve for temperature adjustment is driven by control of the controller 150 and adjusts the mixing ratio of mixed hot water and cold water, thereby matching the temperature of the discharge water that is discharged from the faucet 3 to desired temperature. Meanwhile, when the mixing ratio of mixed hot water and cold water is adjusted by an electronic valve for temperature adjustment, the water amount of discharge water can be matched to desired water amount by control of the controller 150 by additionally installing an electronic valve for water amount adjustment behind the electronic valve.

Unlikely, a user can adjust a water amount in person using a knob mounted on a physical faucet without additionally installing an electronic valve for water amount adjustment behind an electronic valve for temperature adjustment. When a configuration in which a water amount is adjusted by a knob mounted on a physical knob is employed, there is an advantage that it is possible to use water by driving an electronic valve for temperature adjustment using an auxiliary battery such that mixed hot water and cold water are mixed at 1:1 when electricity fails or malfunction occurs. In this case, a cartridge that adjusts only the water amount of discharge water is mounted on the physical faucet. Further, the controller 150 can find out desired temperature of discharge water on the basis of left and right rotation amounts detected by a rotation sensor mounted on the faucet knob or can receive desired temperature of discharge water from a user through a desired temperature setter that is specifically installed.

When an electronic valve for temperature adjustment is employed, as described above, a direction control valve is installed before the point at which the pipeline connected to the hot water pipe 1 diverges to the heating water tank 140 and the heating module 145 in order to thermally isolate the heating water tank 140 and the heating module 145 from the hot water pipe 1. In this case, the heating water tank 140 and the heating module 145 can be thermally isolated also from the cold water pipe 1 only when the electronic valve for temperature adjustment is controlled to a position where it fully blocks mixed hot water.

The controller 150 controls whether to drive the first heater 140a and the second heater 140b and the degrees of opening of the second electronic valve 130b and the third electronic valve 130c on the basis of the water amounts of hot water and cold water and the values measured by first to fourth temperature sensors such that the water amount and temperature of discharge water that is discharged from the faucet 3 become a target water amount and target temperature of discharge water that are set in correspondence to the desired water amount and desired temperature of discharge water set by a user. Hereinafter, the operation of controlling the first heater 140a, the second heater 140b, the second electronic valve 130b, and the third electronic valve 130c by the controller 150 is described in detail.

First, the case in which the temperature/water amount setter 105 is implemented as a rotation sensor coupled to a common faucet knob 3 is described. In this case, the controller 150 determines desired temperature and a desired water amount of a user on the basis of the horizontal rotation angle and the vertical rotation angle of the faucet knob 3 measured by the rotation sensor.

To this end, the controller 150, though not shown in FIG. 1, may include a memory and a processor. The memory can keep commands for performing the faucet control method to be described hereafter. Further, the processor can execute the commands kept in the memory.

Figure 3:
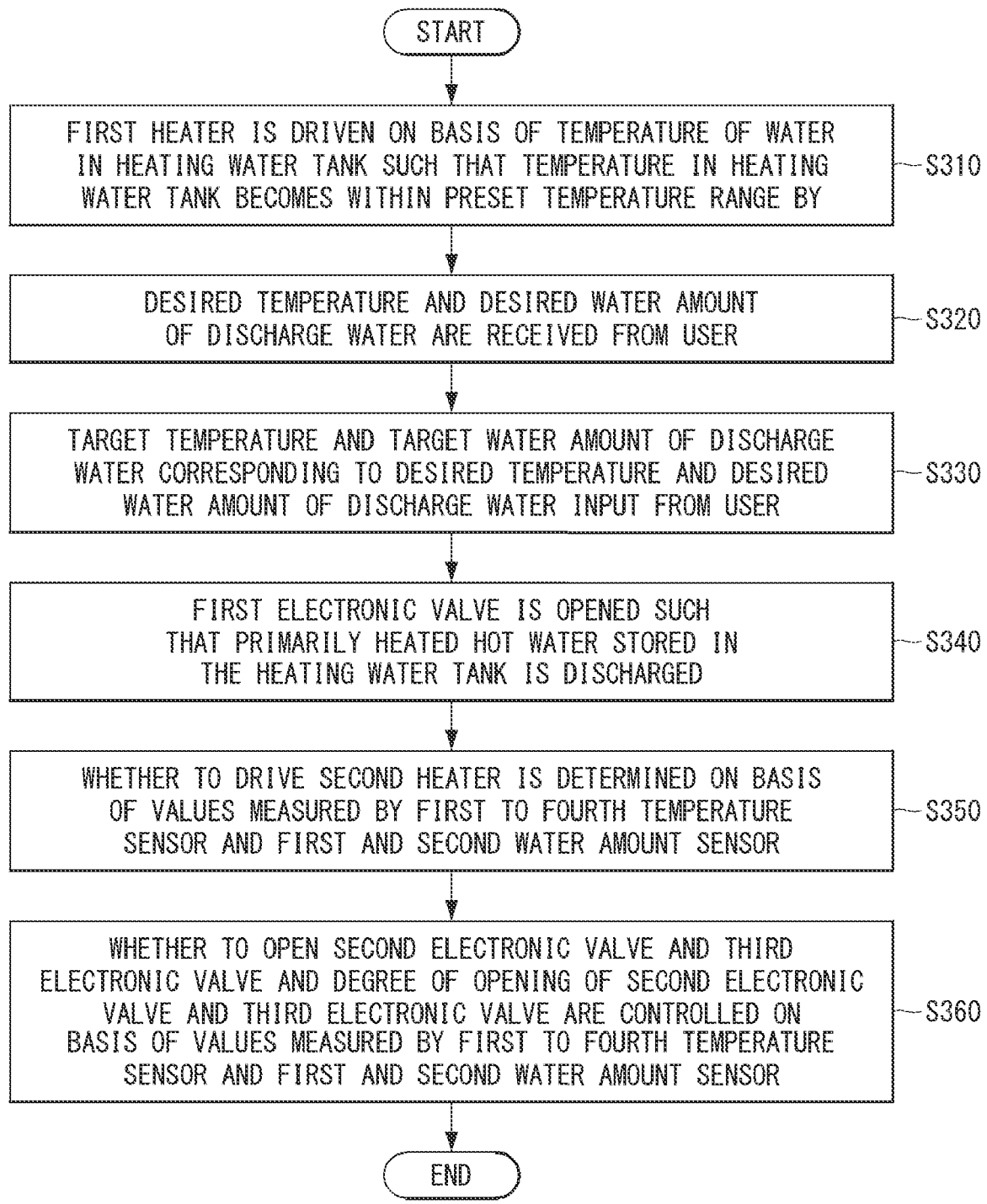
FIG. 3 is a flowchart of a faucet control method according to an embodiment of the present disclosure.

FIG. 3 is a flowchart showing a process of performing a faucet control method according to an embodiment of the present disclosure.

First, the controller 150 controls the temperature of the water in the heating water tank 140 to be maintained in a preset temperature range by driving the first heater 140a on the basis of the temperature of the water in the heating water tank 140 which is periodically input from the third temperature sensor 120c (S300). For example, the controller 150 drives the first heater 140a installed in the heating water tank 140 such that the water in the heating water tank 140 is heated to the preset first temperature (e.g., 80° C.) while the faucet 3 is not operated (a user does not use water). If the temperature of the water in the heating water tank 140 reaches the first temperature, the controller 150 stops operation of the first heater 140a. In this state, when the temperature of the water in the heating water tank 140 drops to the preset second temperature (e.g., 40° C.), the controller 150 drives again the first heater 140a, thereby repeating the operation of heating the water in the heating water tank 140 up to the preset first temperature (e.g., 80° C.). It is preferable that the first heater 140a installed in the heating water tank 140 is fundamentally controlled to be driven while the faucet 3 is not operated, but, if necessary (e.g., when it is required to further increase the temperature of hot water due to an excessively small supply amount of hot water), the first heater 140a may be driven even while the faucet 3 is operated.

Meanwhile, whether to drive the first heater 140a may be determined on the basis of the values measured by the first temperature sensor 120a and the third temperature sensor 120c. For example, the temperature of water measured by the third temperature sensor 120c may be 45° C., but the temperature of hot water measured by the first temperature sensor 120a (which is substantially the same as the temperature of the hot water in the hot water pipe 1) may be 30° C. due to excellent insulation performance of the heating water tank 140. In this case, it may be difficult to supply discharge water at desired temperature set by a user when the user operates the faucet 3 later, depending on the water amount of hot water remaining in the pipeline between the supply point of hot water and the heating water tank 140. For example, when the temperature of hot water measured by the first temperature sensor 120a is 30° C., the capacity of the heating water tank 140 is 2000 ㎖, the water amount of remaining hot water is 6000 ㎖, the supply water amount of hot water is 60 ㎖/sec, and hot water supplied through the hot water pipe 1 is distributed at 20 ㎖/sec and 40 ㎖/sec to the heating water tank 140 and the heating module 145, respectively, the remaining hot water and the hot water in the heating water 140 are all exhausted in 100 seconds.

When the first heater 140a and the second heater 140b are not driven, the temperature of the hot water that is supplied to the second electronic valve 130b becomes 35° C. for 100 seconds until the remaining hot water and the hot water in the heating water tank 140 are all exhausted. Accordingly, there is a problem that it is impossible to cope with the case in which the desired temperature of discharge water of a user exceeds 35° C. The controller 150 is required to find out and keep first the water amount of remaining hot water in the hot water pipe 1 in order to prevent this situation. The water amount of remaining hot water may be found out on the basis of the time, which is taken from the time point of operation of the faucet 3 to the time point at which the temperature of hot water measured by the first temperature sensor 120a reaches maximum supply temperature, and the maximum supply amount of hot water. For example, when the maximum supply amount of hot water is 80 ㎖/sec and the time that is taken from the time point of operation of the faucet 3 to the time point at which the temperature of hot water measured by the first temperature sensor 120a reaches maximum supply temperature is 80 seconds, the water amount of the remaining hot water is 6400 ㎖.

In this state, when the temperature of hot water measured by the first temperature sensor 120a is 30° C., the capacity of the heating water tank 140 is 2000 ㎖, the desired temperature and the desired water amount of discharge water set by a user is 42° C. and 60 ㎖/sec, respectively, and hot water supplied through the hot water pipe 1 is distributed at 20 ㎖/sec and 40 ㎖/sec to the heating water tank 140 and the heating module 145, respectively, the remaining hot water is exhausted at about 106.7 seconds and the hot water in the heating water 140 is exhausted at the time point of 100 seconds. Accordingly, the time point at which the hot water in the heating water tank 140 is exhausted is almost the same as the time point at which the remaining hot water is completely exhausted, so it is possible to find, from the following equation, the temperature of the hot water in the heating water tank 140 for supplying discharge water at the desired temperature and desired water amount set by a user for 106.7 seconds that is taken until the temperature of hot water measured by the first temperature sensor 120a reaches the maximum supply temperature.

$$T_t = \frac{T_h Q_{ha} + T_l(Q_t - Q_{ha})}{Q_t} \quad \text{[Equation 1]}$$

wherein, $T_t$ is desired temperature of discharge water, $Q_t$ is a desired amount of discharge water (the same as the supply amount of hot water), $T_h$ is the temperature of hot water in the heating water tank 140, $Q_{ha}$ is the water amount of hot water that is distributed to the heating water tank 140, and $T_1$ is the temperature of hot water that is supplied from the hot water pipe 1.

Accordingly, in order to supply discharge water at the desired temperature and desired water amount set by a user for 106.7 seconds that is taken until the temperature of hot water measured by the first temperature sensor 120a reaches the maximum supply temperature, the temperature of the hot water in the heating water tank 140 should be at least 66° C. As a result, the first heater 140a installed in the heating water tank 140 can be driven even if temperature is higher than the preset second temperature (e.g., 40° C.). Of course, since it is possible to additionally increase the temperature of hot water using the heating module 145, the driving temperature of the first heater 140*a* installed in the heating water tank 140 may be set as low as the temperature corresponding to the capacity of the heating module 145.

As described above, the controller 150 can determine whether to drive the first heater 140*a* on the basis of the temperature of the hot water in the hot water pipe 1 measured by the first temperature sensor 120*a*, the temperature of the water in the heating water tank 140 measured by the third temperature sensor 120*c*, the water amount of remaining hot water in the pipeline between the supply point of hot water and the heating water tank 140, the capacity of the heating water tank 140, etc. In this case, considering that as the capacity of the heating water tank 140 is increased, the heating time of water by the first heater 140*a* is also increased, it is preferable that the capacity of the heating water tank 140 is appropriately determined between 1 L and 3 L. Further, in order to minimize the driving time of the first heater 140*a* while not excessively increasing the capacity of the heating water tank 140, it may be possible to take a method of setting the target temperature and target water amount of discharge water to be different from the desired temperature and desired water amount set by a user until the remaining hot water in the pipeline between the supply point of hot water and the heating water tank 140 is exhausted. For example, even if the desired temperature and desired water amount set by a user is 45° C. and 80 ml/sec, respectively, it is possible to limit the target temperature and target water amount of discharge water maximally to 40° C. and 60 ml/sec until the remaining hot water in the pipeline between the supply point of hot water and the heating water tank 140 is exhausted. These limits are determined on the basis of the capacity of the heating water tank 140, the capacity of the first heater 140*a*, the water amount of remaining hot water, etc.

Next, the controller 150 receives desired temperature and desired water amount of discharge water input from a user through the temperature/water amount setter 105. When the temperature/water amount setter 105 is a rotation sensor coupled to the knob of the common faucet 3, the controller 150 calculates desired temperature and desired water amount of discharge water on the basis of a rotation amount (at least one value of a horizontal rotation amount and a vertical rotation amount) of the knob input from the rotation sensor. Next, the controller 150 determines target temperature and target water amount of discharge water that correspond to the desired temperature and desired water amount of discharge water input from the user (S320). For example, the target temperature of discharge amount can be calculated using Equation 2.

$$T = \frac{T_H Q_{Hmax}(\theta_{Hmax} - \theta_H) + T_L Q_{Lmax}\theta_H}{Q_{Hmax}(\theta_{Hmax} - \theta_H) + Q_{Lmax}\theta_H} \quad \text{[Equation 2]}$$

wherein, T is the target amount of discharge water, $T_H$, is the supply temperature of hot water, $T_L$ is the supply temperature of cold water, $Q_{Hmax}$ is the maximum supply amount of hot water, $Q_{Lmax}$ is the maximum supply amount of cold water, $\theta_H$ is a horizontal rotation angle, and $\theta_{Hmax}$ is the maximum horizontal rotation angle of a faucet knob.

The target water amounts of hot water and cold water for supplying the target water amount of discharge water can be calculated using Equations 3 and 4.

$$Q_H = Q_{Hmax}(1 - \frac{\theta_H}{\theta_{Hmax}})\frac{\theta_V}{\theta_{Vmax}} \quad \text{[Equation 3]}$$

wherein, $Q_H$ is the target water amount of hot water, $\theta_V$ is the vertical rotation angle of a faucet knob, and $\theta_{Vmax}$ is the maximum vertical rotation angle of a faucet knob.

$$Q_L = Q_{Lmax}\frac{\theta_H \theta_V}{\theta_{Hmax}\theta_{Vmax}} \quad \text{[Equation 4]}$$

wherein, $Q_L$ is the target water amount of cold water.

It is possible to finally derive a target water amount of discharge water that is discharged through the faucet 3 by calculating a target water amount of hot water and a target water amount of cold water, using Equation 3 and Equation 3, and then adding up the target water amounts. In the method of determining a target temperature and a target water amount of discharge water described above on the basis of Equation 2 to Equation 4, the supply temperature of hot water ($T_H$ in Equation 2) is the temperature of the hot water that is supplied through the hot water pipe 1 when the first heater 140*a* in the heating water tank 140 and the second heater 140*b* in the heating module 145 are not driven, and is the temperature of mixed hot water measured by the fourth temperature sensor 120*d* when one or both of the first heater 140*a* in the heating water tank 140 and the second heater 140*b* in the heating module 145 are driven.

In general, the target temperature and the target water amount of discharge water are set to be the same as the desired temperature and the desired water amount of discharge water input from a user. However, as described above, a desired temperature and a desired water amount that a user desires may not be supplied in the early stage of operation of the faucet 3, and in this case, the target temperature and the target water amount of discharge water may be set to be different from the desired temperature and the desired water amount of discharge water input from the user. Next, the controller 150 opens the first electronic valve 130*a* so that the primarily heated water kept in the heating water tank 140 is discharged (S330).

Next, the controller 150 determines whether to operate the second heater 140*b* in the heating module 145 on the basis of the temperature, which is measured by the first temperature sensor 120*a*, of the hot water that is supplied from the hot water pipe 1, the temperature, which is measured by the second temperature sensor 120*b*, of the cold water that is supplied from the cold water pipe 2, the water amount, which is measured by the first water amount sensor 110*a*, of the hot water that is supplied from the hot water pipe 1, the water amount, which is measured by the second water amount sensor 110*b*, of the cold water that is supplied from the cold water pipe 2, the temperature, which is measured by the third temperature sensor 120*c*, of the hot water in the heating water tank 140, the capacity of the heating water tank 140, and the temperature of the mixed hot water measured by the fourth temperature sensor 120*d* (S340). The second heater 140*b* is driven when it is required to increase the target temperature of discharge water in the early stage of operation of the faucet 3, when the water amount of the hot water that is supplied from the hot water pipe 1 deceases during operation of the faucet 3, etc.

Next, the controller 150 controls whether to open the second electronic valve 130*b* and the third electronic valve 130*c*, and the degrees of opening of the electronic valves on the basis of the temperature, which is measured by the first temperature sensor 120a, of the hot water that is supplied from the hot water pipe 1, the temperature, which is measured by the second temperature sensor 120b, of the cold water that is supplied from the cold water pipe 2, the water amount, which is measured by the first water amount sensor 110a, of the hot water that is supplied from the hot water pipe 1, the water amount, which is measured by the second water amount sensor 110b, of the cold water that is supplied from the cold water pipe 2, the temperature, which is measured by the third temperature sensor 120c, of the hot water in the heating water tank 140, the temperature of the mixed hot water measured by the fourth temperature sensor 120d, and the target temperature and target water amount of discharge water (S350).

First, the operation of controlling the second electronic valve 130b and the third electronic valve 130c by means of the controller 150 when water in the heating water tank 140 having a capacity of 2400 mℓ is heated and maintained at 80° C. by the first heater 140a is described. It is assumed in the following description that remaining hot water remaining in the pipeline between a supply point of hot water and the heating water tank 140 is 6400 mℓ, the first electronic valve 130a is controlled to distribute hot water supplied from the hot water pipe 1 to the heating water tank 140 and the heating module 150, the temperatures of hot water and cold water measured by the first temperature sensor 120a and the second temperature sensor 120b are 30° C. and 20° C., respectively, the maximum supply water amounts of hot water and cold water are 80 mℓ /sec and 100 mℓ /sec, and the maximum supply temperature of hot water is 60° C.

When a desired temperature and a desired water amount of discharge water set by a user are 42° C. and 60 mℓ /sec, respectively, the controller 150 checks whether the temperature of mixed hot water of the primarily heated hot water in the heating water tank 140 and the secondarily heated hot water by the heating module 145 can reach the desired temperature of discharge water set by the user until the remaining hot water is completely used. If it is determined as being possible, the controller 150 sets the desired temperature and the desired water amount of discharge water set by the user as a target temperature and a target water amount of discharge water. However, when it is determined as being impossible, the target temperature of discharge water is set lower than the desired temperature of discharge water set by the user or the target water amount of discharge water is set smaller than the target water amount of discharge water set by the user.

In the above example, when the primarily heated hot water in the heating water tank 140 is discharged at 20 mℓ /sec, primarily heated hot water of 2400 mℓ takes 120 seconds to be completely used, which is longer than 106.7 seconds that remaining hot water takes to be completely used. In this case, the temperature of mixed hot water that is supplied to the second electronic valve 130b is 46.67° C. Accordingly, discharge water at a temperature higher than the desired temperature of the user is discharged by opening only the second electronic valve 130b. Accordingly, it is required to decrease the water amount of the mixed hot water by controlling the second electronic valve 130b and to supply cold water by the decreased water amount of the mixed hot water by controlling the third electronic valve 130c so that the temperature of discharge water that is discharged from the faucet 3 becomes the target temperature 42° C. In this case, when the mixed hot water and the cold water are supplied at 49.5 mℓ sec and 10.5 mℓ /sec, respectively, to the faucet 3, the temperature of discharge water becomes 42° C. In this case, the amount of hot water that is supplied from the hot water pipe 1 to the heating water tank 140 is 16.5 mℓ /sec and the amount of hot water that is supplied to the heating module 145 is 33 mℓ /sec. Accordingly, the first electronic valve 130a is opened such that primarily heated hot water is discharged at 16.5 mℓ /sec from the heating water tank 140. In this situation, considering that primarily heated hot water is discharged at 24.75 mℓ /sec from the heating water tank 140 when the first electronic valve 130a is fully opened, the first electronic valve 130a is opened by about 66.7% of full opening. The degrees of the second electronic valve 130b and the third electronic valve 130c can be calculated using Equation 5 and Equation 6.

$$Q_{\theta H} = \frac{Q_H}{Q_{Hmax}} \quad \text{[Equation 5]}$$

wherein, $O_{\theta H}$ is the open ratio of the second electronic valve 130b according to a horizontal rotation amount of the faucet knob 105 to the maximum supply water amount of hot water when the target temperature of discharge water that is discharged through the faucet 3 a target supply temperature.

$$Q_{\theta L} = \frac{Q_L}{Q_{Lmax}} \quad \text{[Equation 6]}$$

wherein, $O_{\theta L}$ is the open ratio of the third electronic valve 130c according to a horizontal rotation amount of the faucet knob 105 to the maximum supply water amount of cold water when the target temperature of discharge water that is discharged through the faucet 3 a target supply temperature. $O_{\theta H}$ and $O_{\theta L}$ may be set as 1 when a valve is fully opened.

According to Equations 5 and 6, the second electronic valve 130b and the third electronic valve 130c are opened by 61.9% and 10.5% of full opening, respectively. Meanwhile, the exhaustion time of remaining hot water and the exhaustion time of the primarily heated hot water in the heating water tank 140 increase to 129 seconds and 145 second, respectively, and the exhaustion time of the primarily heated hot water in the heating water tank 140 becomes longer than the exhaustion time of the primarily heated hot water in the heating water tank 140, the controller 150 can stably provide discharge water at the temperature and water amount that the use desires.

As described above, it is possible to stably supply discharge water at a temperature and a water amount desired by the user until the temperatures and the water amounts of hot water and cold water that are supplied through the hot water pipe 1 and the cold water pipe 2, respectively, from the time point of operation of the faucet 3 (i.e., the time point at which the user uses the faucet. Further, when the temperature of the hot water in the heating water tank 140 does not reach a first setting temperature (e.g., 80° C.) or when the temperature of remaining hot water is excessively low, it is possible to cope with this situation by setting the target temperature and the target water amount of discharge water to be lower than the desired temperature and the desired water amount of the user.

Next, the controller 150 checks whether the water amount of the hot water that is supplied through the hot water pipe 1 and the water amount of the cold water that is supplied through the cold water pipe 2 are changed (S360). This operation of the controller 150 is continued from the time point of operation of the faucet 3 to the time point of end of the operation of the faucet 3. The situation in which the water amount of the hot water that is supplied through the hot water pipe 1 and the water amount of the cold water that is supplied through the cold water pipe 2 are changed occurs when hot water and cold water are used by a first consumption position and hot water or cold water is used by a second consumption position. That is, hot water and cold water supplied into home at a predetermined water pressure is distributed to consumption positions from a main hot water pipe and a main cold water pipe. Further, when hot water and cold water are used at a plurality of consumption positions, the water amounts of hot water and cold water are changed at each of the consumption positions.

Figure 4:
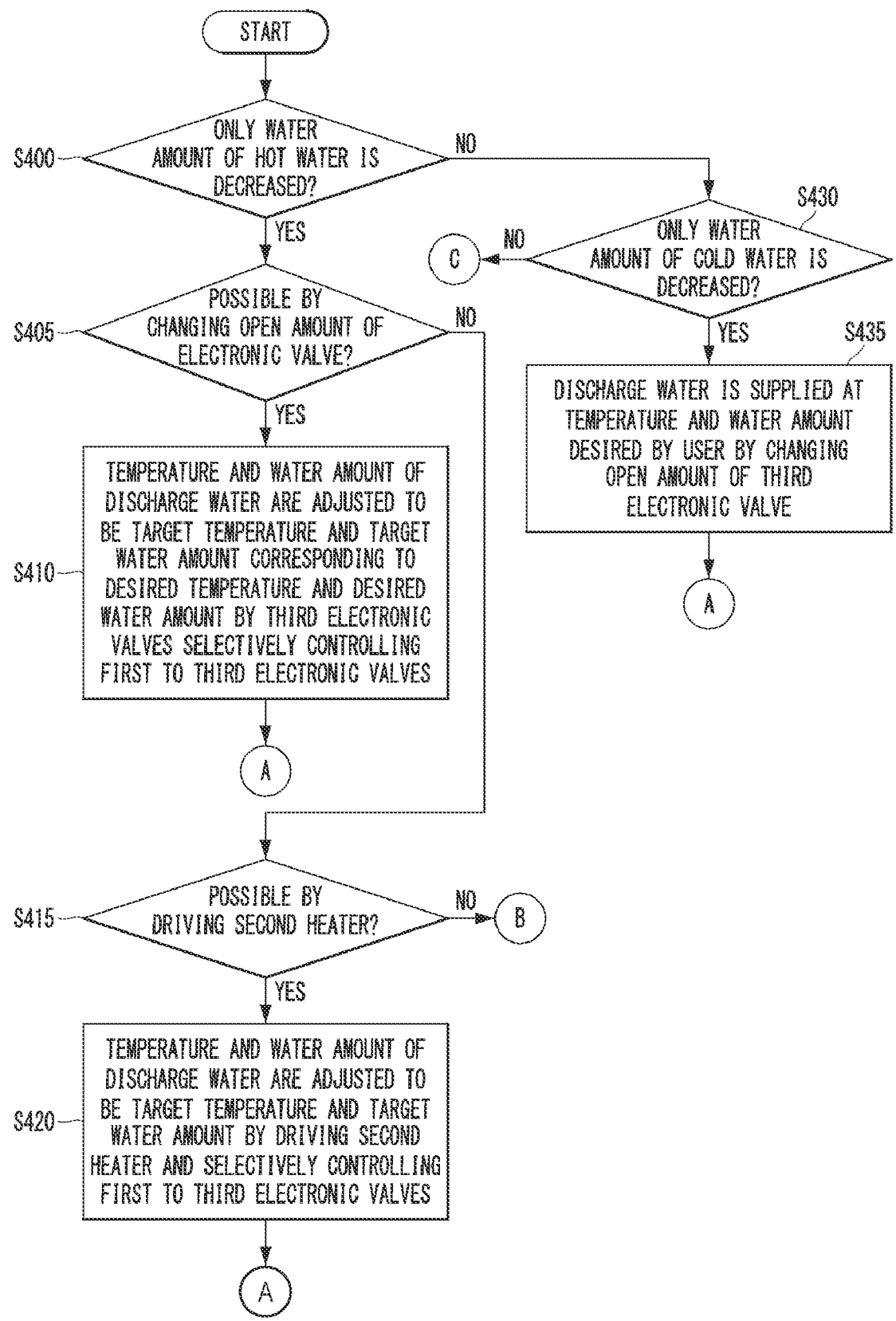
FIGS. 4 and 5 are flowcharts illustrating a method for the faucet control device according to an embodiment of the present invention to control a valve.
Figure 5:
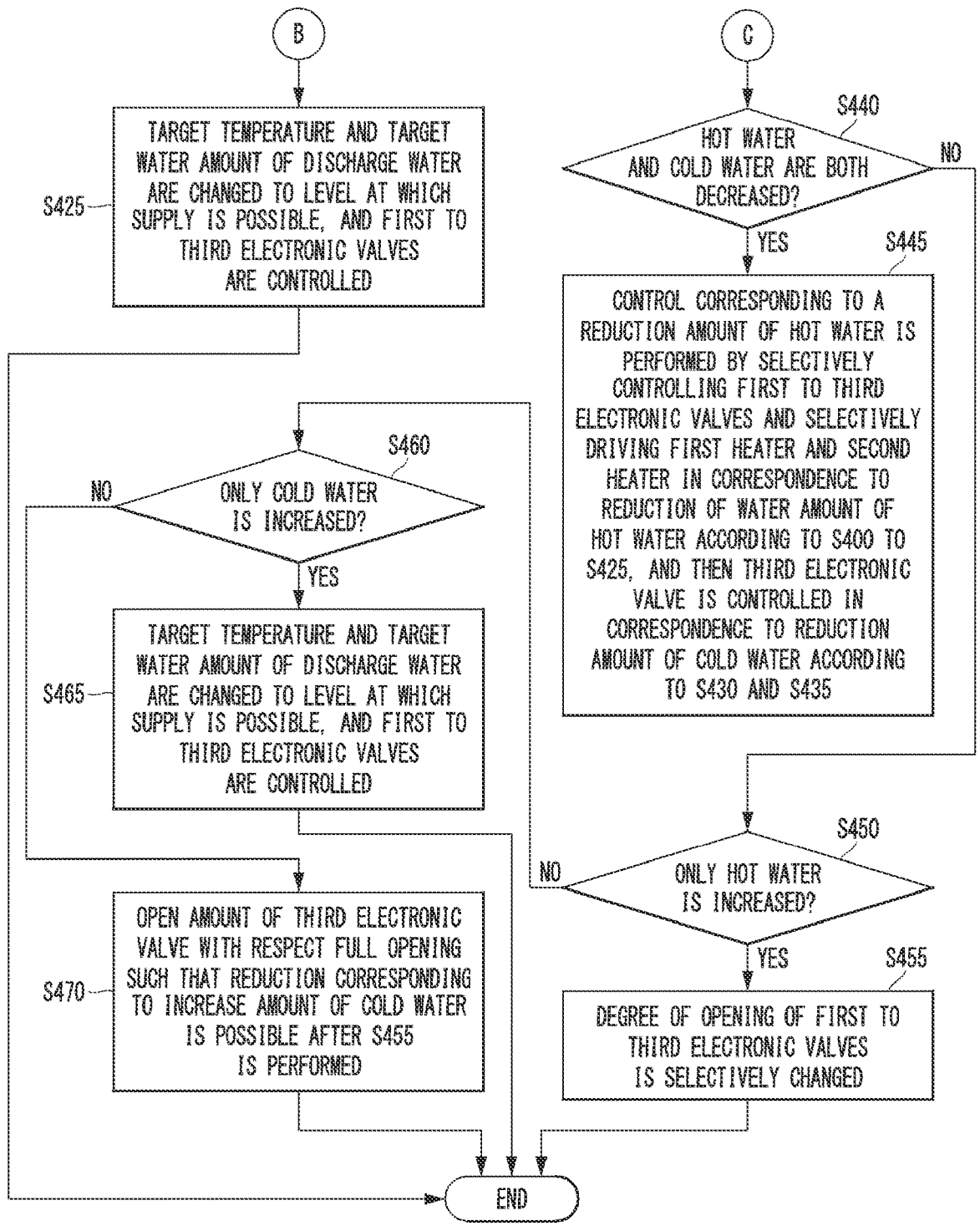

FIGS. 4 and 5 are flowcharts showing a method of controlling the second electronic valve and the third electronic valve according to water amount variations of hot water and cold water according to an embodiment of the present disclosure. Hereinafter, a method in which the faucet control device controls the degrees of opening of the second electronic valve 130b and the third electronic valve 130c in accordance with water amount variations of hot water and cold water after monitoring the water amount variations of the hot water and the cold water is described.

First, when determining that only the water amount of hot water has decreased (S400), the controller 150 determines whether it is possible to provide discharge water at a temperature and a water amount desired by a user by changing only the degrees of opening of the second electronic valve 130b and the third electronic valve 130c (S450). If determining that it is possible to provide discharge water at a temperature and a water amount desired by a user by changing only the degrees of opening of the second electronic valve 130b and the third electronic valve 130c, the controller 150 selectively controls the first electronic valve 130a, the second electronic valve 130bn and the third electronic valve 130c so that the temperature and the water amount of discharge water become a target temperature and a target water amount that correspond to the desired temperature and the desired water amount that the user desires (S410).

The same conditions as the example described with reference to FIG. 3 are assumed, that is, it is assumed that primarily heated hot water heated at 80° C. is kept in the heating water tank 140 having capacity of 2400 mℓ, remaining hot water is 6400 mℓ, the temperatures of hot water and cold water measured by the first temperature sensor 120a and the second temperature sensor 120b are 30° C. and 20° C., respectively, the maximum supply water amounts of hot water and cold water are 80 mℓ/sec and 100 mℓ/sec, and the maximum supply temperature of hot water is 60° C. In this case, if the desired temperature and the desired water amount set by a user is 42° C. and 60 mℓ/sec, respectively, and when mixed hot water and cold water are supplied to the faucet 3 at 49.5 mℓ/sec and 10.5 mℓ/sec, respectively, the temperature and the mℓ water amount of discharge water become 42° C. and 60 mℓ/sec, respectively. In this case, the amount of hot water that is supplied from the hot water pipe 1 to the heating water tank 140 is 16.5 mℓ/sec and the amount of hot water that is supplied to the heating module 145 is 33 mℓ/sec. That is, the first electronic valve 130a is opened by 66.7% of full opening.

In this situation, if the water amount of the hot water that is supplied through the hot water pipe 1 decreases to 60 mℓ/sec, the mixed hot water that is supplied through the second electronic valve 130b becomes 37.1 mℓ/sec that is 61.9% of the water amount of the hot water that is supplied through the hot water pipe 1. In this case, the amount of primarily heated hot water that is discharged from the heating water tank 140 and the amount of hot water that is discharged from the heating module 145 is 12.4 mℓ/sec and 24.7 mℓ/sec, respectively. Accordingly, if the water amounts of hot water and cold water are not changed by controlling the second electronic valve 130b and the third electronic valve 130c, the temperature and the water amount of discharge water decreases to 40.8° C. and 47.6 mℓ/sec, respectively. Accordingly, in order to maintain the temperature and the water amount of discharge water, it is required to change the amount of the primarily heated hot water that is discharged from the heating water tank 140, the amount of mixed hot water, and the amount of cold water by selectively controlling the first to third electronic valves 130a, 130b, and 130c.

First, the case in which the degree of opening of the third electronic valve 130c is described. In this case, if the second electronic valve 130b is additionally opened, mixed hot water can be discharged at 40 mℓ/sec. That is, if the second electronic valve 130b is opened by 82.5% of full opening, the mixed hot water is discharged at 49.5 mℓ/sec. In this case, if the first electronic valve 130a is controlled such that the temperature of the mixed hot water becomes 46.7° C., it is possible to supply discharge water at 42° C. desired by the user at 60 mℓ/sec. Accordingly, if the first electronic valve 130a is opened by 66.7% of full opening, primarily heated hot water is discharged at 16.5 mℓ/sec from the heating water tank 140, and the temperature of the mixed hot water becomes 46.7° C. It is possible to maintain the temperature and the water amount of discharge water by adjusting the opening amounts of the first electronic valve 130a and the second electronic valve 130b, as described above.

Next, it may be possible to consider a method of increasing the amount of cold water in correspondence to a reduction amount of mixed hot water by additionally opening only the third electronic valve 130c without changing the degree of opening of the second electronic valve 130b. In this case, cold water should be supplied at 22.9 mℓ/sec, and accordingly, the third electronic valve 130c is opened by 22.9% of full opening. In this case, the temperature of mixed hot water should be 55.6° C. Accordingly, if primarily heated hot water is discharged at 19 mℓ/sec from the heating water tank 140, it is possible to supply discharge water at 42° C. desired by the user at 60 mℓ/sec. However, the maximum amount of the primarily heated hot water that is discharged from the heating water tank 140 while mixed hot water is supplied at 37.1 mL/sec is 18.6 mL/sec when the first electronic valve 130a is fully opened. Accordingly, in this case, if only the third electronic valve 130c is opened, discharge water may not be supplied at the temperature and the water amount desired by the user. As a result, the controller 150 performs this operation when making sure that it is possible to supply discharge water at the temperature and the water amount desired by the user by opening the third electronic valve 130c for the maximum supply amount of mixed hot water. Of course, it is possible to maintain the temperature and the water amount of discharge water by changing all of the degrees of opening of the first electronic valve 130a, the second electronic valve 130b, and the third electronic valve 130c. However, the two kinds of methods described above are more efficient in that it is required to change all of the degrees of opening of three electronic valves 130a, 130b, and 130c in this case.

As a result, it is possible to continuously supply discharge water at a temperature and a water amount desired by a user even if the water amount of hot water that is supplied from the hot water pipe 1 decreases by selectively adjusting the degrees of opening of the first electronic valve 130a, the second electronic valve 130b, and the third electronic valve 130c even without driving the second heater 140b of the heating module 145. Of course, when the second heater 140b is driven, it is possible to decrease the consumption amount of the primarily heated hot water kept in the heating water tank 140 in correspondence to the capacity of the second heater 140b.

Meanwhile, when both the remaining hot water and the primarily heated hot water in the heating water tank 140 are completely used, the temperature of the hot water in the heating water tank 140 and the temperature of the hot water in the heating module 145 become a maximum supply temperature (e.g., 60° C.). If this state is a normal state, the controller 150 can check whether the normal state is reached by checking whether the values measured by the first temperature sensor 120a installed at the point at which hot water flows inside from the hot water pipe 1 and the second temperature sensor 120b installed at the point at which cold water flows inside from the cold water tank 2 have reached the maximum supply temperature. In this case, hot water is supplied at the same temperature and the same amount to the second electronic valve 130b regardless of whether the first electronic valve 130a is open. Accordingly, it is preferable that the controller 150 makes the entire of hot water, which is supplied from the hot water pipe 1, flow to the heating module 143 by closing the first electronic valve 130a. In this state, in order to supply discharge water at 42° C. and 60 ml/sec that is a desired temperature and a desired water amount set by a user, the second electronic valve 130b and the third electronic valve 130c are controlled such that mixed hot water is supplied at 33 ml/sec and cold water is supplied at 27 ml/sec. Accordingly, the second electronic valve 130b and the third electronic valve 130c are opened by about 41.3% and 27% of full opening, respectively. When the water amount of the hot water that is supplied through the hot water pipe 1 decreases to 60 ml/sec while discharge water is supplied, as described above, mixed hot water is discharged at 24.8 ml/sec to the second electronic valve 130b. Accordingly, the temperature and the water amount of discharge water decrease to 39.2° C. and 51.8 ml/sec, respectively.

When the water amount of hot water decreases after the normal state is reached, as described above, the water amount of mixed hot water can become 33 ml/sec by additionally opening the second electronic valve 130b without changing the degree of opening of the third electronic valve 130c, as described above. That is, if the second electronic valve 130b is opened by 55% of full opening, mixed hot water is supplied at 33 ml/sec, and accordingly, the temperature and the water amount of discharge water can be maintained. However, in this case, if the third electronic valve 130c is additionally opened without changing the degree of opening of the second electronic valve 130b, there is a problem that the water amount of discharge water is maintained, but the temperature decreases to 36.9° C.

Next, when determining that it is impossible to provide discharge water at a temperature and a water amount desired by a user only by changing the degrees of opening of the second electronic valve 130b and the third electronic valve 130c with only the water amount of hot water decreased, the controller 150 checks whether it is possible to supply discharge water at a temperature and a water amount desired by a user when driving the second heater 140b of the heating module 145 (S415). Of course, it is possible to further increase the temperature of discharge water when driving also the first heater 140a of the heating water tank 140, but the capacity of the first heater 140a is not larger than the capacity of the second heater 140b, so the following description is based on driving the second heater 140b. If determining that it is possible to provide discharge water at a temperature and a water amount desired by a user when driving the second heater 140b, the controller 150 drives the second heater 140b and selectively controls the first electronic valve 130a, the second electronic valve 130bn and the third electronic valve 130c so that the temperature and the water amount of discharge water become a target temperature and a target water amount that correspond to the desired temperature and the desired water amount that the user desires (S420). In this case, water supplied from the hot water pipe 1 to the heating module 145 is heated by the second heater 140b while flowing, and the increase amount of temperature by the second heater 140b can be calculated from the following equation.

$$\Delta T = \frac{1000 \times P \times t}{0.2778 \times 60 \times c \times \rho \times q \times \alpha} \quad \text{[Equation 7]}$$

wherein, $\Delta T$ is a temperature increase amount, P is the capacity (KW) of the second heater 140b, $c$ is the specific heat (4.18 KJ/(Kg° C.) of water, $\rho$ is the density (1 Kg/L) of water, t is a temperature increase time (min), $\alpha$ is a safety ratio (assumed as 1.2), and q is a flow rate (L/min).

When the heating module 145 is configured by mounting a cartridge heater having an outer diameter of 1 cm and a length of 18 cm in a pipe having an inner diameter of 2 cm, a length of 20 cm, the heating module 145 may be filled ml with water of about 49 ml. Accordingly, when hot water of 30° C. is supplied at a water amount of 20 ml/sec to the heating module 145, heated water is discharged in about 2.5 seconds. When the capacity of the cartridge heater is 1 KW, the temperature of secondarily heated hot water that is discharged from the heating module 145 increases by about 10° C. and becomes 40° C. in accordance with Equation 7. Further, when one heating module is configured by connecting two of such a heating module, it is possible to increase the temperature of hot water, which flows into the heating module 145 at a water amount of 20 ml/sec, by about 20° C. Meanwhile, when the water amount of hot water flowing into the heating module 145 is increased twice (i.e., 40 ml/sec), the temperature of hot water increases by 10° C. in about 1.2 seconds. Since when the heating module 145 is manufactured in a pipe shape on the basis of this fact, the temperature increase amount after a predetermined delay time is the instantaneous rate of change of the temperature increase amount according to Equation 7, Equation 8 not related to a heating time can be derived.

$$\Delta T = \frac{1000 \times P}{0.2778 \times 60 \times c \times \rho \times q \times \alpha} \quad \text{[Equation 8]}$$

wherein, $\Delta T$ is a temperature increase amount, P is the capacity (KW) of the second heater 140b, $c$ is the specific heat (4.18 KJ/(Kg° C.) of water, $\rho$ is the density (1 Kg/L) of water, $\alpha$ is a safety ratio (assumed as 1.2), and q is a flow rate (L/min).

In the same situation as the example described above, when the water amount of hot water that is supplied from the hot water pipe 1 decreases to 30 ml/sec at a time point after 60 seconds elapses from the time point of using the faucet 1, it is possible to supply mixed hot water only at 30 mℓ/sec even though the second electronic valve 130b is maximally opened. Accordingly, the water amount of cold water should be increased to 30 mℓ/sec to provide discharge water at 60 mℓ/sec desired by a user. In this case, the temperature of mixed hot water should be 64° C., and to this end, primarily heated hot water should be discharged at 20.4 mℓ/sec from the heating water tank 140 and hot water should be discharged at 9.6 mℓ/sec from the heating module 145. However, since the maximum amount of primarily heated water that can be discharged from the heating water tank 140 is 15 mℓ/sec that is a half of hot water that is supplied through the hot water pipe 1, this condition cannot be satisfied. Accordingly, it is required to secondarily heat hot water flowing into the heating water at a water amount of 15 mℓ/sec by driving the second heater 140b of the heating module 145.

If the capacity of the second heater 140b is 1.5 kW, according to Equation 8, it is possible to increase the temperature of hot water that is supplied at 15 m/sec by mℓ about 20° C. Of course, temperature that can be increased is about 16° C. under the assumption that the efficiency of the heater is not 100%, but 80%. Accordingly, when the second heater 140b is driven, secondarily heated water at 50° C. is discharged from the heating module 140 at a water amount of 15 mℓ/sec, and the temperature of mixed hot water can be maximally increased up to 65° C. Accordingly, even if the water amount of hot water that is supplied through the hot water pipe 1 decreases, it is possible to continuously provide discharge water at a temperature and a water amount desired by a user by driving the second heater 140b. If the water amount of hot water that is supplied through the hot water pipe 1 excessively decreases, it discharges water may not be supplied at a temperature and a water amount desired by a user even though the first heater 140a and the second heater 140b are both driven. In this case, the second electronic valve 130b and the third electronic valve 130c are controlled such that the temperature of discharge water becomes the temperature desired by the user by driving both the first heater 140a and the second heater 140b and the water amount of the discharge water decreases (S425).

Meanwhile, when both the remaining hot water and the primarily heated hot water in the heating water tank 140 are completely used, the temperature of the hot water in the heating water tank 140 and the temperature of the hot water in the heating module 145 become a maximum supply temperature (e.g., 60° C.). In this situation, when the water amount of hot water that is supplied through the hot water pipe 1 decreases to 30 mℓ/sec, mixed hot water at 60° C. can be supplied at a water amount of 30 mℓ/sec even though the second electronic valve 130b is fully opened. Accordingly, the water amount of cold water should be increased to 30 mℓ/sec to provide discharge water at 60 mℓ/sec desired by a user. In this case, the temperature of the mixed hot water becomes 40° C., and accordingly, discharge water at the temperature desired by the user cannot be provided. In this case, it is possible to provide discharge water at the temperature desired by the user by increasing the temperature of hot water that is supplied through the heating module 145 to 68° C. by driving the second heater 140b. In this case, it is possible to increase the temperature of the hot water by 8° C. by appropriately adjusting the driving time of the second heater 140b.

Next, when it is determined that only the water amount of cold water decreases (S430), discharge water is supplied at the temperature and the water amount desired by the use by changing the degree of opening of the third electronic valve 130c (S435).

If the desired temperature and the desired water amount set by a user is 42° C. and 60 mℓ/sec, respectively, in the same condition as the example described above with reference to FIG. 3, and when mixed hot water and cold water are supplied to the faucet 3 at 49.5 mℓ/sec and 10.5 mℓ/sec, respectively, the temperature and the water amount of discharge water become 42° C. and 60 mℓ/sec, respectively. Accordingly, the open amounts of the second electronic valve 130b and the third electronic valve 130c are about 61.9 and 10.5% of full opening, respectively. In this situation, when the water amount of cold water decreases from 100 mℓ/sec to 80 mℓ/sec, the degree of opening of the third electronic valve 130c is changed to 13.1% of full opening to maintain the supply amount of the cold water at 10.5 mℓ/sec. If both the remaining hot water and the primarily heated hot water in the heating water tank 140 are completely used, the temperature of the hot water in the heating water tank 140 and the temperature of the hot water in the heating module 145 become a maximum supply temperature (e.g., 60° C.). In this case, the supply amounts of mixed hot water and cold water become 33 mℓ/sec and 27 mℓ/sec, respectively, and the open amounts of the second electronic valve 130b and the third electronic valve 130c are 41.3% and 27% of full opening, respectively. In this situation, when the water amount of cold water that is supplied from the cold water pipe 2 decreases to 80 mℓ/sec, the degree of opening of the third electronic valve 130c is changed to 33.8% of full opening to maintain the supply amount of the cold water at 27 mℓ/sec. When only the supply amount of cold water decreases, it is possible to provide discharge water at the temperature desired by a user through the control of the third electronic valve 130c described above.

Next, when it is determined that the water amounts of hot water and cold water are both decreased (S440), control corresponding to the reduction amount of the hot water is performed through selective control of the first to third electronic valves 130a, 130b, and 130c which corresponds to reduction of the water amount of the hot water according to steps S400 to S425 and through selective driving of the first heater 140a and the second heater 140b, and then control of the third electronic valve 130c which corresponds to the reduction amount of the cold water according to steps S430 and S435 is performed, whereby it is possible to provide discharge water at the temperature desired by a user (S445).

The water amounts of hot water and cold water increase in two cases. First, when hot water and cold water are supplied at a maximum supply water amount to a specific consumption position, the supply amounts of hot water and cold water are decreased due to another consumption position using hot water or cold water, and then when using hot water and cold water is stopped at another consumption position, the supply amounts of hot water and cold water to the specific consumption position are increased. Second, when hot water or cold water is used at a specific consumption position while hot water or cold water is used at another consumption position, hot water or cold water is supplied at a water amount less than the maximum supply water amount. In this state, when using hot water or cold water at another consumption position is stopped, the supply amount of hot water or cold water to the specific consumption position is increased.

If only the water amount of hot water is increased (S450), the controller 150 selectively changes the degrees of opening of the first electronic valve 130a to the third electronic valve 130c, whereby discharge at a temperature and a water amount desired by a user is supplied (S455).

The same conditions as the example described with reference to FIG. 3 are assumed, that is, it is assumed that primarily heated hot water heated at 80° C. is kept in the heating water tank 140 having capacity of 2400 mℓ, remaining hot water is 6400 mℓ, the temperatures of hot water and cold water measured by the first temperature sensor 120a and the second temperature sensor 120b are 30° C. and 20° C., respectively, the maximum supply water amounts of hot water and cold water are 80 mℓ /sec and 100 mℓ /sec, and the maximum supply temperature of hot water is 60° C. Further, when primarily heated hot water remains in the heating water tank 140, and when hot water is supplied at a water amount of 60 mℓ /sec through the hot water pipe 1 and cold water is supplied at a water amount of 100 mℓ / through the cold water pipe 2, it is required to open the first electronic valve 130a, the second electronic valve 130b, and the third electronic valve 130c by 55%, 82.5%, and 10.5% or 63.3%, 61.9%, and 22.9% of full opening, respectively, in order to supply discharge water at 42° C. desired by a user at an amount of 60 mℓ /sec.

In this situation, when the water amount of hot water that is supplied from the hot water pipe 1 is increased to 80 mℓ /sec, the water amount of mixed hot water that is supplied to the faucet 3 is increased from 49.5 mℓ /sec to 66 mℓ /sec or from 37.1 mℓ /sec to 49.5 mℓ /sec. Accordingly, in each case, it is required to make the water amount of discharge water be 60 mℓ by adjusting the degree of opening of the second electronic valve 130b or the third electronic valve 130c.

First, a method of decreasing the open amount of the second electronic valve 130b is described. It is required to decrease the degree of opening of the second electronic valve 130b from 82.5% to 61.9% of full opening in order to decrease the supply amount of mixed hot water to 49.5 mℓ /sec, and it is required to decrease the degree of opening of the second electronic valve 130b from 61.9% to 46.4% of full opening in order to decrease the supply amount of mixed hot water to 37.1 mℓ /sec. The supply amount of cold water is 10.5 mℓ /sec and 22.9 mℓ /sec in these cases, respectively. Accordingly, mixed hot water should become 46.7° C. and 55.6° C. in the cases, respectively, and accordingly, it is required to adjust the degree of opening of the first electronic valve 130a to be 41.3% and 47.5% of full opening in the cases, respectively. When the water amount of hot water that is supplied to the hot water pipe 1 is increased, as described above, it is possible to supply discharge water at a temperature and a water amount desired by a user by decreasing the open amounts of the first electronic valve 130a and the second electronic valve 130b.

Next, a method of decreasing the open amount of the third electronic valve 130c is described. First, since when an increase amount of mixed hot water is 16.5 mℓ /sec, the supply amount of cold water is 10.5 mℓ /sec, it is impossible to decrease cold water by a desired amount in this case. Accordingly, in this case, the third electronic valve 130c is fully closed and the degree of opening of the second electronic valve 130b is adjusted such that the water amount of mixed hot water that is supplied to the faucet 3 becomes 60 mℓ. Accordingly, the second electronic valve 130b should be opened by 75% of full opening. In this case, the temperature of mixed hot water that is supplied to the faucet 3 should be 42° C. that is a temperature desired by a user, and accordingly, when the first electronic valve 130a is opened by 36% of full opening, the temperature of mixed hot water becomes 42° C. Meanwhile, since when an increase amount of mixed hot water is 12.4 mℓ /sec, the supply amount of cold water is 22.9 mℓ /sec, in this case, it is possible to control the water amount of discharge water to be the water amount desired by a user by decreasing the supply amount cold water by 12.4 mℓ /sec. In this case, the third electronic valve 130c is opened by 10.5% of full opening to supply cold water at a water amount of 10.5 mℓ /sec to the faucet 3. In this situation, in order to supply discharge water at a temperature of 42° C. desired by a user, the temperature of mixed hot water that is supplied to the faucet 3 should be 46.7° C., and accordingly, the first electronic valve 130a is controlled to be opened by 41.3% of full opening. As described above, by selectively controlling the first electronic valve 130a, the second electronic valve 130b, and the third electronic valve 130c, it is possible to provide discharge water at a temperature and a water amount desired by a user even though the water amount of hot water that is supplied from the hot water pipe 1 is increased.

Unlikely, when only the water amount of cold water is increased (S460), the controller 150 decreases the open amount of the third electronic valve 130c, whereby discharge at a temperature and a water amount desired by a user is supplied (S465). It is assumed that the water amount of cold water is increased from 100 mℓ /sec to 120 mℓ /sec while discharge is supplied at a temperature and a water amount desired by a user. That is, when the water amount of cold water is increased 120 mℓ while the third electronic valve 130c is opened by 10.5% of full opening and cold water is supplied at a water amount of 10.5 mℓ /sec to the faucet 3, it is possible to decrease the open amount of the third electronic valve 130c to 8.5% of full opening such that the water amount of cold water that is supplied to the faucet 3 becomes 10.5 mℓ.

Meanwhile, when the water amounts of hot water and cold water that are supplied to the faucet 3 are both increased, the control method when only hot water is increased is performed and then the open amount of the third electronic valve 130c is controlled to be decreased by the increase amount of cold water with respect to full opening, whereby discharge water can be continuously supplied at a temperature and water amount desired by a user.

In the above description, the controller 150 calculates the water amounts of hot water and cold water through the water amount sensors 110a and 110b positioned in the hot water pipe 1 and the cold water pipe 2, respectively. Unlikely, the water amounts of hot water and cold water may be measured using a pressure sensor instead of a water amount sensor.

For example, a water amount according to water pressure may be derived sing Equation 9 and Equation 10.

$$P = \frac{V^2}{20g}$$ [Equation 9]

wherein, P is a water pressure (1000 g/cm$^2$), V is a flow speed (cm/s), and g is gravitational acceleration (9.8 m/s$^2$)

$$Q = 14A\sqrt{P}$$ [Equation 10]

wherein, Q is a volume water amount and A is the cross-sectional area of a pipe.

Equation 11 can be derived from Equations 9 and 10.

$$Q = K\sqrt{P}$$ [Equation 11]

wherein, since $K=0.6597d^2$ (d is the inner diameter of a pipe), it can be seen that a water pressure is proportioned to a square of a water amount.

For example, when the inner diameter of a pipe is 15 mm and a water pressure is 0.5 kg/cm², the water amount is 470 ml/sec.

Accordingly, when water pressures measured by the first pressure sensor and the second pressure sensor are A kg/cm² and B kg/cm² and A is smaller than B, the water amount ratio of hot water and cold water is A:B/A. The water amounts and a water amount ratio of hot water and cold water can be calculated from the above relationship.

Meanwhile, when controlling valves in accordance with variations of water amounts of hot water and cold water, water pressure variations of hot water and cold water, etc., there may be a problem that it is required to excessively frequently adjust the degrees of opening of the valves in order to immediately cope with the variations. In order to prevent this problem, it is preferable to control the valves only when the temperature of discharge water according to variations is higher by a predetermined reference variation (e.g., ±3° C.) or more than the temperature of discharge water in a normal state or water amount variations of hot water and cold water are larger than a predetermined reference variation (e.g., a water amount variation of ±10%) even though the temperature or the water amounts of hot water and cold water are changed after the temperature of discharge water according to the rotation amount of faucet knot reaches the normal state.

Meanwhile, the faucet control device according to the present invention may differently set the target temperature of discharge water, depending on seasons or users. For example, one user may feel discharge water at 30° C. hot in summer but feel the discharge water a little bit cold in winter. Accordingly, it is preferable to adaptively set the target temperature of discharge water, depending on seasons, for user-friendly control. For example, the target temperature of discharge water depending on the rotation amount of a faucet knob may be decreased by 10% in summer and may be increased by 10% in winter. Of course, this control may be performed on the basis of not only seasons, but an interior temperature of the temperature of the place where a faucet is positioned. For example, when the temperature of the place where a faucet is positioned is lower than a specific setting temperature (e.g., 30° C.), it is possible to increase the target temperature of discharge water according to the rotation amount of a faucet knob by 10%, and when the temperature is the setting temperature or more, it is possible to increase the target temperature of discharge water by 10%.

This control may be applied in the same way even though the rotation information of a faucet knob is input from a user through a specific input device or a target temperature and a target water amount of discharge water are directly input. Further, when the rotation information of a faucet knob is input from a user through a specific input device or a target temperature and a target water amount of discharge water are directly input, it is possible to differently set the target temperature of discharge water for each user. That is, by expecting and analyzing a temperature and a water amount of discharge water that each of users prefers, it is possible to control a target temperature and a target water amount of discharge water according to the same rotation amount of faucet knob to be different for each of the users. In this case, when the input device is a smartphone, it is possible to easily find out information about a user by automatically receiving the information of the user from the smartphone. Unlikely, when a control panel is used as the input device, it is possible to set a user through the control panel.

The faucet control device 100 according to an embodiment of the present invention can receive information corresponding to vertical and horizontal rotation amounts of a faucet knob instead of the faucet knobby that from a user through a specific input device. Further, it may be possible to receive a temperature and a water amount of discharge water desired by a user from the user instead of information corresponding to vertical and horizontal rotation amounts of a faucet knob. In this case, the specific input device may be a smartphone, a control panel having an input device and an output device, etc. When a smartphone is used as the input device, it is preferable to install an application for controlling the faucet control device 100 according to the present invention in the smartphone. A cold water temperature, a hot water temperature, a cold water amount, a hot water amount, a discharge water temperature, a discharge water amount, etc. are selectively displayed on the output device of the control panel, depending on selection by a user or a setting state. Further, the input device of the control panel may be a touch screen, a voice recognition device, a button input device, etc. In this case, the faucet control device 100 according to the present invention may include a communication unit for transmitting/receiving data to/from the input device and the output device, and a device that can performed wired or wireless communication, including a Bluetooth module, a WiFi module, etc. may be employed as the communication unit.

Figure 6:
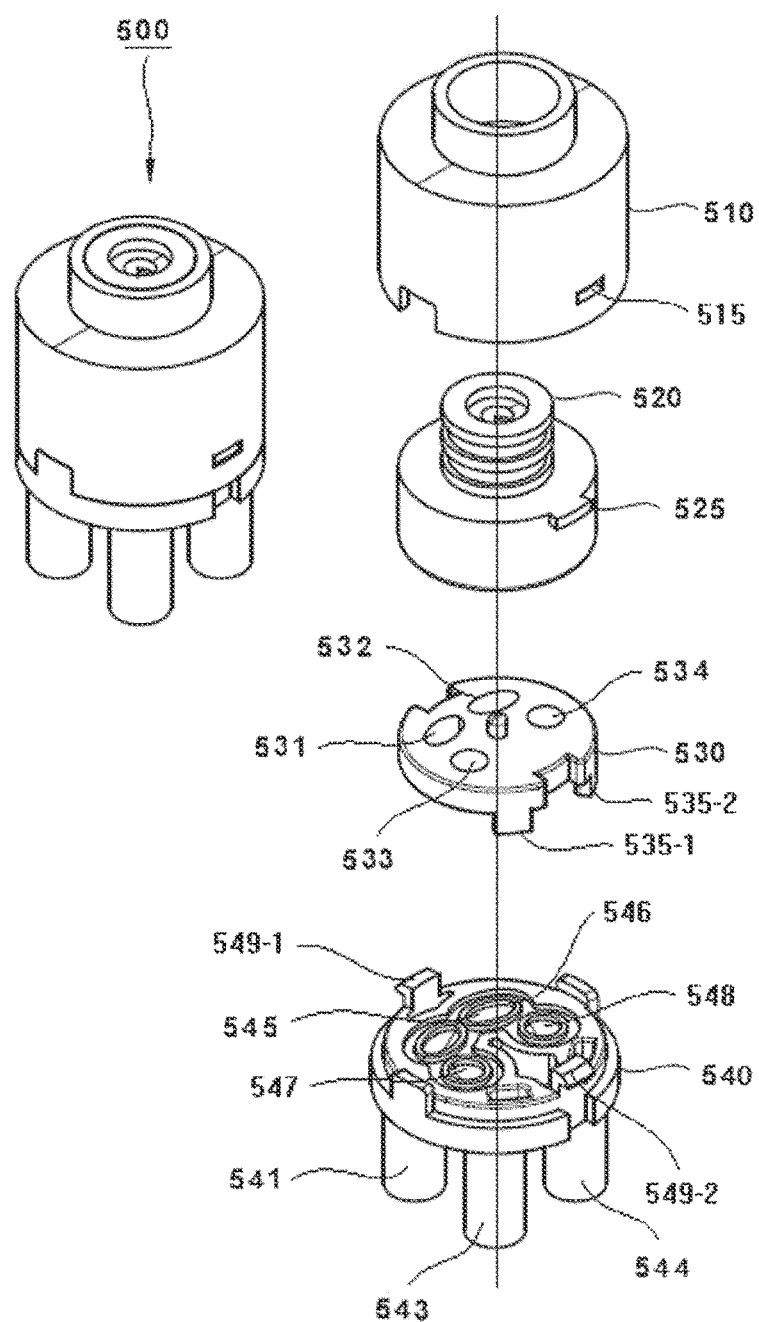
FIG. 6 is a view showing an electronic valve according to an embodiment of the present disclosure.

FIGS. 6 and 7 are view showing an example of an electronic valve that is used when mixed hot water and cold water are supplied to a faucet 3 by one electronic valve at a position from which mixed hot water and cold water are supplied to the faucet 3.

Referring to FIGS. 6 and 7, an electronic valve 500 according to an embodiment of the present invention includes an upper case 510, a temperature adjuster 520, a connector 530, and a lower case 540.

The upper case 510 has a space therein and accommodates the temperature adjuster 520 and the connector 530. The upper case 510 has cylindrical shape and is formed such that the diameter of the upper portion is smaller than the diameter of the lower portion. An upper module of the temperature adjuster 520 is inserted and rotatably fixed in the cylinder having a small diameter and formed at the upper portion of the upper case 510. In this configuration, the outer surface of the upper module of the temperature adjuster 520 and the inner surface of the cylinder having a small diameter and formed at the upper portion of the upper case 510 are in contact with each other, so a plurality of grooves is formed circumferentially on the outer surface of the upper module of the temperature adjuster 520, whereby the friction surface with the inner surface of the cylinder having a small diameter and formed at the upper portion of the upper case 510 is decreased and smooth rotation of the temperature adjuster 520 is secured. Further, when a plurality of ring bearings is installed circumferentially on the outer surface of the upper module of the temperature adjuster 520, it is possible to further decrease friction with the inner surface of the cylinder having a small diameter and formed at the upper portion of the upper case 510. A lower module of the temperature adjuster 520 is in contact with the inner surface of the upper portion of the upper case 510. It is preferable to form a plurality of grooves or install a plurality of ring bearings circumferentially on the top of the lower module of the temperature adjuster in order to decrease friction with the inner surface of the upper portion of the upper case 510.

A coupling groove in which a linear motor (not shown) is coupled is formed on the top of the upper module of the temperature adjuster 510 and the temperature adjuster 520 is rotated in correspondence to rotation of the linear motor. A locking step 525 is formed at the upper portion of the upper module of the temperature adjuster 5210 and a plurality of stoppers is installed at corresponding positions on the inner surface of the upper case 510. The temperature adjuster 520 is rotated within a predetermined angle range with respect to the upper case 510 by the locking step 525 and the stoppers. Further, as shown in FIG. 6, a plurality of channels 521 and 522 having a cut donut shape is formed on the bottom of the lower module of the temperature adjuster 520. A first channel 521 of the plurality of channels 521 and 522 controls the flow of hot water between a hot water inlet 531 and a hot water outlet 533 formed at the connector 530 in accordance with the rotation state of the temperature adjuster 520, and a second channel 522 controls the flow of cold water between a cold water inlet 532 and a cold water outlet 534 formed at the connector 530 in accordance with the rotation state of the temperature adjuster 520. An example of adjusting a mixing ratio of hot water and cold water according to the rotation amount of the temperature adjuster 520 for the connector 530 is shown in FIG. 8.

Figure 8:
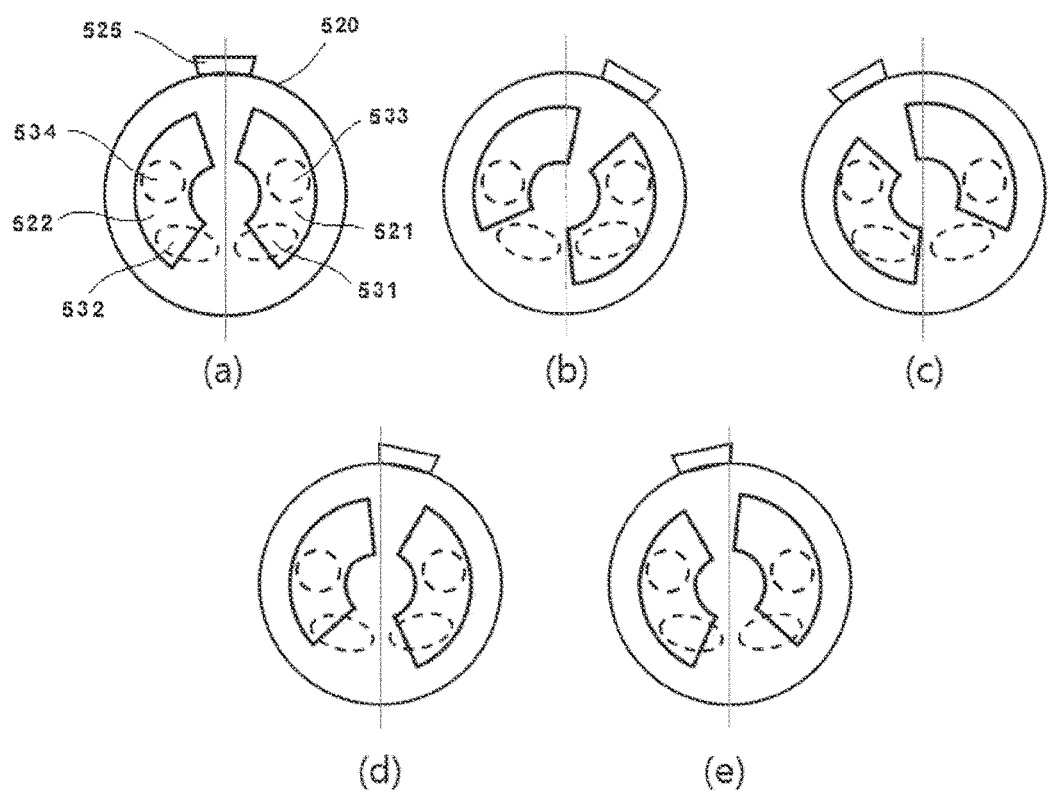
FIG. 8 is a view showing an example of controlling the water amounts of hot water and cold water according to rotation of the electronic valve according to an embodiment of the present disclosure.

Referring to FIG. 8, when the channels 521 and 522 formed on the bottom of the temperature adjuster 520, and the hot water inlet 531, the cold water inlet 532, the hot water outlet 533, and the cold water outlet 534 formed at the connector 530 are positioned symmetrically to each other (FIG. 8 (a)), the hot water inlet 531 and the cold water inlet 532 are each open half in the same way. Accordingly, when hot water and cold water flow inside at water amounts of 40 mL/sec and 80 mL/sec through the hot water inlet 531 and the cold water inlet 532, hot water and cold water are discharged at 20 mL/sec and 40 mL/sec through the cold water inlet 532 and the cold water outlet 534, respectively. Meanwhile, when the linear motor connected to the temperature adjuster 520 is rotated 30° clockwise (FIG. 8 (b)), hot water flowing into the hot water inlet 531 is completely discharged to the hot water outlet 533, and cold water is not discharged to the cold water outlet 534 because a channel is not formed between the cold water inlet 532 and the cold water outlet 534. On the contrary, when the linear motor connected to the temperature adjuster 520 is rotated 30° counterclockwise (FIG. 8 (c)), cold water flowing into the cold water inlet 532 is completely discharged to the cold water outlet 534, and hot water is not discharged to the hot water outlet 533 because a channel is not formed between the hot water inlet 531 and the hot water outlet 533. Further, when the linear motor connected to the temperature adjuster 520 is rotated 12° clockwise (FIG. 8 (d)), about 90% of hot water flowing in the hot water inlet 531 is discharged to the hot water outlet 533 and about 10% of cold water flowing in the cold water inlet 532 is discharged to the cold water outlet 534. Unlikely, when the linear motor connected to the temperature adjuster 520 is rotated 12° counterclockwise (FIG. 8 (e)), about 10% of hot water flowing in the hot water inlet 531 is discharged to the hot water outlet 533 and about 90% of cold water flowing in the cold water inlet 532 is discharged to the cold water outlet 534. As described above, it is possible to adjust the mixing ratio of hot water and cold water by adjusting the rotation direction and rotation amount of the temperature adjuster 520. The rotation direction and rotation amount of the temperature adjuster 520 are controlled by the controller 150.

The connector 530 is coupled to the lower case 540. To this end, inserting portions 5351- and 535-2 are formed on the edge of the bottom of the connector 530. The inserting portions 5351- and 535-2 are inserted in coupling grooves formed at corresponding positions on the top of the lower case 540, respectively, so that the connector 530 is fixed to the lower case 540. Meanwhile, a protrusion is formed at the center of the top of the connector 530 and is coupled in a protrusion insertion hole formed on the bottom of the temperature adjuster 520. Accordingly, the temperature adjuster 520 is rotated on the protrusion formed on the top of the connector 530. The connector is rotatably in contact with the temperature adjuster 520 and is made of a material having a low friction coefficient and high elasticity to prevent leakage of hot water and cold water.

The lower case 540 is coupled to the upper case 510. To this end, fastening protrusions 549-1 and 549-2 are formed on the edge of the top of the lower case 530. The fastening protrusions 549-1 and 549-2 are inserted in coupling grooves 515 formed at corresponding positions on the side of the upper case 510. A hot water inlet 545, a cold water inlet 546, a hot water outlet 547, and a cold water outlet 548 that correspond to the hot water inlet 531, the cold water inlet 532, the hot water outlet 533, and the cold water outlet 534 that are formed at the connector 530 are formed on the top of the lower case 540. In this configuration, a rubber ring is fitted on the outer surface of each of the hot water inlet 545, the cold water inlet 546, the hot water outlet 547, and the cold water outlet 548 to prevent leakage. Further, a hot water inlet pipe 541, a cold water inlet pipe 542, a hot water outlet pipe 543, and a cold water outlet pipe 544 are mounted on the bottom of the lower case, and these pipes communicate with the hot water inlet 545, the cold water inlet 546, the hot water outlet 547, and the cold water outlet 548, respectively, through channels formed in the lower case 540.

Hereinafter, a method of controlling a faucet using the electronic valve (hereinafter referred to as a 'fourth electronic valve') described with reference to FIGS. 6 to 8 without the second electronic valve 130b and the third electronic valve 130c is described. In this case, the pipeline through which hot water is discharged is connected with a hot water inlet pipe 541 of the fourth electronic valve 500 and the pipeline through which discharge cold water is connected with a cold water inlet pipe 542 of the fourth electronic valve 500. Further, a hot water outlet pipe 543 of the fourth electronic valve 500 is connected with the hot water pipe of the faucet 4 and a cold water outlet pipe 544 is connected with the cold water pipe of the faucet 3.

First, what water amount hot water and cold water, which flows in the hot water inlet pipe 541 and the cold water inlet pipe 542 are discharged at to the hot water outlet pipe 543 and the cold water outlet pipe 544 in accordance with the rotation amount of the temperature adjuster 520 is described. Hot water flowing in the hot water inlet 531 is set to be completely discharged to the hot water outlet 533 when the linear motor connected to the temperature adjuster 520 is rotated 30° clockwise, and cold water flowing in the cold water inlet 532 is set to be completely discharged to the cold water outlet 534 when the linear motor connected to the temperature adjuster 520 is rotated 30° counterclockwise. Further, when the state in which the linear motor connected to the temperature adjuster 520 is rotated 30° clockwise is set as 0°, the state in which the linear motor connected to the temperature adjuster 520 is rotated 30° counterclockwise is 60°. In this case, when hot water flows at a water amount of x ㎖/sec into the hot water inlet pipe 541 and cold water flows at a water amount of y ㎖/sec into the cold water inlet pipe 542, the water amounts of hot water and cold water that are discharged to hot water outlet pipe 543 and the cold water outlet pipe 544 are obtained by the following equation.

$$X = x\left(1 - \frac{k}{60}\right), Y = y\frac{k}{60} \quad \text{[Equation 12]}$$

wherein, X is the water amount of hot water that is discharged to the hot water outlet pipe 543, Y is the water amount of cold water that is discharged to the cold water outlet pipe 544, and k is the rotation amount of the temperature adjuster 530.

In this condition, when the temperatures of hot water and cold water that are discharged to the hot water outlet pipe 543 and the cold water outlet pipe 544 are a° C. and b° C., respectively, the temperature of mixed water of the hot water and the cold water can be obtained by the following equation.

$$T = \frac{aX + bY}{X + Y} \quad \text{[Equation 13]}$$

Meanwhile, the fourth electronic valve 500 performs only a function of adjusting only the temperature of mixed water by adjusting the mixing ratio of hot water and cold water, a water adjuster should be provided behind the fourth electronic valve 500. The first electronic valve 130a described with reference to FIG. 1 may be employed as the water amount adjuster. Further, it is possible to use a cartridge that is used for common faucets as the water adjuster, and in this case, the function of adjusting the mixing ratio of hot water and cold water in correspondence to the horizontal rotation amount of faucet knob is removed and the cartridge performs only the function of adjusting the water amount of mixed water of hot water and cold water in correspondence of the vertical rotation amount of a faucet knob.

For example, the operation of controlling the fourth electronic valve 500 by means of the controller 150 when water in the heating water tank 140 having a capacity of 2400 ㎖ is heated and maintained at 80° C. by the first heater 140a is described. It is assumed in the following description that remaining hot water remaining in the pipeline between a supply point of hot water and the heating water tank 140 is 6400 ㎖, the first electronic valve 130a is controlled to distribute hot water supplied from the hot water pipe 1 to the heating water tank 140 and the heating module 150, the temperatures of hot water and cold water measured by the first temperature sensor 120a and the second temperature sensor 120b are 30° C. and 20° C., respectively, the maximum supply water amounts of hot water and cold water are 80 ㎖/sec and 100 ㎖/sec, and the maximum supply temperature of hot water is 60° C.

When a desired temperature and a desired water amount of discharge water set by a user are 42° C. and 60 ㎖/sec, respectively, the controller 150 checks whether the temperature of mixed hot water of the primarily heated hot water in the heating water tank 140 and the secondarily heated hot water by the heating module 145 can reach the desired temperature of discharge water set by the user until the remaining hot water is completely used. If it is determined as being possible, the controller 150 sets the desired temperature and the desired water amount of discharge water set by the user as a target temperature and a target water amount of discharge water. However, when it is determined as being impossible, the target temperature of discharge water is set lower than the desired temperature of discharge water set by the user or the target water amount of discharge water is set smaller than the target water amount of discharge water set by the user.

In the above example, the time that remaining hot water takes to be completely used is 106.7 seconds, and accordingly, primarily heated hot water in the heating water tank 140 has only to be completely used slower than 106.7 second. Accordingly, water is discharged maximally at 22 ㎖/sec from the heating water tank 140, it takes 109 seconds to completely use primarily heated hot water of 2400 ㎖. In this case, the temperature of mixed hot water that is supplied to the fourth electronic valve 500 is 43.75° C. and it is possible to obtain the rotation amount of the temperature adjuster 520 of the fourth electronic valve 500 from Equation 12 and Equation 13. In this case, the rotation amount of the temperature adjuster 520 of the fourth electronic valve 500 is calculated as 0.2°. In this case, the water amount of hot water and cold water that are discharged to the hot water outlet pipe 543 and the cold water outlet pipe 544 are 79.7 ㎖/sec 0.33 ㎖/sec, respectively. Accordingly, the water amount controller installed behind the fourth electronic valve 500 controls mixed water at a temperature of 42° C. and at a water amount of 80.03 ㎖/sec to be discharged at 60 ㎖/sec that is a water amount set by a user.

If both the remaining hot water and the primarily heated hot water in the heating water tank 140 are completely used and the normal state is reached, the temperature of the hot water in the heating water tank 140 and the temperature of the hot water in the heating module 145 become a maximum supply temperature (e.g., 60° C.). In this case, when the rotation amount of the temperature adjuster 520 of the fourth electronic valve 500 is set as 23.7°, the water amounts of hot water and cold water that are discharged from the hot water outlet pipe 543 and the cold water outlet pipe 544 become 48.4 ㎖/sec and 39.5 ㎖/sec, respectively. Accordingly, the water amount controller installed behind the fourth electronic valve 500 controls mixed water at a temperature of 42° C. and at a water amount of 87.9 ㎖/sec to be discharged at 60 ㎖/sec that is a water amount set by a user.

It is apparent to those skilled in the art that a method of controlling a corresponding rotation amount of the fourth electronic valve 500 when at least one of the water amount of hot water and the water amount of cold water while the faucet 3 is used before and after the normal state is reached can be obtained by referring to the contents described with reference to FIGS. 3 and 4, and Equation 12 and Equation 13.

Meanwhile, it is assumed that the water amounts of hot water, cold water, mixed hot water, mixed water, etc. linearly correspond to the open amounts of valves in the following description. However, when the open amount of a valve decreases to a predetermined level or less, the water amount is linearly changed. For example, when the open amount of a valve is 50%, a half of the inflow water amount is supplied through the valve, but when the open amount of a valve is 10%, a water amount less than 10% of the inflow water amount is supplied through the valve. Accordingly, it is preferable to determine the open amount of a valve in consideration of this difference. Further, it may be possible to set not to consider this difference when the temperature and water amount of discharge water that are generated by this difference is within a preset error range (e.g., a temperature of ±2° C. and a water amount of ±5 ㎖/sec).

Meanwhile, when the faucet 3 is a common faucet having a cartridge, the mixing ratio of hot water and cold water and the water amount of mixed water that depend on the cartridge in correspondence to the horizontal and vertical rotation amount of a knob are finally changed by the faucet 3. In this case, by approximately controlling the second electronic valve 130b and the third electronic valve 130c on the basis of the following equation, it is possible to supply discharge water at a target temperature and a target water amount.

adjusted water amount of hot water: QH0
adjusted water amount of cold water: QL0
horizontal rotation angle of faucet knob: θH
maximum horizontal rotation angle of faucet knob: θHmax When θH/θHmax≥0.5, the third electronic valve is maintained as it is and the second electronic valve is additionally opened by the ratio of θHmax/(2θH), whereby the discharge amount of QH0 is increased such that the amount of hot water to be finally mixed is not changed. When θH/θHmax<0.5, the second electronic valve is maintained as it is, the third electronic valve is additionally opened by the ratio of θHmax/(2(θHmax−θH)), whereby the discharge amount of QL0 is increased such that the amount of cold water to be finally mixed through the faucet is not changed.

Meanwhile, since the heating module 145 of the heating water tank 140 is sealed against the hot water pipe 1 and the second electronic valve 130b (or the electronic valve for temperature control), as the water in the heating water tank 140 is heated, the volume is increased, so excessive high pressure is applied to the heating water tank 140, the heating module 145, and the pipeline between the hot water pipe 1 and the second electronic valve 130b. This may cause damage to the device, so it is required to decrease the pressure to an appropriate level (e.g., 1.5 times the hot water supply pressure). To this end, it is preferable to install a bypass pipe connecting the heating water tank 140 and the hot water pipe 1 and to install a one-way valve, which allows water to flow only to the hot water pipe 1 from the heating water tank 140, in the bypass pipe when the second electronic valve 130b is used. In this case, as the one-way pipe, a valve that is opened when a pressure higher than a first reference pressure (e.g., 1.2 times the hot water supply pressure) may be employed. Of course, instead of installing a bypass pipe, it may be possible to decrease the pressure in the heating water tank 140 to the first reference pressure or less by opening the second electronic valve 130b when the pressure in the heating water tank 140 reaches the first reference pressure. Further, it may also be possible to decrease the pressure in the heating water tank 140 by installing a bypass pipe even if an electronic valve for temperature adjustment is employed. However, in this case, it is possible to decrease the pressure in the heating water tank 140 to an appropriate level or less by adjusting the electronic valve for temperature adjustment such that mixed hot water is supplied to the cold water pipe 2. To this end, a pressure sensor should be installed in the heating water tank 140 and the controller 150 controls the second electronic valve 130b or the electronic valve for temperature adjustment on the basis of a vale input from the pressure sensor. If the value input from the pressure sensor reaches an appropriate level, the controller 150 stops the operation of the heater 140a mounted in the heating water tank 140, thereby preventing the volume of water in the heating water tank 140 from additionally increasing and correspondingly preventing the pressure in the heating water tank 140 from increasing.

Meanwhile, when it is configured to control the discharge amounts of mixed hot water and cold water using the second electronic valve 130b and the third electronic valve 130c, it is impossible to use water in a power failure or breakdown. In order to cope with this situation, the device is configured such that a 3-way valve is installed at each of points at which the hot water pipe 1 and the cold water pipe 2 are connected with the device according to the present disclosure, hot water that is supplied from the hot water pipe 1 and cold water that is supplied from the cold water pipe 2 are sent to the device according to the present invention in a normal situation, and a user adjusts knobs mounted on the 3-way valves, respectively, in person in a power failure or breakdown such that hot water that is supplied from the hot water pipe 1 and cold water that is supplied from the cold water pipe 2 are supplied to the faucet through the bypass pipe. In this configuration, the device may be configured such that when a driver additionally rotates the knob of the 3-way valve in the same direction with the knob of the 3-way valve changed to a position for a power failure or breakdown by the user, the discharge amounts of hot water and cold water can be adjusted. This configuration may be applied in the same way when an electronic valve for temperature adjustment is employed. Unlikely, the device may be configured such that when an electronic valve for temperature adjustment is employed and water amount adjustment is made by the knob mounted on a faucet, power is supplied to the controller 150 and the an electronic valve for temperature adjustment is employed by an auxiliary battery in a power failure or breakdown without installing a 3-way valve and a bypass pipe and the electronic valve for temperature adjustment is driven to a position for mixing mixed hot water and cold water at 1:1 so that water can be continuously used.

FIGS. 9 to 12 are views showing the configuration of a faucet control device according to another embodiment of the present disclosure.

Figure 9:
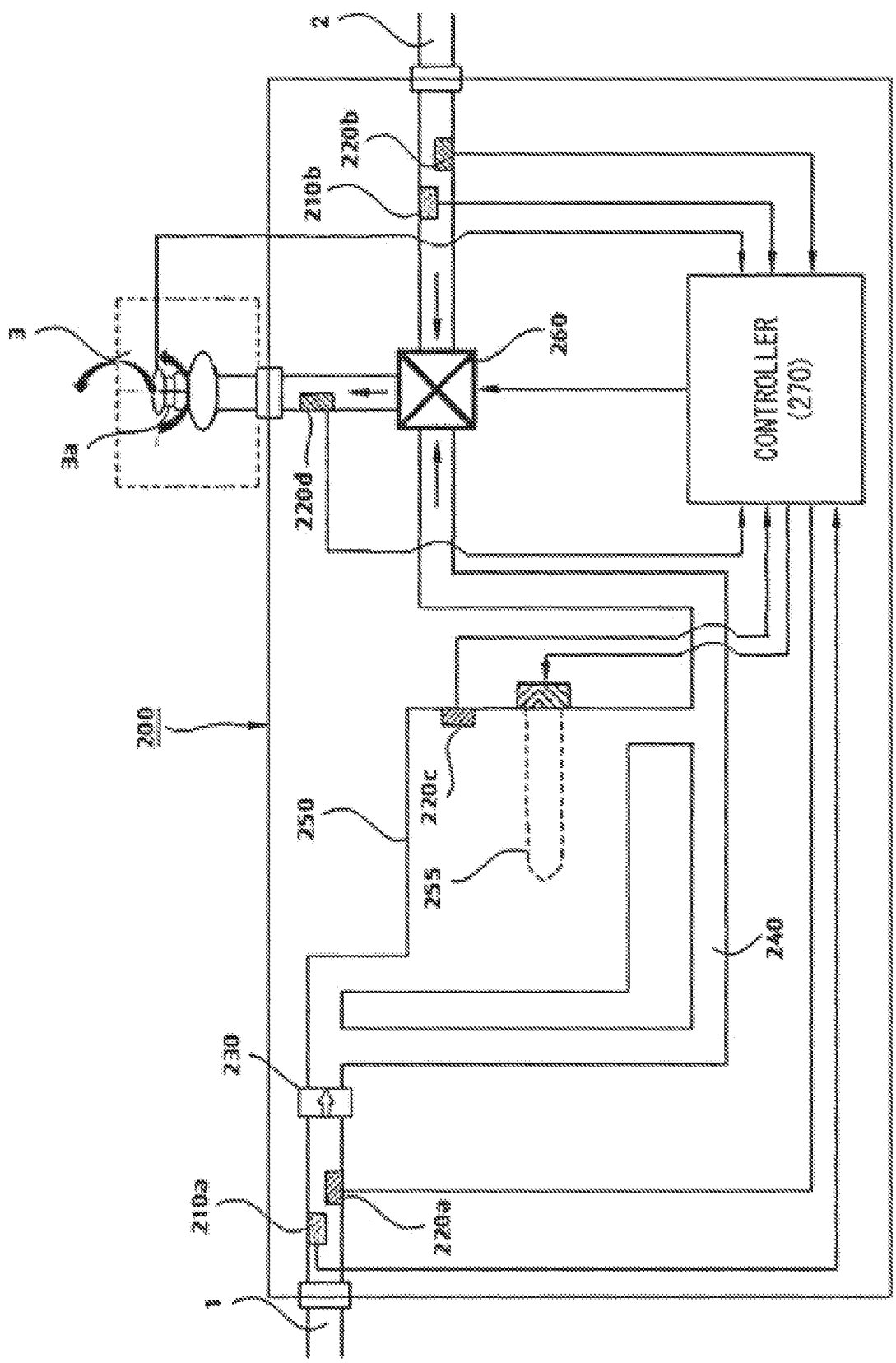
FIGS. 9 to 12 are views showing the configuration of a faucet control device according to another embodiment of the present disclosure.

Referring to FIG. 9, a faucet control device 200 according to another embodiment of the present invention includes a temperature/water amount setter 3a, a plurality of water amount sensors 210a and 210b, a plurality of temperature sensors 220a to 220d, a direction control valve 230, a direct hot water pipe 240, a heating water tank 250, a heater 255, an electronic valve 260, and a controller 270.

The temperature/water amount setter 105 is a component through which a user sets a desired temperature and a desired water amount of discharge water. The temperature/water amount setter 3a shown in FIG. 9 is a rotation angle measurement sensor coupled to a knob of a common faucet 3. The rotation angle measurement sensor is a component for measuring the horizontal and vertical rotation angles of a faucet knob. However, unlike the embodiment described with reference to FIG. 2, in the present disclosure, the temperature/water amount setter 3a measures and provides only the horizontal rotation angle of a faucet knob to the controller 270. The controller 270 calculates a desired temperature desired by a user on the basis of the horizontal rotation direction of a faucet knob and the rotation amount thereof input from the temperature/water amount setter 3a. The operation of measuring the horizontal rotation angle of a faucet knob by the temperature/water amount setter 3a is the same as the operation of measuring the horizontal rotation angle of a faucet knob described with reference to FIG. 2. Meanwhile, the desired water amount of discharge water is physically adjusted in accordance with the vertical rotation amount of a faucet knobby by a user. Accordingly, a cartridge for water amount adjustment is installed in the faucet 3 to adjust only the discharge amount of water in correspondence to the vertical rotation amount of a faucet knob. The cartridge for water amount adjustment adjusts the discharge amount of discharge water, which is supplied at a desired temperature set by a user to the faucet 3 from the electronic valve 260, in correspondence to the vertical rotation amount of the faucet knob.

Figure 10:
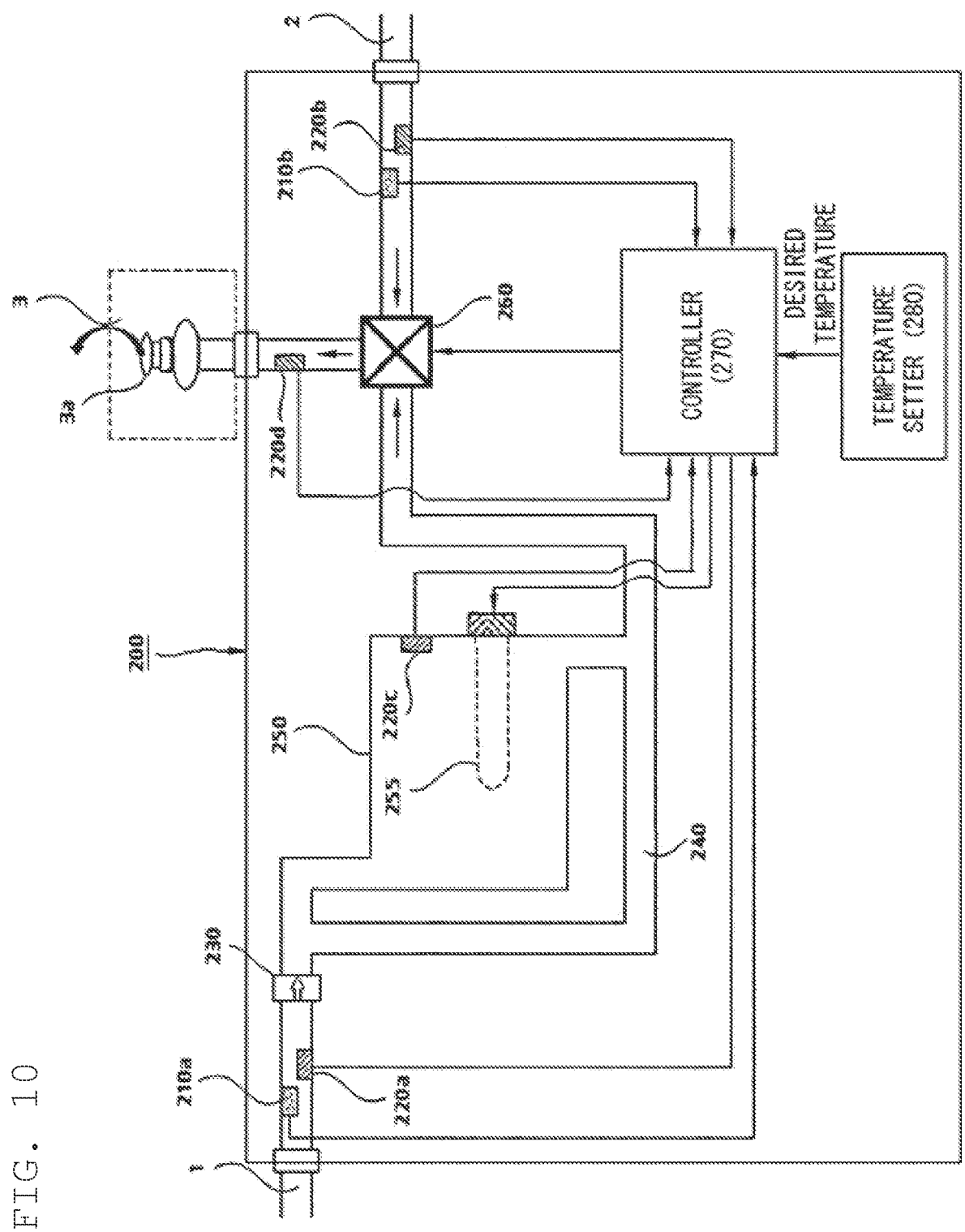

Unlikely, the faucet knob may be configured to operate only in the vertical direction and to allow a user to physically set a desired water amount of discharge water and may be configured to separately receive a desired temperature of discharge water. This embodiment is shown in FIG. 10. Referring to FIG. 10, a desired temperature of discharge water is input from a user by a temperature setter 280 installed separately from the faucet knob. The temperature setter 280 may be configured as a rotary knob, a pressing button, etc. The desired temperature of discharge water input from a user by the temperature setter 280 is input to the controller 270. Adjustment of the water amount of discharge water by the faucet knob is the same as that described with reference to FIG. 9.

The water amount sensors 210*a* and 210*b* measure the water amounts of hot water and cold water that are supplied to the faucet control device 200 from the hot water pipe 1 and the cold water pipe 2, respectively. In the following description, the water amount sensor 210*a* that measures the water amount of hot water that is supplied from the hot water pipe 1 is referred as a first water amount sensor and the water amount sensor 110*b* that measures the water amount of cold water that is supplied from the cold water pipe 2 is referred to as a second water amount sensor. Meanwhile, it is possible to measure the water amounts of hot water and cold water using pressure sensors instead of the water amount sensors 210*a* and 210*b*. By providing pressure sensors instead of the water amount sensors, the water pressures of hot water and cold water that are supplied from the hot water pipe 1 and the cold water pipe 2 are separately measured. A process of the water pressures of hot water and cold water measured by such pressure sensors into water amounts of the hot water and the cold water is the same as that described with reference to FIG. 1.

The temperature sensors 220*a* to 220*d* are installed in a pipeline connected with the hot water pipe 1, a pipeline connected with the cold water pipe 2, and pipelines installed in the heating water tank 250 and connected between from the electronic valve 260 to the faucet 3, respectively.

A first temperature sensor 220*a* is installed at a hot water inlet through which hot water flows inside, and measures the temperature of hot water that is supplied through the hot water pipe 1. Immediately after hot water is used, the temperature of the hot water in the hot water pipe 1 and the temperature of the hot water in the heating water tank 250 becomes the same. Accordingly, the measurement values obtained by the first temperature sensor 220*a* and the third temperature sensor 220*c* show the same temperature. However, as time elapses from the time point when use of hot water is ended, the temperature of the hot water in the hot water pipe gradually decreases and the temperature of hot water measured by the first temperature sensor 220 also gradually decreases. In this case, when a direction control valve 230 completely prevents heat transfer between the hot water pipe 1 and the heating water tank 250, the temperature of hot water measured by the first temperature sensor 220*a* is the same as the temperature of the hot water in the hot water pipe 1. However, actually, since heat transfer is not completely prevented between the hot water pipe 1 and the heating water tank 250 with the direction control valve 230 therebetween, the temperature of hot water measured by the first temperature sensor 220*a* and the temperature of the hot water in the hot water pipe 1 are different.

The faucet control device 200 according to the present invention sets the temperature of hot water measured by the first temperature sensor 220*a* as the temperature of the hot water in the hot water pipe 1 under the assumption that the difference between the temperature of hot water measured by the first temperature sensor 220*a* and the temperature of the hot water in the hot water pipe 1 is not large. However, when the difference between the temperature of hot water measured by the first temperature sensor 220*a* and the temperature of the hot water in the hot water pipe 1 is large, this needs to be considered. To this end, the controller 270 changes the temperature of hot water measured by the first temperature sensor 220*a* to the temperature of the hot water in the hot water pipe 1 when the difference between the temperature of hot water measured by the first temperature sensor 220*a* at a time point of using hot water and the temperature of hot water measured by the first temperature sensor 220*a* with a predetermined intervals (e.g., 10 ms) after the time point of using hot water is larger than a preset first reference value (e.g., 2° C.).

Further, a second temperature sensor 220*b* is installed at a cold water inlet through which cold water flows inside, and measures the temperature of cold water that is supplied through the cold water pipe 2. A third temperature sensor 220*c* is installed in the heating water tank 250 and measures the temperature of hot water supplied to the heating water tank 250. When a considerable time passes at the time point at which use of hot water is ended, the hot water in the hot water pipe 1 and the hot water in the heating water tank 250 both decrease in temperature and reach the same temperature. Unlikely, immediately after use of hot water is ended, the hot water in the hot water pipe 1 and the hot water in the heating water tank 250 both become a maximum supply temperature (e.g., 60° C.). Meanwhile, as the heater 255 installed in the heating water tank 250 is operated, the temperature of the hot water in the heating water tank 250 measured by the third temperature sensor 220*c* increases. A fourth temperature sensor 220*d* is installed in a pipeline connected from the electronic valve 260 to the faucet 3 and outputs the temperature of discharge water that is supplied from the electronic valve 260 to the faucet 3. The measurement values measured by the first temperature sensor 220*a* to the fourth temperature sensor 220*d* are input to the controller 270.

Hot water supplied to the faucet control device 200 through the hot water pipe 1 diverges to the direct hot water pipe 240 and the heating water tank 250. It is preferable that the distribution ratio of hot water flowing from the hot water pipe 1 to the direct hot water pipe 240 and the heating water tank 250 is set in a range of 1:1 to 1:4. The distribution ratio may be adjusted in accordance with the diameter, the shape, the length, etc. of the water direct pipe 240. Further, a 3-way valve that can adjust the distribution ratio may be applied to the diverging point of the hot water supplied to the faucet control device 200 through the hot water pipe 1. In this case, the distribution ratio of the 3-way valve may be manually adjusted or automatically adjusted by a control signal that is input from the controller 270. The direction control valve 230 is installed before the diverging point of hot water and performs a function of preventing hot water that is supplied from the hot water pipe 1 from flowing backward to the hot water pipe 1 and a function of preventing or minimizing heat transfer from the heating water tank 250 to the hot water pipe 1.

Figure 11:
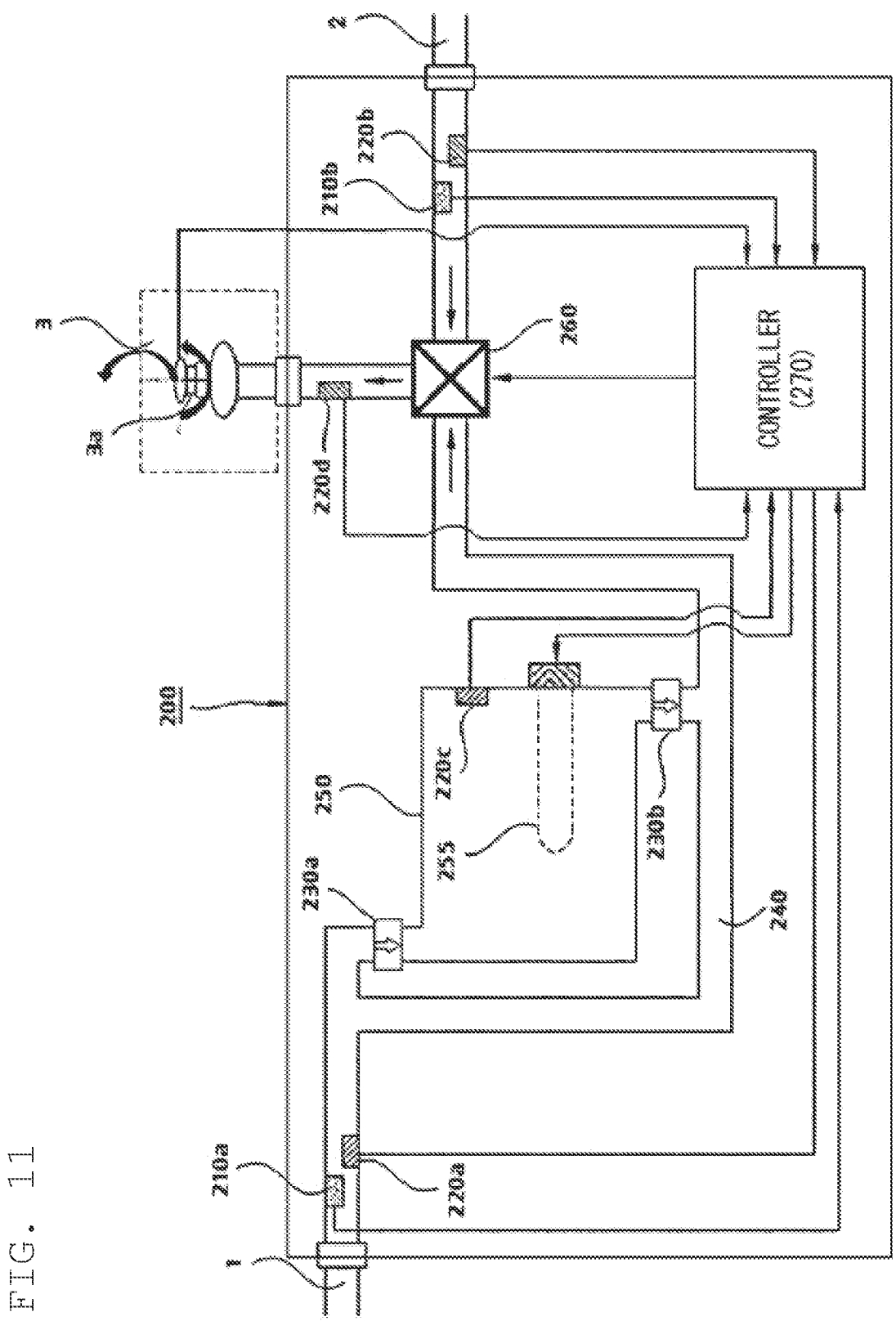

The direction control valve 230 is installed before the diverging point of hot water in the above description, but a direction control valve may be installed at each of the hot water inlet and the hot water outlet of the heating water tank 250. This embodiment is shown in FIG. 11. Referring to FIG. 11, a first direction control valve 230a is installed at the hot water inlet of the heating water tank 250 and a second direction control valve 230b is installed at the hot water outlet of the heating water tank 250. According to this configuration, it is possible to thermally isolate the heating water tank 250 from other components. The first direction control valve 230a may be a safety valve that allows water to flow only toward the heating water tank 250 from the hot water pipe 1, but discharges water in the heating water tank 250 when the pressure in the heating water tank 250 increases higher than a first reference pressure (e.g., 5 bar) such that the pressure in the heating water tank 250 decreases under a second reference pressure (e.g., 2 bar).

Figure 12:
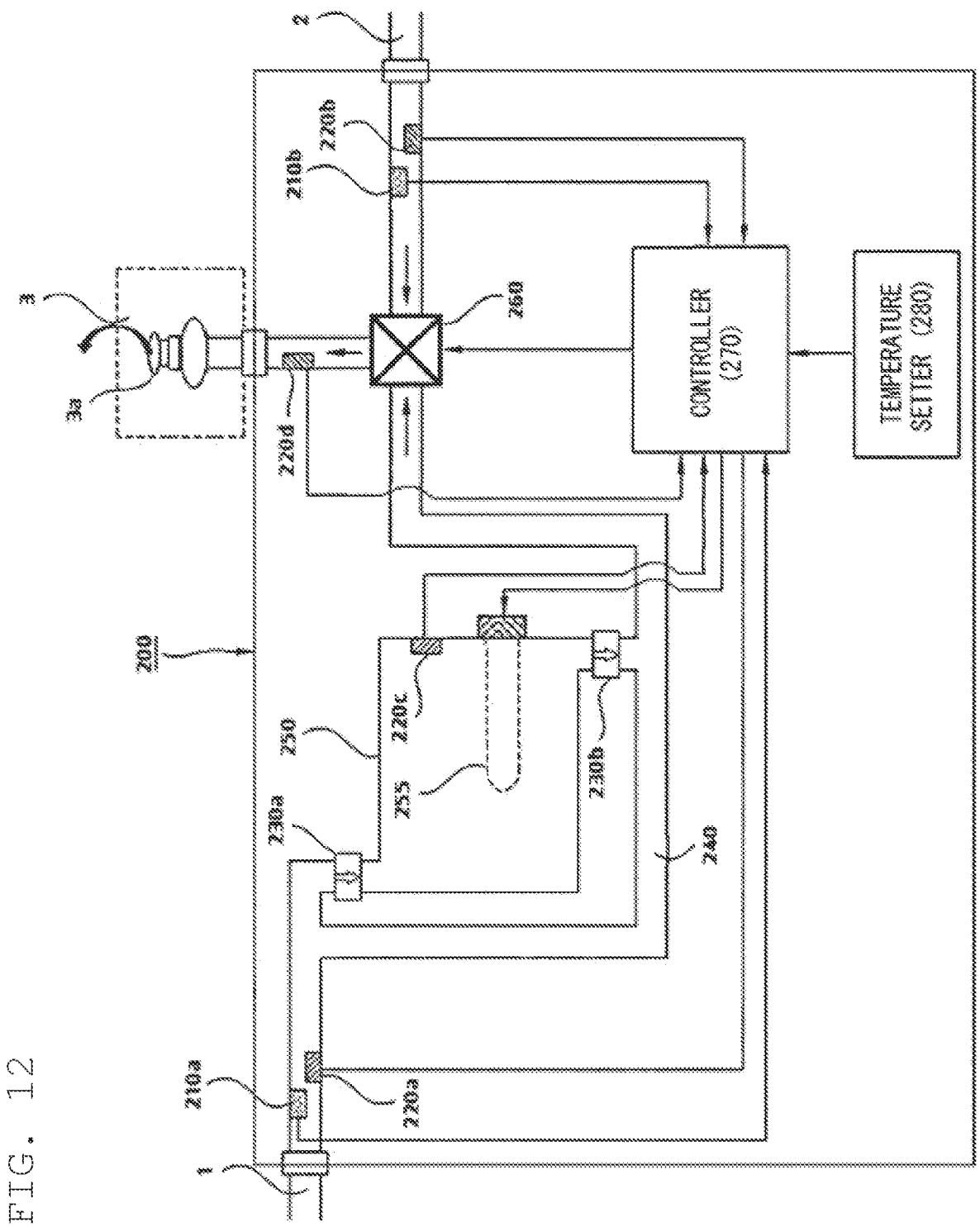

Meanwhile, a configuration combining the way of setting a desired temperature and a desired water amount of discharge water shown in FIG. 10 and the way of installing a direction control valve shown in FIG. 11 is shown in FIG. 12. Referring to FIG. 12, a desired temperature of discharge water is input from a user through a separately installed temperature setter 280, and the direction control valves 230a and 230b are installed at the hot water inlet and the hot water outlet of the heating water tank 250, respectively.

The heating water tank 250 is manufactured to have capacity that can keep a predetermined amount of water (e.g., 1.8ℓ), and the heater 255 and the third temperature sensor 220c are installed in the heating water tank 250. The water in the heating water tank 250 is heated to preset first temperature (e.g., 80° C.) by driving a heater 255 installed in the heating water tank 250 while the faucet is not operated (a user does not use water). If the temperature of the water in the heating water tank 250 reaches the first temperature, the controller 270 stops operation of the heater 255. In this state, when the temperature of the water in the heating water tank 250 drops to the preset second temperature (e.g., 40° C.), the controller 270 drives again the heater 255, thereby repeating the operation of heating the water in the heating water tank 250 up to the preset first temperature (e.g., 80° C.).

The first temperature, the second temperature, whether to drive the heater 255 are determined on the basis of the water amount of hot water remaining in the pipeline from an initial inflow point of hot water (the point at which pipes diverge to households from a central pipeline when it is a central heating and the hot water outflow point of a boiler installed in a household when it is individual heating) to the faucet 3, the initial hot water temperature, the capacity of the heating water tank 250, the water amounts of hot water and cold water, the capacity of the heater 255, etc. In this case, it is advantageous to set the first temperature as high as possible in order to secure desired temperature of discharge water, but it is preferable to set the first temperature to 90° C. or lower (e.g., 75° C.), if possible, considering the possibility that a user gets burned, heat resistance of the heating water tank 250, etc. Meanwhile, although only one heater is mounted in the heating water tank 250 in FIG. 9, a plurality of heaters may be mounted in the heating water tank 250. Further, the capacity of the heater 255 may be fundamentally determined by the capacity of the heating water tank 250 and the minimum temperature of the remaining hot water in the hot water pipe 1. For example, when the capacity of the heating water tank 250 is 1.8ℓ, the capacity of the heater 255 has only to be 940 W (the safety factor of the heater is set as 1.25) to increase temperature up to 80° C. by heating hot water of 20° C. for 10 minutes. Heated hot water heated at the first temperature in this way is kept in the heating water tank 250 and the controller 270 controls the electronic valve 260 in correspondence to the operation of the faucet 3 by a user, whereby mixed hot water of heated hot water that is supplied from the heating water tank 250 and hot water that is supplied through the hot water direction pipe 240 is supplied to the faucet 3.

Figure 13:
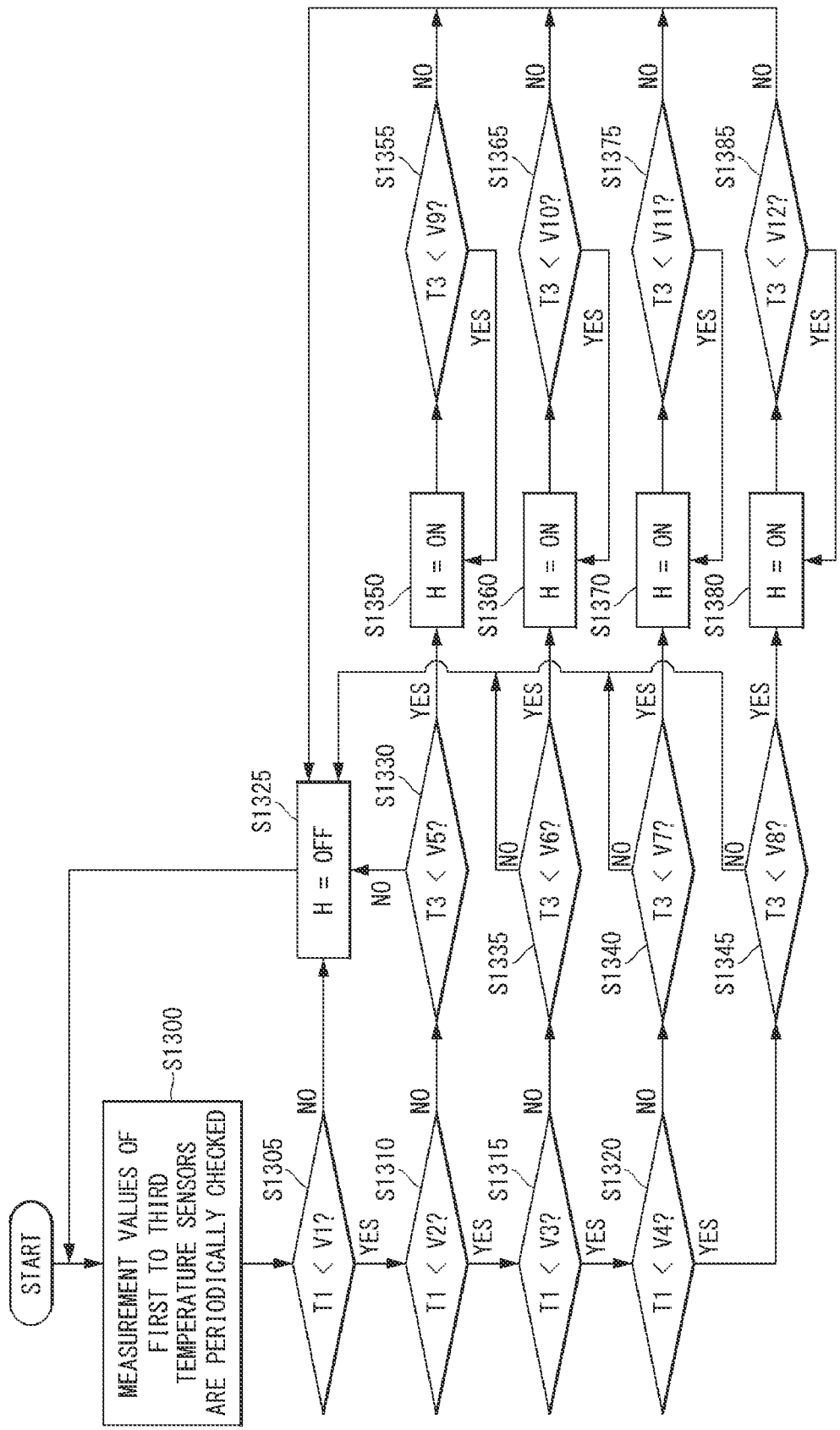
FIG. 13 is a view showing a driving method of a heater by a controller based on measurement values of a first temperature sensor and a third temperature sensor when a faucet is not used.

Meanwhile, as described above, when whether to drive the heater 255 on the basis of only the temperature measured by the third temperature sensor 220c, there is problem that hot water can be stably supplied, but power consumption is increased. In consideration of this problem, when the controller 270 determines whether to drive the heater 255 on the basis of the measurement values of the first temperature sensor 220a and the third temperature sensor 220c when the faucet 3 is not used, power consumption can be optimized. FIG. 13 is a view showing a method of driving the heater 255 through the controller 270 on the basis of the measurement values of the first temperature sensor 220a and the third temperature sensor 220c when the faucet 3 is not used.

Referring to FIG. 13, when power is supplied to the faucet control device 200 according to the present disclosure, the controller 270 periodically checks the temperature of the hot water in the hot water pipe 1 and the temperature of the hot water in the heating water tank 250 that are measured by the first temperature sensor 220a and the third temperature sensor 220c. First, the controller 270 checks whether a measurement value T1 of the first temperature sensor 220a is lower than a first reference temperature V1 (S1305). If the measurement value T1 of the first temperature sensor 220a is the first reference temperature V1 or more, the controller 270 turns off the heater 255 (S1325). Unlikely, when the measurement value T1 of the first temperature sensor 220a is lower than the first reference temperature V1, the controller 270 checks whether the measurement value T1 of the first temperature sensor 220a is lower than a second reference temperature V2 (S1310). If the measurement value T1 of the first temperature sensor 220a is the second reference temperature V2 or more, the controller 270 checks whether a measurement value T3 of the third temperature sensor 220c is lower than a fifth reference temperature V5 (S1330). When the measurement value T3 of the third temperature sensor 220c is the fifth reference temperature V5 or more in step S1330, the controller 270 turns off the heater 255 (S1325). Unlikely, when the measurement value T3 of the third temperature sensor 220c is lower the fifth reference temperature V5, the controller 270 turns on the heater 255 (S1350). Further, when the measurement value T3 of the third temperature sensor 220c becomes a ninth reference temperature V9 or more with the heater 255 turned on, the controller 270 turns off the heater 255 (S1325). Unlikely, when the measurement value T3 of the third temperature sensor 220c is lower the ninth reference temperature V9, the controller 255 keeps the heater 255 on (S1350).

When it is determined that the measurement value T1 of the first temperature sensor 220a is lower the second reference temperature V2 in step S1310, the controller 270 checks whether the measurement value T1 of the first temperature sensor 220a is lower than the third reference temperature V3 (S1315). If the measurement value T1 of the first temperature sensor 220a is the third reference temperature V3 or more, the controller 270 checks whether the measurement value T3 of the third temperature sensor 220c is lower than a sixth reference temperature V6 (S1335). When the measurement value T3 of the third temperature sensor 220c is the sixth reference temperature V6 or more in step S1335, the controller 270 turns off the heater 255 (S1325). Unlikely, when the measurement value T3 of the third temperature sensor 220c is lower the sixth reference temperature V6, the controller 270 turns on the heater 255 (S1360). Further, when the measurement value T3 of the third temperature sensor 220c becomes a tenth reference temperature V10 or more with the heater 255 turned on, the controller 270 turns off the heater 255 (S1325). Unlikely, when the measurement value T3 of the third temperature sensor 220c is lower the tenth reference temperature V10, the controller 255 keeps the heater 255 on (S1360).

When it is determined that the measurement value T1 of the first temperature sensor 220a is lower the third reference temperature V3 in step S1315, the controller 270 checks whether the measurement value T1 of the first temperature sensor 220a is lower than a fourth reference temperature V4 (S1320). If the measurement value T1 of the first temperature sensor 220a is the fourth reference temperature V4 or more, the controller 270 checks whether the measurement value T3 of the third temperature sensor 220c is lower than a seventh reference temperature V7 (31340). When the measurement value T3 of the third temperature sensor 220c is the seventh reference temperature V7 or more in step S1340, the controller 270 turns off the heater 255 (S1325). Unlikely, when the measurement value T3 of the third temperature sensor 220c is lower the seventh reference temperature V7, the controller 270 turns on the heater 255 (S1370). Further, when the measurement value T3 of the third temperature sensor 220c becomes an eleventh reference temperature V11 or more with the heater 255 turned on, the controller 270 turns off the heater 255 (31325). Unlikely, when the measurement value T3 of the third temperature sensor 220c is lower the eleventh reference temperature V11, the controller 255 keeps the heater 255 on (31370).

When it is determined that the measurement value T1 of the first temperature sensor 220a is lower the fourth reference temperature V4 in step S1320, the controller 270 checks whether the measurement value T3 of the third temperature sensor 220c is lower than an eighth reference temperature V8 (S1345). When the measurement value T3 of the third temperature sensor 220c is the eighth reference temperature V8 or more in step S1345, the controller 270 turns off the heater 255 (31325). Unlikely, when the measurement value T3 of the third temperature sensor 220c is lower the eighth reference temperature V8, the controller 270 turns on the heater 255 (S1380). Further, when the measurement value T3 of the third temperature sensor 220c becomes a twelfth reference temperature V12 or more with the heater 255 turned on, the controller 270 turns off the heater 255 (S1325). Unlikely, when the measurement value T3 of the third temperature sensor 220c is lower the twelfth reference temperature V12, the controller 255 keeps the heater 255 on (S1370).

The reference temperatures in the above description may be set as shown in the following Table. The reference temperatures may be changed by the capacity of the heating water tank 250, the volume of the remaining hot water in the hot water pipe 1, the capacity of the heater 255, the maximum heating temperature of hot water set for the heating water tank 250, the temperature of remaining hot water in the hot water pipe 1, the temperature of cold water in the cold water pipe 2, etc.

TABLE 1

| Items | Reference temperature | Items | Reference temperature | Items | Reference temperature |
|---|---|---|---|---|---|
| V1 | 35° C. | V9 | 45° C. | V9 | 50° C. |
| V2 | 30° C. | V6 | 50° C. | V10 | 60° C. |
| V3 | 25° C. | V7 | 65° C. | V11 | 70° C. |
| V4 | 20° C. | V8 | 60° C. | V12 | 75° C. |

As described above, by actively controlling turning-on/off of the heater 255 in accordance with the cooling degree of the remaining hot water in the hot water pipe 1 and the heated hot water in the heating water tank 250, it is possible to immediately supply discharge water at a temperature desired by a next user when the next user uses the faucet 3 and it is also possible to reduce the power that is consumed to drive the heater 255. As described with reference to FIG. 13, when the faucet control device 200 according to the present invention is not used, it is possible to control turning-on/off of the heater 255 on the basis of reference temperatures set in advance for the values of the first temperature sensor 220a and the third temperature sensor 220c. Unlikely, it is possible to control whether to drive the heater 255 on the basis of the minimum supply temperature of mixed hot water of remaining hot water that is supplied through the direct hot water pipe 240 and heated hot water that is supplied from the heating water tank 250, the maximum temperature of heated hot water in the heating water tank 250, the distribution ratio of hot water that is supplied through the hot water pipe 1 to the direct hot water pipe 240 and the heating water tank 250.

Figure 14:
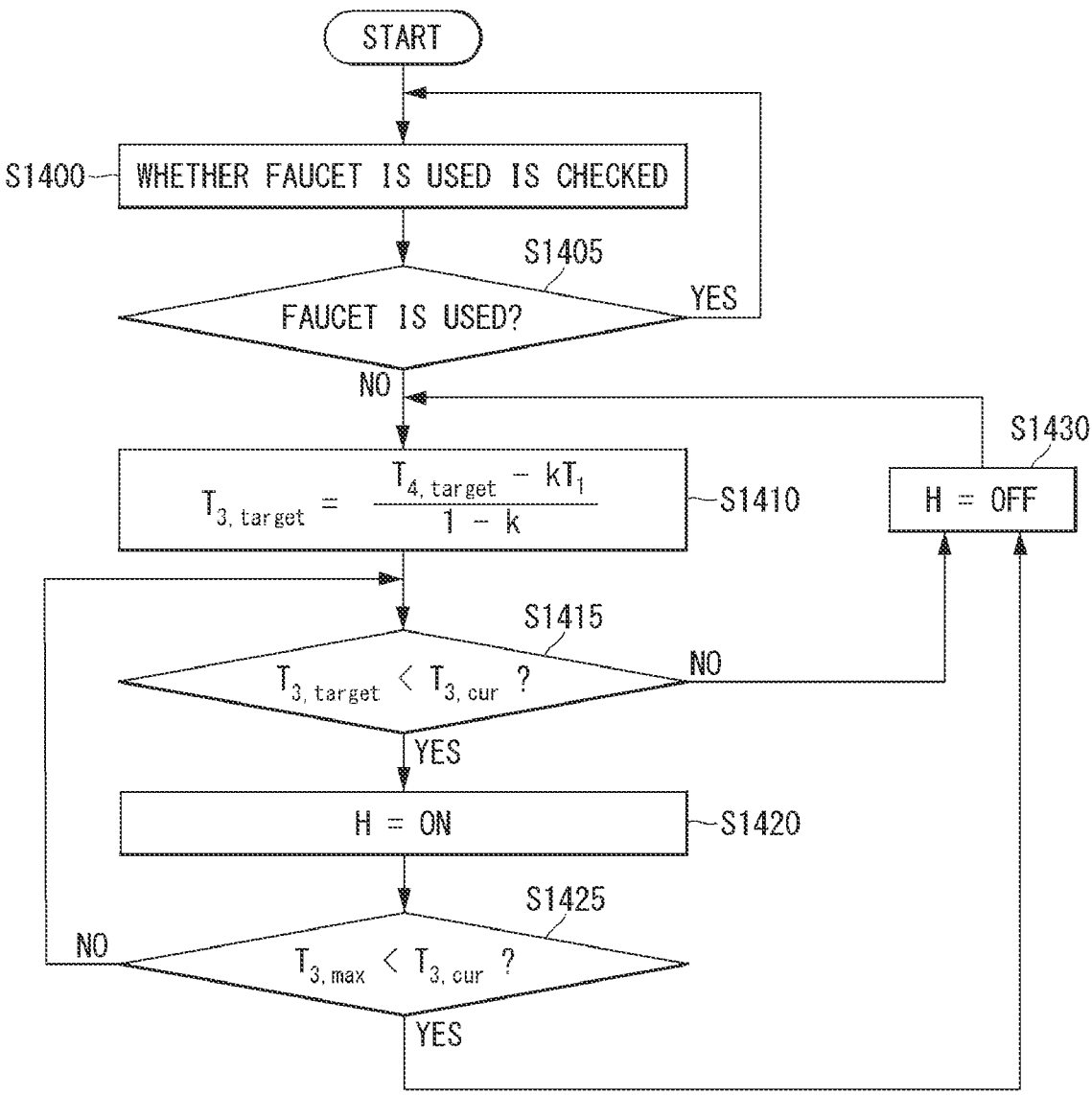
FIG. 14 is a view showing a driving method of a heater that is performed by a controller on the basis of a minimum supply temperature of mixed hot water, a maximum temperature of heated hot water, and a distribution ratio of hot water to a direct hot water pipe and a heating water tank.

FIG. 14 is a view showing a method of driving the heater 255 that is performed by the controller 270 in the method described above.

Referring to FIG. 14, the controller 270 checks whether the faucet 3 is used on the basis of flow rate values that are input from a first flow rate sensor 210a and a second flow rate sensor 210b (S1400). In this case, when a measurement value input from at least one of the first flow rate sensor 210a and the second flow rate sensor 210b is larger than 0 or a predetermined flow rate or more, the controller 270 determines that the faucet 3 is being used. Next, when it is determined that the faucet 3 is not being used (S1405), the controller 270 calculates a target heating temperature of hot water in the heating water tank 250 from the following equation (S1410).

$$T_{3,target} = \frac{T_{4,target} - kT_1}{1-k} \quad \text{[Equation 14]}$$

wherein, $T_{3,\,target}$ is a target heating temperature of hot water in the heating water tank 250, $T_{4,\,target}$ is a target supply temperature of mixed hot water, T1 is the temperature of remaining hot water in the hot water pipe 1, and k is a distribution ratio of remaining hot water that is distributed to the direct hot water pipe 240 and the heating water tank 250 from the hot water pipe 1. For example, in Equation 15, k may be set as 0.6 (i.e., the distribution ratio to the direct hot water pipe 240 and the heating water tank 250 may be 6:4) and $T_{4,\,target}$ may be set as 45° C.

Next, the controller compares the target heating temperature $T_{3,\,target}$ of hot water in the heating water tank 250 and the current temperature $T_{3,\,tur}$ of hot water in the heating water tank 250 measured by the third temperature sensor 220c (S1415). If the target heating temperature $T_{3,\,target}$ of hot water in the heating water tank 250 is lower than the current temperature $T_{3,\,tur}$ of hot water in the heating water tank 250, the controller 270 turns on the heater 255 (S1420). Unlikely, when the target heating temperature $T_3$, target of hot water in the heating water tank 250 is higher than or equal to the current temperature $T_{3, tur}$ of hot water in the heating water tank 250, the controller 270 turns off the heater 255 (S1430). After driving the heater 255, the controller 270 compares the current temperature $T_{3, tur}$ of hot water in the heating water tank 250 measured by the third temperature sensor 220c and the maximum heating temperature $T_{3, max}$ of hot water in the heating water tank 250 (S1425). Unlikely, when the current temperature $T_{3, tur}$ of hot water in the heating water tank 250 is higher than or equal to the maximum heating temperature $T_{3, max}$ of hot water in the heating water tank 250, the controller 270 turns off the heater 255 (S1430). Unlikely, when the current temperature $T_{3, tur}$ of hot water in the heating water tank 250 is lower the maximum heating temperature $T_{3, max}$ of hot water in the heating water tank 250, this process goes to step S1415.

The controller 270 appropriately controls whether to drive the heater 255 installed in the heating water tank 250 while the faucet 3 is not used in accordance with the method describe above, whereby it is possible to stably supply hot water when the faucet 3 is used later by a user while minimizing power consumption.

Meanwhile, as described with reference to FIGS. 13 and 14, when the faucet control device 200 according to the present invention is not used, the temperature of hot water in the heating water tank 250 is adjusted by appropriately turning on of off the heater 255, whereby it is possible to immediately provide discharge water at a temperature desired by a user when the user uses the faucet 3. However, when the temperature of remaining hot water in the hot water pipe 1 is excessively low, when the water amount of remaining hot water in the hot water pipe 1 becomes larger than the capacity of the heating water tank 250 in the environment in which the faucet control device 200 according to the present disclosure, or the like, the temperature of hot water that can be supplied by the faucet control device 200 according to the present invention may become lower than the temperature of discharge water desired by a user before the remaining hot water in the hot water pipe 1 is completely used. In this case, the controller 270 heats the hot water in the hot water pipe 1 by driving the heater 255 even if the faucet 1 is being used, thereby being able to secure the temperature of discharge water desired by a user.

For example, when the capacity of the heating water tank 250 is 21 ℓ, the capacity of the heater 255 is 1.5 kW, the flow rate of hot water that is supplied from the hot water pipe 1 is 100 mℓ /s, the hot water distribution between the heating water tank 250 and the direct hot water pipe 240 is 1:1, the temperature of hot water that is supplied through the hot water pipe 1 is 20° C., and the temperature of discharge water desired by a user is 38° C., and when the temperature of the hot water in the heating water tank 250 is 50° C. hot water at 50° C. is discharged at a flow rate of 50 mℓ /s from the heating water tank 250, hot water at 50° C. is discharged at a flow rate of 50 mℓ /s through the direct hot water pipe 250, and hot water at 50° C. is supplied at a flow rate of 100 mℓ /s to the electronic valve 260. Accordingly, there is a problem that hot water at a temperature lower than 38° C. that is the temperature of discharge water desired by a user is supplied even if hot water is supplied 100% to the faucet 1 by controlling the electronic valve 260. In this case, it is possible to increase the temperature of hot water in the heating water tank 250 by about 6° C. by driving the heater 255 having capacity of 1.5 kW, and accordingly, it is possible to supply hot water at 38° C. desired by a user.

Whether to drive the heater 255 when the faucet control device 200 according to the present invention is being used is determined, as described above, on the basis of the volume of remaining hot water in the hot water pipe 1 (that is, the volume of cooled hot water remaining in the hot water pipe 1 until hot water at a supply temperature is supplied from the point at which pipes diverge to households from a central pipeline when hot water is supplied by a district heating corporation and the hot water outflow point of a boiler installed in a household when it is individual heating), the temperature of remaining hot water, the capacity of the heating water tank 250, the capacity of the heater 255, the flow rate of hot water that is supplied from the hot water pipe 1, a hot water distribution ratio between the heating water tank and the direct hot water pipe 240, the temperature of discharge water desired by a user, which is 38° C., the hot water and water amount in the heating water tank, etc. If it is determined that it is impossible to secure the temperature of discharge water desired by a user even by operating the heater 255 when the faucet control device 200 according to the present invention is being used, the controller 270 sets a temperature and a water amount of discharge water to be lower than the temperature and water amount of discharge water desired by the user and supplies the discharge water to the faucet 1 on the basis of the temperature and water amount of remaining hot water, the capacity of the heating water tank 250, the temperature of hot water in the heating water tank 250, the hot water distribution ratio between the heating water tank 250 and the direct hot water pipe 240, the capacity of the heater 255, etc. simultaneously with driving the heater 255.

The electronic control valve 260 is controlled to a position for closing the hot water pipe side when the faucet 3 is not used in order to prevent the heat of heated hot water in the heating water tank 250 from transferring to the faucet 3. Further, the controller 270 controls the mixing ratio of cold water supplied from the cold water pipe 2 and mixed hot water of heated hot water discharged from the heating water tank 250 and hot water that is supplied through the direct hot water pipe 240 by controlling the electronic valve 260 at time point at which the faucet 3 is used, and then water is provided to the faucet 3. For example, when a temperature and a water amount of discharge water desired by a use are 40° C. and 80 mℓ /s, respectively, the temperature and the water amount of mixed hot water are 47° C. and 100 mℓ /s, respectively, and the supply temperature and water amount of cold water are 20° C. and 120 mℓ /s, respectively, the mixing ratio of the mixed hot water and the cold water is adjusted by adjusting the rotation amount of the electronic valve 260 on the basis of the following equation.

$$K = \frac{T_O(Q_H + Q_L) - 2T_L Q_L}{2(T_H Q_H - T_L Q_L)} \quad \text{[Equation 15]}$$

wherein, K is the rotation amount of the electronic valve 260 (mixed hot water are supplied in halves when K=0.5, mixed hot water is mixed from 0 to a halt with respect to cold water when 0≤K<0.5, and cold water is mixed from 0 to a half when 0.5<k≤1), $T_O$ is a desired temperature of discharge water, $T_H$ is the temperature of mixed hot water, $T_L$ is the temperature of cold water, $Q_F$ is a supply amount of mixed hot water, and $Q_L$ is a supply amount of cold water. In this case, $Q_H$ and $Q_L$ may be set maximum supply water amount through the hot water pipe 1 and the cold water pipe 2 measured at the place where the faucet control device 200 according to the present invention is installed.

By substituting the values according to the above example in to Equation 15, K becomes 0.282. Accordingly, the electronic valve 260 is controlled such that mixed hot water and cold water are included by 28.2% and 71.8%, respectively, in the water amount of discharge water. As a result, mixed hot water and cold water are supplied at 22.56 mℓ /s and 57.44 mℓ /s to the faucet 3 through the electronic valve 260, and finally, hot water is discharged at a temperature of 40° C. and a water amount of 80 mℓ /s desired by a user through the faucet 3.

Meanwhile, the controller 270 may control the electronic valve 260 using the following equation at a time point at which the faucet 3 is used.

$$M_O = \frac{(T_{req} - T_2) \times Q_{Cmax}}{(T_1 \times k + T_3 - T_3 \times k - T_{req}) \times Q_{Hmax} + (T_{req} - T_2) \times Q_{Cmax}} \quad \text{[Equation 16]}$$

wherein, $M_0$ is the initial open ratio (0≤MO≤1) of the electronic valve 260 at a time point at which the faucet 3 is used, $T_{req}$ is a desired temperature of discharge water of a user, $Q_{Cmax}$ is a maximum supply water amount of cold water, $Q_{Hmax}$ is a maximum supply water amount of hot water, $T_1$, $T_2$, and $T_3$ are measurement values of first to third temperature sensors, respectively (the temperature of hot water, the temperature of cold water, the temperature of hot water in the heating water tank 250), and k is a constant having a value of 0-1. In this case, $Q_{Hmax}$ and $Q_{Cmax}$ may be set maximum supply water amount through the hot water pipe 1 and the cold water pipe 2 measured at the place where the faucet control device 200 according to the present invention is installed.

In Equation 16, the mixing ratio of hot water and cold water is 0:1 when $M_0$=0, the mixing ratio of hot water and cold water is 1:0 when $M_0$=1, the mixing ratio of hot water and cold water is 1:1 when $M_0$=0.5, and, in this case, a step motor that drives the electronic valve 260 is positioned at the center. In this case, the controller 270 controls the electronic valve 260 such that the hot water supply ratio becomes maximum (cold water is blocked) by considering $M_0$=1 when $M_0$>1, and controls the electronic valve 260 such that the cold water supply ratio becomes maximum (hot water is blocked) by considering $M_0$=0 when $M_0$<0. Further, k is a flow rate ratio of remaining hot water supplied through the direct hot water pipe 240 in mixed hot water. When the flow rate of mixed hot water is 100 mℓ /s and when the water amounts of heated hot water supplied from the heating water tank 250 and remaining hot water supplied through the direct hot water pipe 240 are 40 mℓ /s and 60 mℓ /s, respectively, k is calculated as 0.6.

As described above, the controller 270 determines the initial open ratio of the electronic valve 260 at a time point at which the faucet 3 is used on the basis of Equation 15 and Equation 16, thereby being able to supply discharge water at a temperature and a flow rate desired by a user. However, a temperature and a flow rate of discharge water supplied in accordance with the initial open amount of the electronic valve 260 determined at a time point at which the faucet 3 is used may be different from a temperature and a flow rate desired by a user due to a measurement error of the temperature sensors 220a, 220b, and 220c, a measurement error of the flow rate sensors 210a and 210b, etc. For example, the flow rates of hot water and cold water in Equation 15 and Equation 16 may be measured after the electronic valve 260 is operated and discharge water starts to be discharged through the faucet 3. Accordingly, the supply water amounts mixed hot water and cold water in Equation 15 and the maximum supply water amounts of hot water and cold water in Equation 16 may be changed, depending on a time point at which the faucet 3 is used. For example, when the maximum supply water amount of cold water that is supplied through the cold water pipe 2 is set as 120 mℓ /s for the place where the faucet control device 200 according to the present invention is installed, the supply water amount of cold water that is supplied through the cold water pipe 2 may be changed to 80 mℓ /s at a time point at which the faucet 3 is used due to use of cold water at another place. In this case, when the electronic valve 260 is controlled in accordance with the open ratio of the electronic valve 260 calculated by Equation 15 or Equation 16, the temperature of discharge water becomes higher than a temperature desired by a user. This problem can be solved by installing a pressure sensor (not shown) at positions adjacent to the hot water pipe 1 and the cold water pipe 2. It is possible to find out the flow rate of hot water and the flow rate of cold water immediately before the faucet 3 is used through Equation 11 on the basis of values measured by pressure sensors installed at positions adjacent to the hot water pipe 1 and the cold water pipe 2, and when these values are set as the maximum supply water amounts of hot water and cold water in Equation 16, the temperature of discharge water can be a temperature desired by a user. Hereinafter, a method of correcting the open ratio of the electronic valve 260 determined at a time point at which the faucet 3 is used when a pressure sensor is not installed.

Figure 15:
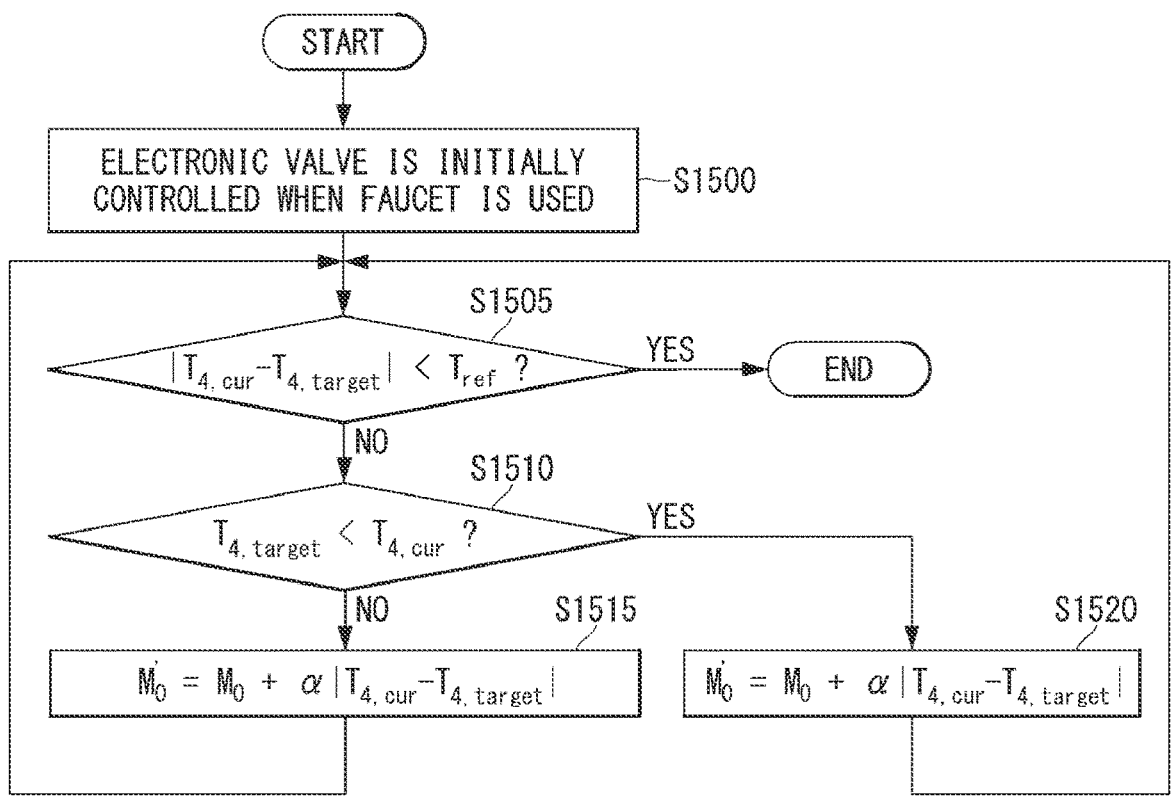
FIG. 15 is a flowchart showing a method of correcting an open ratio of an electronic valve that is determined at the point of time when a faucet is used.

FIG. 15 is a flowchart showing a method of correcting the open ratio of the electronic valve 260 determined at time point at which the faucet 3 is used.

Referring to FIG. 15, when initial control of the electronic valve 260 is finished by Equation 15 or Equation 15 in accordance with use of the faucet 3 (S1500), the controller 270 checks whether the absolute value of the difference between the current temperature $T_{4,cur}$ of discharge water measured by the fourth temperature sensor 220d and a desired temperature $T_{4,target}$ of discharge water set by a user is lower than a reference temperature $T_{ref}$ (S1505). If the absolute value of the difference between the current temperature $T_{4,cur}$ of discharge water and the desired temperature $T_{4,target}$ of discharge water is lower than the reference temperature $T_{ref}$, the controller 270 finishes control without correcting the open ratio of the electronic valve 260. Unlikely, when the absolute value of the difference between the current temperature $T_{4,cur}$ of discharge water and the desired temperature $T_{4,target}$ of discharge water is higher than or equal to the reference temperature $T_{ref}$, the controller 270 compares the current temperature $T_{4,cur}$ of discharge water and the desired temperature $T_{4,target}$ of discharge water (S1510). If the current temperature $T_{4,cur}$ of discharge water is lower than the desired temperature $T_{4,target}$ of discharge water, the controller 270 determines a value, which is obtained by adding a value obtained by multiplying the absolute value of the difference between the current temperature $T_{4,cur}$ of discharge water and the desired temperature $T_{4,target}$ of discharge water by a predetermined correction constant α to $M_0$ obtained by Equation 15 or Equation 16, as a new open ratio of the electronic valve 260 and controls the electronic valve 260 (S1520). Unlikely, if the current temperature $T_{4,cur}$ of discharge water is higher than or equal to the desired temperature $T_{4,target}$ of discharge water, the controller 270 determines a value, which is obtained by subtracting a value obtained by multiplying the absolute value of the difference between the current temperature $T_{4,cur}$ of discharge water and the desired temperature $T_{4,target}$ of discharge water by a predetermined correction constant α from $M_0$ obtained by Equation 15 or Equation 16, as a new open ratio of the electronic valve 260 and controls the electronic valve 260 (S1525). Next, the controller 270 repeats steps S1505 to S1520 until the absolute value of the difference between the current temperature $T_{4,cur}$ of discharge water and the desired temperature $T_{4,target}$ of discharge water becomes smaller than the reference temperature $T_{ref}$.

It is preferable that the method of controlling the open ratio of the electronic valve 260 determined at a time point at which the faucet 3 is used, which was described with reference to FIG. 15, is performed such that the absolute value of the difference between the current temperature $T_{4,cur}$ of discharge water and the desired temperature $T_{4,target}$ of discharge water becomes smaller than the reference temperature $T_{ref}$. Further, the correction constant may be experimentally determined (e.g., $\alpha=0.01\times|T_{4,target}-T_{4,cur}|$) and may depend on the environment in which the faucet control device 200 according to the present invention is installed.

As described above, when primary control for the electronic valve 260 is finished at a time point at which the faucet 2 is used, the controller 270 performs secondary control according to variation of a temperature or a water amount of hot water that is supplied from the hot water pipe 1 or variation of a temperature or a water amount of cold water that is supplied from the cold water pipe 2. As the case in which the secondary control is performed, there are cases, i) when the flow rate of hot water that is supplied from the hot water pipe 1 or cold water that is supplied from the cold water pipe 2 is changed due to use of hot water or cold water at another water use position, ii) when the temperature of mixed hot water that is supplied to the electronic valve 260 continuously decreases due to use of remaining hot water in the hot water pipe 2, iii) when remaining hot water in the hot water pipe 2 is completely used and hot water at a maximum supply temperature is supplied from the hot water pipe 2, whereby the temperature of mixed hot water that is supplied to the electronic valve 260 continuously increases, etc. In this case, when the temperature of mixed hot water increases or decreases, it is possible to control the temperature of discharge water to be close to a desired temperature set by a user using the method of controlling the open ratio of the electronic valve 260 described with reference to FIG. 15. Accordingly, a method of correcting the open ratio of the electronic valve 260 when the flow rate of hot water that is supplied from the hot water pipe 1 or cold water that is supplied from the cold water pipe 2 is changed due to use of hot water or cold water at another water use position is described hereafter.

Figure 16:
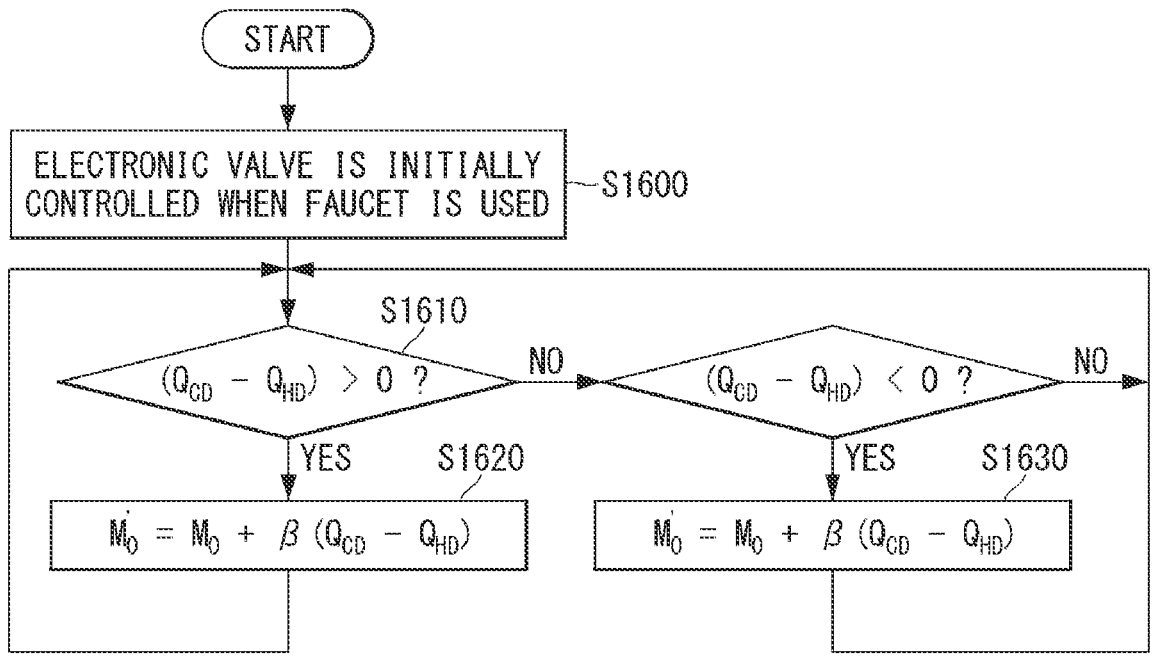
FIG. 16 is a flowchart showing a method of correcting an open ratio of an electronic valve when the flow rate of hot water that is supplied from a hot water pipe or cold water that is supplied from a cold water pipe changes.

FIG. 16 is a flowchart showing a method of correcting the open ratio of the electronic valve 260 when the flow rate of hot water that is supplied from the hot water pipe 1 or cold water that is supplied from the cold water pipe 2 is changed.

Referring to FIG. 16, when initial control of the electronic valve 260 by Equation 15 or Equation 16 is finished by use of the faucet 3 or the temperature of discharge water is controlled to close to a desired temperature set by a user by the method of controlling the open ratio of the electronic valve 260 described above FIG. 15 (S1600), the controller 270 compares the different $Q_{HD}$ between the current flow rate $Q_{Hcur}$ and the previous flow rate $Q_{Hold}$ of hot water that is supplied from the hot water pipe 1 measured by the first temperature sensor 210a and the difference $Q_{CD}$ between the current flow rate $Q_{Ccur}$ and the previous flow rate $Q_{Cold}$ of cold water that is supplied from the cold water 2 measured by the second flow rate sensor 210b (S1610). If the difference $Q_{Cold}$ between the current flow rate $Q_{Ccur}$ and the previous flow rate $Q_{Cold}$ of cold water is larger than the difference $Q_{Cold}$ between the current flow rate $Q_{Hcur}$ and the previous flow rate $Q_{Hold}$ of hot water, the controller 270 determines a value, which is obtained by adding a value obtained by multiplying the difference $Q_{Cold}$ between the current flow rate $Q_{Hcur}$ and the previous flow rate $Q_{Cold}$ of hot water by a predetermined correction constant R to K obtained by Equation 15 or $M_0$ obtained by Equation 16, as a new open ratio of the electronic valve 260 and controls the electronic valve 260 (S1620). Unlikely, if the difference $Q_{Cold}$ between the current flow rate $Q_{Ccur}$ and the previous flow rate $Q_{Cold}$ of cold water is lower than the difference $Q_{Cold}$ between the current flow rate $Q_{Hcur}$ and the previous flow rate $Q_{Hold}$ of hot water, the controller 270 determines a value, which is obtained by subtracting a value obtained by multiplying the difference $Q_{Cold}$ between the current flow rate $Q_{Hcur}$ and the previous flow rate $Q_{Hold}$ of hot water by a predetermined correction constant β from K obtained by Equation 15 or $M_0$ obtained by Equation 16, as a new open ratio of the electronic valve 260 and controls the electronic valve 260 (S1630). Unlikely, if the difference $Q_{Cold}$ between the current flow rate $Q_{Ccur}$ and the previous flow rate of cold water is the same as the difference $Q_{Cold}$ between the current flow rate $Q_{Hcur}$ and the previous flow rate $Q_{Hold}$ of hot water, the controller 270 maintains the open ratio of the electronic valve 260. Further, the controller 270 repeats steps S1610 to S1630 until the difference $Q_{Cold}$ between the current flow rate $Q_{Ccur}$ and the previous flow rate of cold water becomes smaller than the difference $Q_{Cold}$ between the current flow rate $Q_{Hcur}$ and the previous flow rate $Q_{Hold}$ of hot water.

Meanwhile, since the heating water tank 250 is sealed against the hot water pipe 1 and the electronic valve 260 in the embodiments described with reference to FIGS. 9 and 10, when the water in the heating water tank 250 is heated, the volume increases, so excessively high pressure is applied to the heating water tank 250, the direct hot water pipe 220, and the pipeline between the hot water pipe 1 and the electronic valve 260. Further, since the heating water tank 250 itself is sealed in the embodiments described with reference to FIGS. 11 and 12, when the water in the heating water tank 250 is heated, the volume increases, so excessively high pressure is applied to the heating water tank 250. This may cause damage to the device, so it is required to decrease the pressure to an appropriate level (e.g., 1.5 times the hot water supply pressure). To this end, a pressure sensor (not shown) is mounted at the heating water tank 250 and the controller 250 controls the open ratio of the electronic valve 260 (for example, K=0.5 in Equation 15 and $M_0$=0.5 in Equation 16) such that mixed hot water flows toward the cold water when the pressure in the heating water tank 250 measured by the pressure sensor is a first reference pressure (e.g., 5 bar) or more. Further, when the pressure in the heating water tank 250 or pressure in a closed space including the heating water tank 250 reaches a second reference pressure (e.g., 2 bar), the controller 270 controls the open ratio of the electronic valve 260 (e.g., K=0 or $M_0$=0), thereby blocking mixed hot water that is discharged toward the cold water pipe 2. Such a pressure reduction operation by the controller 270 is continuously performed after the faucet control device 200 according to the present invention is installed regardless of use of the faucet 3 by a user.

Further, the controller 270 may perform the pressure reduction operation on the basis of a value measured by the third temperature sensor 220c installed at the heating water tank 250. In this case, it is not required to mount a pressure sensor at the heating water tank 250, and the controller 270 measures a pressure increase amount corresponding to the increase amount of the temperature of water in the heating water tank 250 measured by the third temperature sensor 220c installed at the heating water tank 250, and controls the open ratio of the electronic valve 260 (for example, K=0.5 in Equation 15 and $M_O$=0.5 in Equation 16) such that mixed hot water flows toward the cold water when the pressure in the heating water tank 250 corresponding to the pressure increase amount is the first reference pressure (e.g., 5 bar). Further, when a reduction amount of the temperature of water in the heating water tank 250 measured by the third temperature sensor 220c installed at the heating water tank 250 reaches a preset reference reduction amount, the controller 270 controls the open ratio of the electronic valve 260 (e.g., K=0 or $M_O$=0), thereby blocking mixed hot water that is discharged toward the cold water pipe 2. The pressure increase amount and the pressure reduction amount that correspond to the temperature increase amount and the temperature reduction amount in the heating water tank 250 may be experimentally measured and stored in the controller 270. Such a pressure reduction operation by the controller 270 is continuously performed after the faucet control device 200 according to the present invention is installed regardless of use of the faucet 3 by a user.

Figure 17:
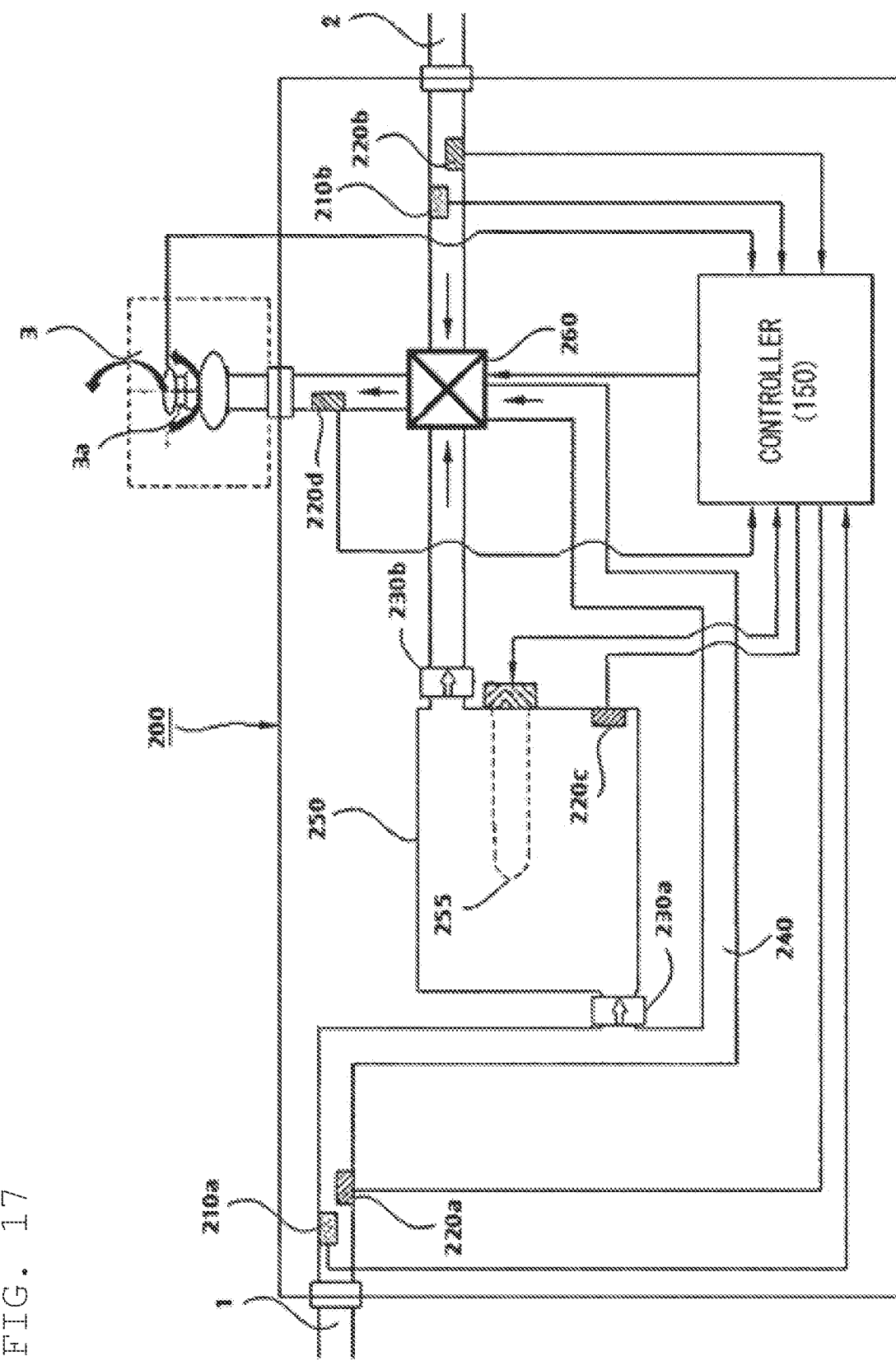
FIG. 17 is a view showing the configuration of a faucet control device according to another embodiment of the present disclosure.

FIG. 17 is a view showing the configuration of a faucet control device according to another embodiment of the present disclosure.

Referring to FIG. 17, a faucet control device 200 according to another embodiment of the present invention includes a temperature/water amount setter 3a, a plurality of flow rate sensors 210a and 210b, a plurality of temperature sensors 220a to 220d, a direction control valve 230, a direct hot water pipe 240, a heating water tank 250, a heater 255, an electronic valve 260, and a controller 270.

The functions and operations of the temperature/water amount setter 3a, the plurality of flow rate sensors 210a and 210b, the plurality of temperature sensors 220a to 220d, the plurality of direction control valves 230a and 230b, the direct hot water pipe 240, the heating water tank 250, the heater 255 are the same as those in the embodiment described with reference to FIG. 11. A second direction valve 230b of the plurality of direction control valves 230a and 230b may be omitted. Further, it may be possible to remove the plurality of direction control valves 230a and 230b installed at the inlet and the outlet of the heating water tank 250, and to install only one direction control valve before the point at which hot water supplied through the hot water pipe 1 diverges to the direct hot water pipe 240 and the heating water tank 250, as in the embodiment shown in FIG. 10. In the faucet control device 200 according to another embodiment of the present invention shown in FIG. 17, the direct hot water pipe 240 and the outlet pipeline of the heating water tank 250 are directly connected to the electronic valve 260. Accordingly, the electronic valve 260 receives hot water that is supplied from the direct hot water pipe 240, heated hot water that is supplied from the heating water tank 250, and cold water that is supplied from the cold water tank 2, and supplies them to the faucet 3. Accordingly, the control method of the controller 270 is also changed. Hereinafter, the operation of controlling the electronic valve 260 by the controller 270 is described in detail.

The operation of controlling the electronic valve 260 by the controller 270 is performed fundamentally on the basis of measurement values of the first to fourth temperature sensors 220a to 220d and the first and second flow rate sensors 210a and 210b. The electronic valve 260 that is used in this embodiment is a valve that adjusts the mixing ratio between two inputs selected from three inputs. An example of the electronic valve 260 that is used in this embodiment is shown in FIG. 18.

Figure 18:
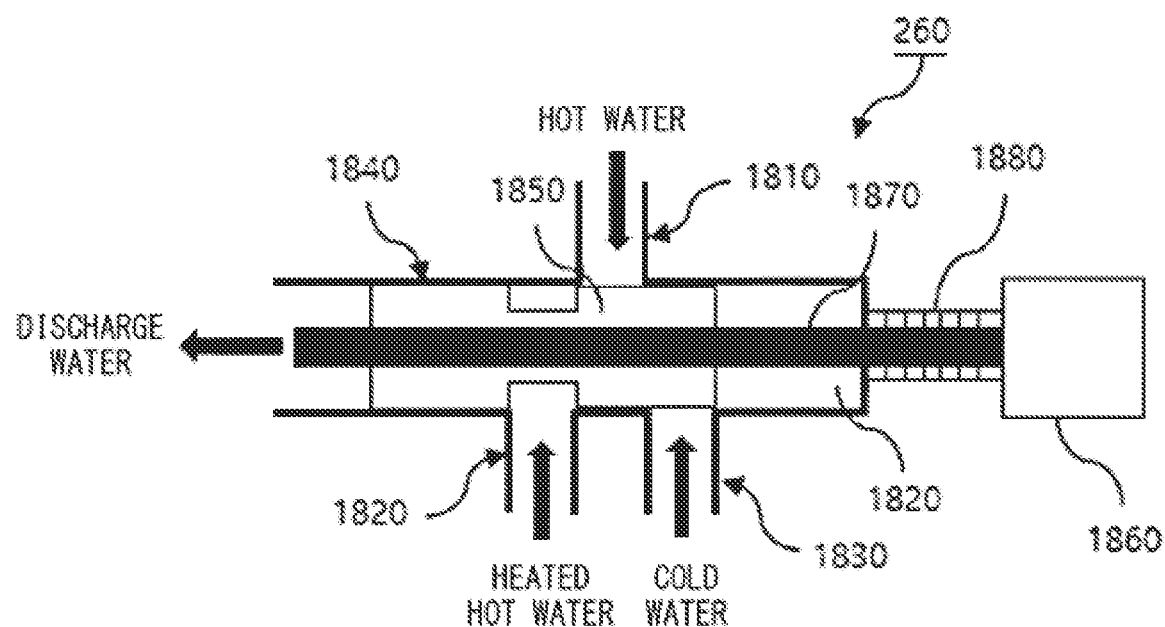
FIG. 18 is a view showing an example of an electronic device that is used in the embodiment.
Figure 19:
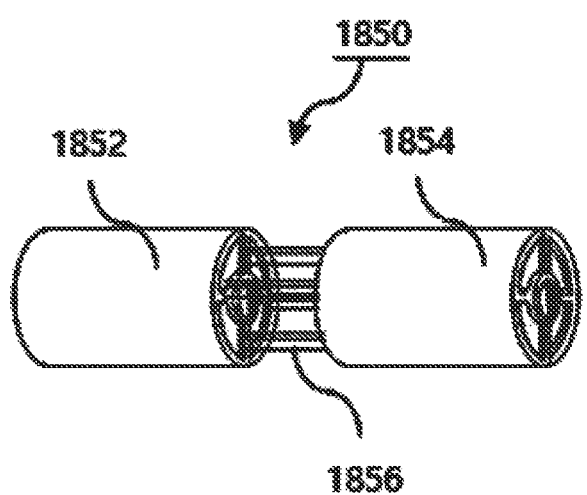
FIG. 19 is a view showing a switch that is installed in an electronic valve.

Referring to FIG. 18, the electronic valve 260 includes a first inlet pipe 1810, a second inlet pipe 1820, a third inlet pipe 1830, a discharge pipe 1840, a switch 1850, a step motor 1860, a rotary shaft 1870, and a waterproof module 1880. A direct hot water pipe 240, a pipeline connected with the outlet of the heating water tank 250, and the cold water pipe 2 are connected to the first inlet pipe to the third inlet pipe 1810, 1820, and 1830, respectively. Of course, depending situations, the outlet of the heating water tank 250 and the direct hot water pipe 240 may be connected to the first inlet pipe and the second inlet pipe 1810 and 1820, respectively. A pipeline connected with the faucet 3 is connected to the discharge pipe 1840. The switch is manufacture in a type in which two hollow pistons are connected. An example of the switch 1850 is shown in FIG. 19. Referring to FIG. 19, the switch 1850 includes a first piston 1852, a second piston 1854, and a connection module 1856 connecting and fixing the two pistons 1852 and 1854. A donut-shaped rotary shaft accommodation portion having threads therein are fixed to cylindrical bodies of the pistons 1852 and 1854, at a longitudinal end of each of the pistons 1852 and 1854. The switch 1850 is coupled to the rotary shaft 1870 and reciprocates in the electronic valve as the rotary shaft 1870 is rotated. The step motor 1880 rotates the rotary shaft 1870 clockwise or counterclockwise in response to a control signal of the controller 270. A method of controlling the step motor 1860 by the controller 270 is described below. The rotary shaft 1870 has threads on the outer surface thereof and is driven by the step motor 1860 such that the switch 1850 reciprocates in the electronic valve 260. The waterproof module 1880 prevents fluid in the electronic valve 260 from leaking toward the step motor 1860. The waterproof module 1880 includes a plurality of O-rings fitted on the outer surface of the rotary shaft exposed out of the electronic valve 260, and a cover accommodating the O-rings.

Hereinafter, the operation of the controller 270 when the electronic valve 260 shown in FIG. 18 is employed is described.

The controller 270 receives measurement values T1, T2, and T3 of the first temperature sensor to the third temperature sensor 220a to 220c and a desired temperature $T4,target$ set by a user. In this case, the measurement value T3 of the third temperature sensor 220c is lower than the measurement value T1 of the first temperature sensor 220a only for the time until the heating water tank 250 is full filled with hot water at a maximum supply temperature (e.g., 60° C.) supplied from the hot water pipe 1 from a time point at which hot water at the maximum supply temperature (e.g., 60° C.) is supplied from the hot water pipe 1 to the faucet control device 200 according to the present invention by completely using remaining hot water in the hot water pipe 1. When the measurement value T1 of the first temperature sensor 220a is larger than or equal to the measurement value T3 of the third temperature sensor 220c, the controller 270 controls the electronic valve 260 such that heated hot water that is supplied from the heating water tank 250 and cold water that is supplied from the cold water tank 1 are mixed and discharged to the faucet 3. Further, the measurement value T1 of the first temperature sensor 220a is the same as the measurement value T3 of the second temperature sensor 220b or when the absolute value of the difference between the measurement value T1 of the first temperature sensor 220a and the measurement value T3 of the second temperature sensor 220b is smaller than a preset reference temperature (e.g., 2° C.), the controller 270 controls the electronic valve 260 such that hot water that is supplied from the direct hot water pipe 240 and heated hot water that is supplied from the heating water tank 250 are mixed and discharged to the faucet 3. Further, when a desired temperature$_{T4,target}$ set by a user is larger than or equal to the measurement value T2 of the second temperature sensor 220b and smaller than the measurement value T2 of the first temperature sensor 220a, the controller 270 controls the electronic valve 260 such that cold water that is supplied from the cold water pipe 1 and the heated hot water that is supplied from the heating water tank 250 are mixed and discharged to the faucet 3. Further, when a desired temperature$_{T4,target}$ set by a user is larger than or equal to the measurement value T1 of the first temperature sensor 220a and smaller than or equal to the measurement value T3 of the third temperature sensor 220c, the controller 270 controls the electronic valve 260 such that hot water that is supplied from the direct hot water pipe 240 and the heated hot water that is supplied from the heating water tank 250 are mixed and discharged to the faucet 3. In this case, the open ratio of the electronic valve 260 is determined on the basis of the K value obtained by Equation 15 of the $M_O$ value obtained by Equation 16. For example, the determined K value or $M_O$ value may be converted into the number of steps calculated in accordance with a characteristic value of the step motor 1860 driving the electronic valve 260, the diameters of inlet pipes formed in the electronic valve 260, the length of the switch 1850 mounted on the electronic valve 260, an inlet pipe selected to commonly communicate with the discharge pipe 1840 formed at the electronic valve 260, etc.

For example, as shown in FIG. 20 (a), when the step motor 1860 of the electronic valve 260 is driven counterclockwise by the controller 270, the rotary shaft 1870 is rotated counterclockwise and the switch 1850 is moved from an initial position to a position (first position) for closing the second inlet pipe 1820 and the third inlet pipe 1830 and opening the first inlet pipe 1810. Accordingly, hot water supplied through the direct hot water pipe 240 sequentially passes the left piston of the switch 1850 and flows to the discharge pipe 1840. Further, as shown in FIG. 20 (b), when the step motor 1860 of the electronic valve 260 is driven counterclockwise by the controller 270, the rotary shaft 1870 is rotated counterclockwise and the switch 1850 is moved to a position (second position) for closing the first inlet pipe 1810 and the third inlet pipe 1830 and opening the second inlet pipe 1820. Accordingly, hot water supplied through the heating water tank 250 passes the left piston of the switch 1850 and flows to the discharge pipe 1840. As described above, when the switch 1850 is positioned between the first position and the second position, it is possible to appropriately adjust the mixing ratio of hot water and heated hot water from 1:0 to 0:1.

Further, as shown in FIG. 21 (a), when the switch 1850 of the electronic valve 260 is at the second position, heated hot water supplied from the heating water tank 250 passes the left piston of the switch 1850 and flows to the discharge pipe 1840. Further, when the step motor 1860 of the electronic valve 260 is driven counterclockwise by the controller 270, as shown in FIG. 21 (b), the rotary shaft 1870 is rotated counterclockwise and the switch 1850 is moved to a position (third position) for closing the first inlet pipe 1810 and the second inlet pipe 1820 and opening the third inlet pipe 1830. Accordingly, cold water supplied through the cold water pipe 1 sequentially passes the right piston and the left piston of the switch 1850 and flows to the discharge pipe 1840. As described above, when the switch 1850 is positioned between the second position and the third position, it is possible to appropriately adjust the mixing ratio of heated hot water and cold water from 1:0 to 0:1.

Figure 22:
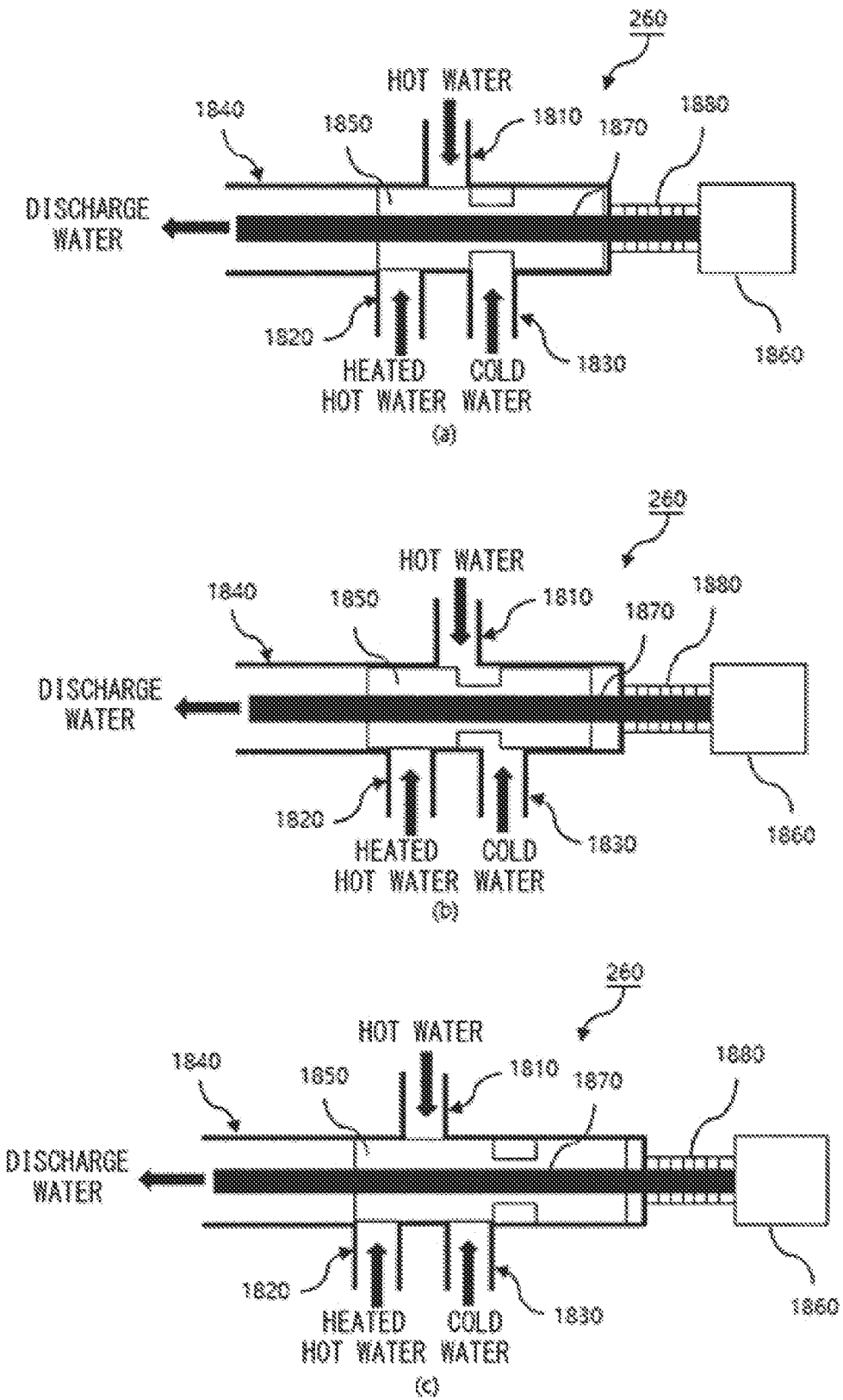
FIG. 22 is a view showing the position of a switch that is installed in an electronic valve which corresponds to a situation in which only cold water is supplied, cold water and hot water are mixed in halves and supplied, or water supply is stopped.

In the method of driving the electronic valve 260 described with reference to FIG. 20, the initial position of the switch 2850 is a position (the third position in FIG. 21) for opening only the inlet pipe into which cold water flows (the third inlet pipe 1830). Unlikely, the initial position of the switch 1850 of the electronic valve 260 may be variously set. As shown in FIG. 22 (a), a position at which cold water supplied through the cold water pipe 1 flows to the discharge pipe 1840 through the left piston of the opening 1850 may be set as an initial position. Further, as shown in FIG. 22 (b), a position at which the inlet pipe (first inlet pipe 1810) into which hot water flows from the direct hot water pipe 240 and the inlet pipe (third inlet pipe 1830) into which cold water flows are open in halves and at which hot water supplied from the direct hot water pipe 240 and cold water supplied through the cold water pipe 1 flows to the discharge pipe 1840 through the left piston of the switch 1850 may be set as an initial position. Further, as shown in FIG. 22 (c), when the left piston of the switch 1850 is manufactured longer than the right piston, a position for closing all of the first inlet pipe to the third inlet pipe 1810, 1820, and 1830 may be set as an initial position. As shown in FIG. 22 (b), when the initial position of the switch 2850 of the electronic valve 260 is set, there is an advantage that it is possible to use water in which hot water and cold water are mixed in halves when the faucet control device 200 according to the present invention is damaged or in a power failure. When the electronic valve 260 is manufactured as shown in FIG. 22 (c), it is possible to achieve a full-closing function, so there is an advantage that it is possible to electronically control even the water amount of discharge water. It is preferable for the electronic valve 260 shown in FIG. 22 (c) to move the switch 1850 of the electronic valve 260 to a position for supplying only cold water or a position for supplying cold water and hot water in halves when the faucet control device 200 according to the present invention is damaged or in a power failure. To this end, it is preferable that the control device 200 according to the present invention is equipped with an auxiliary battery such that when a user presses an emergency use button, the power of the auxiliary battery is supplied to the electronic valve 260 such that the electronic valve 260 can be driven.

In the method of driving the electronic valve 260 described with reference to FIGS. 20 and 21, the K value or the $M_O$ value that is the open ratio of the electronic valve 260 is determined as follows. Referring to FIGS. 20 and 21, the switch 1850 of the electronic valve 260 reciprocates between a position (first position) for supplying only hot water, as shown in FIG. 20 (a), and a position (third position) for supplying only cold water, as shown in FIG. 21 (b). In this case, the initial position of the switch 1850 of the electronic valve 260 may be set as the position (third position) for supplying only cold water, as shown in FIG. 21 (b). In this case, when the inner diameters of the first inlet pipe to the third inlet pipe 1810, 1820, and 1830 are 5 mm, the distance between the second inlet pipe 1820 and the third inlet pipe 1830 is 7 mm, and the length of the switch 1850 is 28 mm (the lengths of the left and right pistons are 12 mm), the distance between the first position and the third position is 12 mm. Accordingly, if the switch 1850 moves 3 mm when the step motor 1860 rotates one round, the step motor 1840 has only to rotate four rounds counterclockwise to move the switch 1850 from the first position to the third position. In this case, the number of steps per round of the step motor 1860 depends on the division ratio, and when the number of steps per round is 800, a total of 3200 steps are required to move the switch 1850 from the first position to the third position. In this case, the distance between the first position and the second position at which hot water that is supplied through the direct hot water pipe 240 and heated hot water that is supplied through the heating water tank 250 can be mixed is 6 mm. Accordingly, in order to move the switch 1850 from the first position to the second position, the step motor 1860 has only to be rotated two round counterclockwise, and in this case, the required number of steps is 1600. Accordingly, as shown in FIG. 20, in order to mix and supply hot water that is supplied through the direct hot water pipe 240 and heated hot water that is supplied through the heating water tank 250 to the discharge pipe 1840, the step motor 1860 is driven by the number of steps obtained from the following Equation.

$$S = S_P - M_R \times S_T \quad \text{[Equation 17]}$$

wherein, S is the number of steps required to move the switch 1850 to a new position (the step motor 1860 is rotated counterclockwise when S is a negative number and is rotated clockwise when S is a position number), $S_P$ is the number of steps at the previous position of the switch 1850, $S_T$ is the number of steps required for the switch 1850 to move the distance between two selected inlet pipes, and $M_R$ is a K value or an $M_O$ value.

In Equation 17, S=0 means a first position at which only hot water supplied through the direct hot water pipe 240 flows to the discharge pipe 1840. In order to mix and discharge hot water that is supplied through the direct hot water pipe 240 and heated hot water that is supplied through the heating water tank 250 at a volume ratio of 1:1 when the switch 1850 is at the third position shown in FIG. 21 (b), S becomes 2400 by Equation 17. Accordingly, the controller 270 moves the switch 1850 to a position corresponding to 800 steps by rotating the step motor 1860 of the electronic valve 260 by 2400 steps clockwise.

Further, as shown in FIG. 21, in order to mix and provide cold water that is supplied from the cold water pipe 2 and heated hot water that is supplied from the heating water tank 250 to the discharge pipe 1840, the step motor 1860 is drive by the number of steps obtained by multiplying the K value or the $M_O$ value by 1600 steps, which is the number of steps required to move the switch 1850 from the second position to the third position, and then adding 1600 steps to the obtained value.

$$S = S_P - ((1 - M_R) \times S_T + 1600) \quad \text{[Equation 18]}$$

wherein, S is the number of steps required to move the switch 1850 to a new position (the step motor 1860 is rotated counterclockwise when S is a negative number and is rotated clockwise when S is a position number), $S_P$ is the number of steps at the previous position of the switch 1850, $S_T$ is the number of steps required for the switch 1850 to move the distance between two selected inlet pipes, and $M_R$ is a K value or an $M_O$ value.

When the switch 1850 is at a position (the position of 800 steps) at which it is possible to mix and discharge hot water that is supplied through the direct hot water pipe 240 and heated hot water that is supplied through the heating water tank 250 at a volume ratio of 1:1, in order to mix and discharge heated hot water that is supplied through the heating water tank 250 and cold water that is supplied through the cold water pipe 1 at a volume ratio of 1:1, S becomes −1600 by Equation 18. Accordingly, the controller 270 moves the switch 1850 to a position corresponding to 2400 steps by rotating the step motor 1860 of the electronic valve 260 by 1600 steps counterclockwise.

Figure 23:
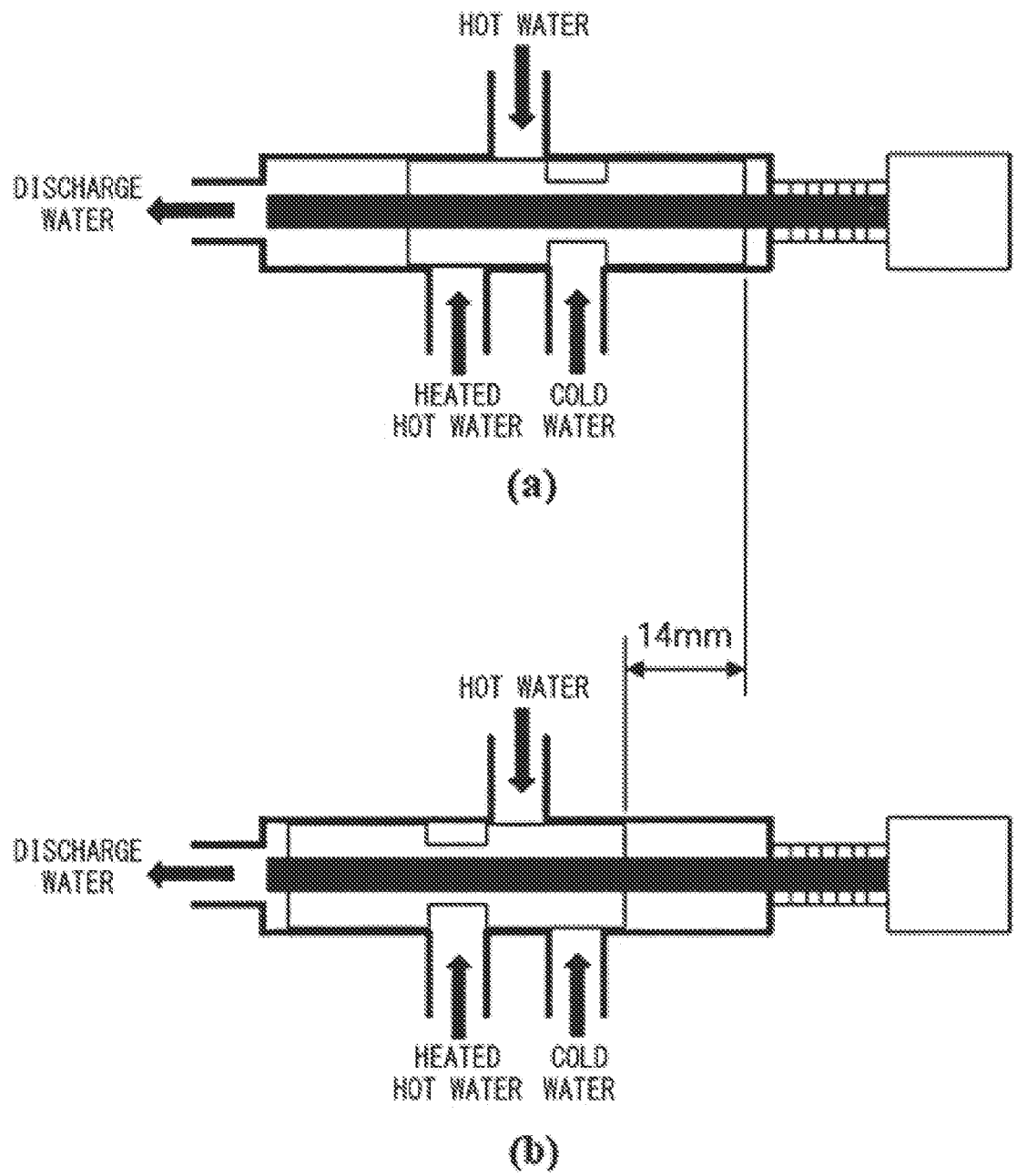
FIG. 23 is a view showing the distance between the positions of a switch that is installed in an electronic valve when only cold water is supplied and only heated hot water is supplied.

Meanwhile, it may be possible to determine the open ratios of two inlet pipes selected from three inlet pipes connected to the electronic valve 260 shown in FIG. 18 without using the K value obtained by Equation 15 or the $M_O$ value obtained by Equation 16. In the following description, it is exemplified that the initial position of the switch 1850 is set as a position at which only cold water supplied through the cold water pipe 1 flows to the discharge pipe 1840 through the left piston of the switch 1850, as shown in FIG. 23 (a). In this case, when the switch 1850 reaches a position shown in FIG. 23 (b) over a position at which only hot water supplied through the direct hot water pipe 240 flows to the discharge pipe 1840 through the left piston of the switch 1850 from the initial position shown in FIG. 23 (a), only heated hot water supplied through the heating water tank 250 flows to the discharge pipe 1840 through the left piston of the switch 1850. If the number of revolutions of the step motor 1860 required to move the switch 1850 from the position shown in FIG. 23 (a) to the position shown in FIG. 23 (b) is 'a', the needed number of steps Sneed is determined as follows in accordance with a division value set for the step motor 1860.

$$S_{need} = a \times b \times c \quad \text{[Equation 19]}$$

wherein, a is the number of revolutions of the step motor, b is a division value, and c is the number of steps required to rotate the step motor one round when the division value is 1.

Figure 24:
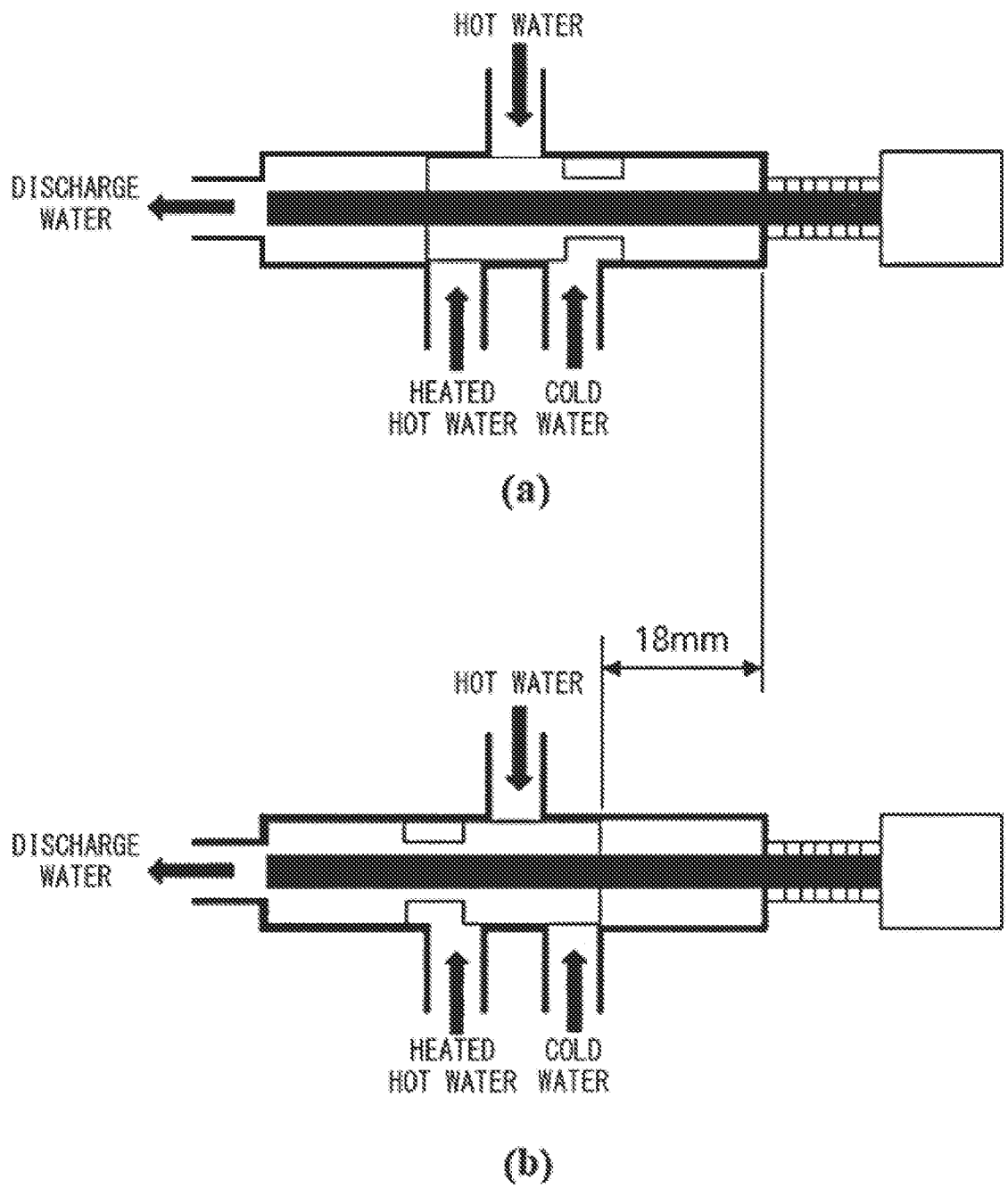
FIG. 24 is a view showing the maximum range of a switch that is installed in an electronic valve.

Accordingly, the total distance of the section that the switch 1850 can move in the electronic valve 260 is 18 mm, as shown in FIG. 24. Further, when the distance from the position shown in FIG. 23 (a) to the position shown in FIG. 23 (b) is 14 mm, and when the switch 1850 moves 4 mm as the step motor 1860 is rotated one round, the number of revolutions of the step motor 1860 is 3.5 rounds. Accordingly, when the number of steps required to rotate the step motor one rounds for a division value of 1, and when 16 division is used, the number of steps Sneed required to move the switch 1850 from the position shown in FIG. 23 (a) to the position shown in FIG. 23 (b) is 11200. Further, the number of steps Sneed required to move the switch 1850 from the position shown in FIG. 24 (a) to the position shown in FIG. 24 (b) is 14400.

When a step value is set as 0 for the position shown in FIG. 23 (a) (i.e., an initial position), step values of the step motor 1860 according to a desired temperature $T_{4,target}$ set by a user, the measurement value T1 measured by the first temperature sensor 220a, the measurement value T2 measured by the second temperature sensor 220b, and the measurement value T3 measured by the third temperature sensor 220c are determined as follows.

If the desired temperature $T_{4,target}$ is smaller than the measurement value T1 measured by the first temperature sensor 220a, the step value of the step motor 1860 for driving the electronic valve 260 is calculated by the following equation.

$$M_O = \frac{(T_{4,target} - T_2) \times ColdMaxFlux}{(T_1 - T_{4,target}) \times HotMaxFlux + (T_{4,target} - T_2) \times ColdMaxFlux} \times R_a \quad \text{[Equation 20]}$$

wherein, $M_O$ is a step value of the step motor 1860, ColdMaxFlux is a maximum supply flow rate of cold water, HotMaxFlux is a maximum supply flow rate of hot water, and $R_a$ is a value corresponding to a half of the number of steps Sneed required to move the switch 1850 from the position shown in FIG. 24 (*a*) to the position shown in FIG. 24 (*b*).

Accordingly, when the maximum supply amount of cold water is 120 ㎖/s, the maximum supply amount of hot water is 10 ㎖/s, a desired temperature is 30° C., the measurement value T1 of the first temperature sensor 220*a* is 35° C., the measurement value T2 of the second temperature sensor 220*b* is 20° C., and the measurement value T3 of the third temperature sensor 220*c* is 60° C., the controller 270 determines 3953 calculated by Equation 20 as the step value of the step motor 1860 driving the electronic valve 260.

Unlikely, if the desired temperature $T_{4,target}$ is larger than or equal to the measurement value T1 of the first temperature sensor 220*a*, the number of steps of the step motor 1860 for driving the electronic valve 260 is calculated by the following equation.

$$M_O = R_a + \frac{T_{4,target} - T_1}{T_3 - T_1} \times R_a \quad \text{[Equation 21]}$$

wherein, $M_O$ is a step value of the step motor 1860.

Accordingly, when the maximum supply amount of cold water is 12 ㎖/s, the maximum supply amount of hot water is 100 ㎖/s, a desired temperature is 40° C., the measurement value T1 of the first temperature sensor 220*a* is 35° C., the measurement value T2 of the second temperature sensor 220*b* is 20° C., and the measurement value T3 of the third temperature sensor 220*c* is 60° C., the controller 270 determines 6720 calculated by Equation 21 as the step value of the step motor 1860 driving the electronic valve 260.

Figure 26:
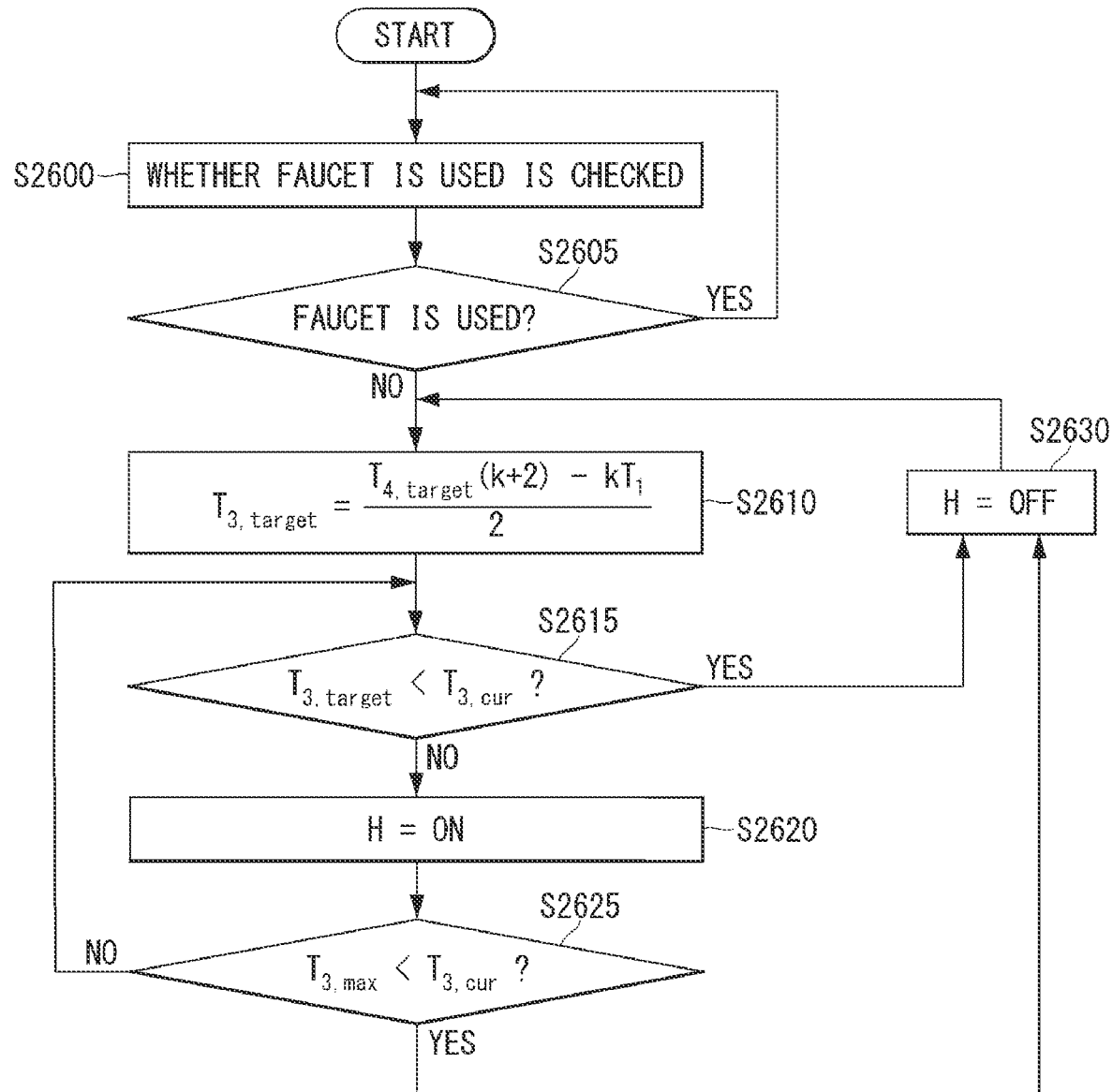
FIG. 26 is a view showing a control method of a heater in a heating water tank when the electronic valve shown in FIG. 18 is employed.

Meanwhile, it is preferable that when the electronic valve 260 shown in FIG. 18 is employed, the heater 255 installed in the heating water tank 250 is controlled as shown in FIG. 26.

Referring to FIG. 26, the controller 270 checks whether the faucet 3 is used on the basis of flow rate values that are input from a first flow rate sensor 210*a* and a second flow rate sensor 210*b* (S2600). Next, when it is determined that the faucet 3 is not being used (S2605), the controller 270 calculates a target heating temperature of hot water in the heating water tank 250 from the following equation (S2610).

$$T_{3,target} = \frac{T_{4,target} \times (k+2) - kT_1}{2} \quad \text{[Equation 22]}$$

wherein, $T_{3,target}$ is a target heating temperature of hot water in the heating water tank 250, $T_{4,target}$ is a target supply temperature of mixed hot water, $T_1$ is the temperature of remaining hot water in the hot water pipe 1, and k is the maximum amount of remaining hot water in the hot water pipe 1.

In Equation 22, the k value depends on the length and the inner diameter of the hot water pipe. The k value is calculated on the basis of the time that hot water at the maximum supply temperature takes to reach a faucet from immediately after the faucet is used, and is stored in a memory therein. That is, the k value is calculated by multiplying the time that hot water at the maximum supply temperature takes to reach a faucet from a time point of starting to use the faucet by the water amount of hot water measured by the first flow rate sensor 210*a*. In this case, it is preferable to set a predetermined amount of spare for a target supply temperature of mixed hot water in order to prevent frequency turning-on/off of the heater 255. For example, the heater 255 may be set to be driven when the difference between the target supply temperature of mixed hot water obtained by Equation 22 and a set target supply temperature of heated hot water is 3° C. or more.

Next, the controller compares the target heating temperature $T_{3,\ target}$ of hot water in the heating water tank 250 and the current temperature $T_{3,\ tur}$ of hot water in the heating water tank 250 measured by the third temperature sensor 220*c* (S2615). If the target heating temperature $T_{3,\ target}$ of hot water in the heating water tank 250 is lower than the current temperature $T_{3,\ tur}$ of hot water in the heating water tank 250, the controller 270 turns on the heater 255 (S2620). Unlikely, when the target heating temperature $T_{3,\ target}$ of hot water in the heating water tank 250 is higher than or equal to the current temperature $T_{3,\ tur}$ of hot water in the heating water tank 250, the controller 270 turns off the heater 255 (2630). After driving the heater 255, the controller 270 compares the current temperature T3, tur of hot water in the heating water tank 250 measured by the third temperature sensor 220*c* and the maximum heating temperature T3, max of hot water in the heating water tank 250 (S2625). Unlikely, when the current temperature $T_{3,\ tur}$ of hot water in the heating water tank 250 is higher than or equal to the maximum heating temperature $T_{3,\ tur}$ of hot water in the heating water tank 250, the controller 270 turns off the heater 255 (S2630). Unlikely, when the current temperature $T_3$, tur of hot water in the heating water tank 250 is lower the maximum heating temperature $T_{3,\ max}$ of hot water in the heating water tank 250, this process goes to step S2615.

The controller 270 appropriately controls whether to drive the heater 255 installed in the heating water tank 250 while the faucet 3 is not used in accordance with the method describe above, whereby it is possible to stably supply hot water when the faucet 3 is used later by a user while minimizing power consumption.

Figure 25:
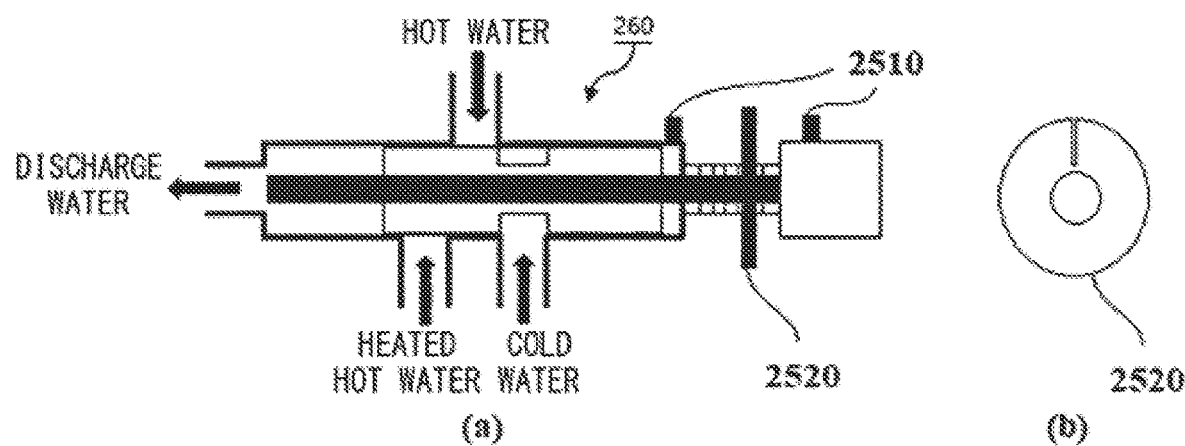
FIG. 25 is a view showing an example of mounting a photo sensor for setting the initial position of a switch in an electronic valve.

Meanwhile, the controller 270 cannot recognize the position of the switch 1850 in the electronic valve 260 at a time point at which power is supplied to the faucet control device according to the present disclosure. Of course, the switch 1850 in the electronic valve 260 is at an initial position (the position at which only cold water is discharged, as shown in FIG. 23 (*a*)) when the faucet control device according to the present invention is manufactured. In this case, as shown in FIG. 25, a photo sensor 2510 is installed on the body of the electronic valve 260 and the step motor 1860 and a rotary plate 2520 having a slit is installed on the rotary shaft 1880. The rotary plate 2520 rotates with the rotary shaft of the step motor 1860. The photo sensor 2510 may be installed at a position corresponding to the slit of the rotary plate 2520 in the faucet control device according to the present invention rather than the body of the electronic valve 260 and the step motor 1860.

The switch 1850 in the electronic valve 260 is set to be positioned at the initial position (the position at which only cold water is discharged, as shown in FIG. 23 (*a*) when the faucet control device according to the present invention is manufactured, and in this state, when power is supplied to the faucet control device according to the present disclosure, the photo sensor 2510 is turned on. However, it is required to align the switch 1850 in the electronic valve 260 at a time point at which the faucet control device according to the present invention is initially installed and power is supplied, a time point at which power is supplied again after power for the faucet control device according to the present invention is cut, etc., due to an alignment error of the switch 1850 in the electronic valve 260, an alignment error of the rotary plate 2520 and the rotary shaft 1880, etc. To this end, the controller 270 rotates the step motor 1860 clockwise until the photo sensor 2510 is turned on within one round. If the photo sensor 2510 is not turned on within one round, the controller 270 rotates the step motor 1860 within one round counterclockwise until the photo sensor 2510 is turned on. Further, the controller 270 sets the position of the switch 1850 at the time point at which the photo sensor 2510 is turned on as an initial position, and sets the step value of the step motor 1860 as 0.

Unlikely, if the photo sensor 2510 is turned on within one round when the step motor 1860 is rotated clockwise, the controller 270 rotates the step motor 1860 again clockwise within one round until the photo sensor 2510 is not turned on. If the photo sensor 2510 is turned on even in the second round, the controller 270 rotates the step motor within one round clockwise until the photo sensor 2510 is not turned on. This process is repeated until the photo sensor 2510 is not turned on. For the electronic valve shown in FIGS. 23 and 24, since the maximum movement distance of the switch 1850 in the electronic valve 260 is 18 mm, if the switch 1850 moves 4 mm when the step motor 1860 is rotated one round, the maximum number of revolutions of the step motor 1860 is 4.5 times. Accordingly, the step motor 1860 can be rotated maximally by four times within one round range clockwise. If the photo sensor 2510 is not turned on at each round, the controller 270 rotates the step motor 1860 within one round counterclockwise until the photo sensor 2510 is turned on. Further, the controller 270 sets the position of the switch 1850 at the time point at which the photo sensor 2510 is turned on as an initial position, and sets the step value of the step motor 1860 as 0. This procedure of setting an initial position of the switch 1850 may be performed when the photo sensor is not turned on at a time point at which the faucet control device according to the present invention stops being used.

In various embodiments described with reference to FIGS. 17 to 26, it is preferable that the faucet control device according to the present invention controls the electronic valve 260 having three inlet pipe and one outflow pipe, as shown in FIG. 18, to mix heated hot water supplied through the heating water tank 250 and cold water that is supplied from the cold water pipe 2 and to discharge discharge water at a temperature and a water amount desired by a user after a time point at which hot water that is supplied from the hot water pipe 1 is supplied at a maximum supply temperature (e.g., 60° C.). According this control, there is an advantage that the heating water tank 250 is fully filled with hot water at a maximum supply temperature (e.g., 60° C.) at a time point at which a use stops using water, and a power consumption amount can be reduced.

Further, in the various embodiments described with reference to FIGS. 17 to 26, the controller 270 determines the position of the switch 1850 by controlling the rotation direction and the rotation amount of the motor 1860 disposed in the electronic valve 260 on the basis of measurement values of the first temperature sensor to the third temperature sensor 220*a*, 220*b*, and 220*c*. In this case, it is preferable that the controller 270 determines the position of the switch 1850 through the following method.

The position of the switch 1850 is determined within a first movement range when the difference between the measurement value of the first temperature sensor 220*a* and the measurement value of the third temperature sensor 220*c* is a preset first reference error (e.g., ±1° C.) or less and the target temperature of discharge water is the measurement value of the first temperature sensor 220*a* or more; ii) The position of the switch 1850 is determined within third first movement range when the difference between the measurement value of the first temperature sensor 220*a* and the measurement value of the third temperature sensor 220*c* is the first reference error or less and the target temperature of discharge water is lower than the measurement value of the first temperature sensor 220*a*; iii) When the difference between the measurement value of the first temperature sensor 220*a* and the measurement value of the third temperature sensor 220*c* is larger the first reference error and the measurement value of the third temperature sensor 220*c* is higher than the measurement value of the first temperature sensor 220*a*, the position of the switch 1850 is determined within the first movement range when the target temperature of discharge water is the measurement value of the first temperature sensor 220*a* or more, the position of the switch 1850 is determined within a second movement range when the target temperature of discharge water is lower than the measurement value of the first temperature sensor 220*a*, and the position of the switch 1850 is determined within the third movement range from a time point at which the target temperature of discharge water becomes higher than the measurement value of the first temperature sensor 220*a*; and iv) The position of the switch 1850 is determined within the third movement range when the difference between the measurement value of the first temperature sensor 220*a* and the measurement value of the third temperature sensor 220*c* is larger than a preset first reference error and the measurement value of the third temperature sensor 220*c* is lower than the measurement value of the first temperature sensor 220*a*.

In this case, the first movement range of the switch 1850 is a movement range in which the open ratio of the first inlet pipe 1820 that receives and provides heated hot water, which is supplied from the heating water tank 250, to the electronic valve 260, and the second inlet pipe 1810 that receives and provides hot water, which is supplied from the direct hot water pipe 240, to the electronic valve 260 is determined between 1:0 to 0:1; the second movement range is a movement range in which the open ratio of the second inlet valve 1810 and the third inlet pipe 1830 that receives and provides cold water, which is supplied from the cold water pipe 2, to the electronic valve 260 is determined between 1:0 to 0:1; and the third movement range is a movement range in which the open ratio of the first inlet pipe 1820 and the third inlet pipe 1830 is determined between 1:0 to 0:1.

Unlikely, in the various embodiments described with reference to FIGS. 17 to 26, the controller 270 may determine the position of the switch 1850 by comparing the measurement value of the first temperature sensor 220*a* and the target temperature of discharge water and controlling the rotation direction and the rotation amount of the motor 1860 disposed in the electronic valve 260. In this case, when the measurement value of the first temperature sensor 220*a* is the target temperature of discharge water or more, the controller 270 determines the position of the switch 1850 within the third movement range. Further, when the measurement value of the first temperature sensor 220a is lower than the target temperature of discharge water, the controller 270 determines the position of the switch 1850 within the first movement range.

In various embodiments of the faucet control device according to the present disclosure, the capacity of the heating water tank 250 and the heating temperature of hot water in the heating water tank 250 are set such that the temperature of discharge water can maintain a preset minimum supply temperature (e.g., 40° C.) until hot water at a maximum supply temperature (e.g., 60° C.) reaches the faucet. Accordingly, heated hot water that is supplied to the electronic valve 260 from the heating water tank 250 is maintained higher than at least a preset minimum supply temperature at a time point at which hot water flows into the heating water rank 250 while the faucet is operated. At a time point at which hot water at the maximum supply temperature is supplied to the heating water tank 250, hot water at the maximum supply temperature is supplied also to the direct hot water pipe 240. Although the temperature of hot water in the heating water tank 250 is lower than the temperature of hot water in the direct hot water pipe 240, since hot water at the maximum supply temperature is supplied to the heating water tank 250, the temperature of hot water in the heating water tank gradually increases and reaches the maximum supply temperature of hot water. Accordingly, it is possible to determine the position of the switch 1850 of the electronic valve 260 using only the result of comparing the measurement value of the first temperature sensor 220 and the target temperature of discharge water.

In this case, in order to maintain a preset minimum supply temperature (e.g., 40° C.), the controller 270 calculates a heating temperature of hot water in the heating water tank 250 for supplying a minimum supply temperature set for discharge water to the faucet on the basis of the water amount of remaining hot water existing in the hot water pipe 1 connecting a hot water supply point and the faucet, the capacity of the heating water tank 250, and the measurement value of the first temperature sensor 220a; and determines whether to drive the heater disposed in the heating water tank 250 on the basis of the calculated heating temperature and the measurement value of the third temperature sensor 220c. Hereinafter, a method of controlling a heater using the controller 270 is described under the assumption that the water amount of remaining hot water is 4 ℓ, the temperature of remaining hot water is 22° C., the capacity of the heating water tank 250 is 2 ℓ, the minimum supply temperature set for discharge water is 40° C., and the supply amount of remaining hot water is 100 mℓ /s.

First, the embodiment shown in FIG. 17 can provide discharge water, in which heated hot water that is supplied from the heating water tank 250 and hot water that is supplied from the direct hot water pipe 240 are mixed, to the faucet. The volume ratio of remaining hot water that is distributed to the heating water tank 250 and the direct hot water pipe 240 is determined in accordance with the position of the switch 1850 of the electronic valve 260 in the first movement range. For example, when the switch 1850 of the electronic valve 260 is positioned at position at which the open ratio of the first inlet pipe 1820 and the second inlet pipe 1810 is 1; 0, the entire remaining hot water is supplied at 100 mℓ /s to the heating water tank 250. Unlikely, when the switch 1850 of the electronic valve 260 is positioned at position at which the open ratio of the first inlet pipe 1820 and the second inlet pipe 1810 is 1:1, remaining hot water is supplied at 50 mℓ /s to each of the heating water tank 250 and the direct hot water pipe 240.

Meanwhile, as remaining hot water is supplied to the heating water tank 250, the temperature of heated hot water in the heating water tank 250 decreases over time. In this case, the temperature of heated hot water in the heating water tank 250 can be calculated at every second from a time point at which remaining hot water starts to be supplied to the heating water tank 250 by the following equation.

$$T_t = Q_R T_R + (Q_T - Q_R) T_{t-1} / Q_T \quad \text{[Equation 23]}$$

wherein, $T_t$ is the temperature (° C.) of heated hot water in the heating water tank 250, $T_{t-1}$ is the temperature (° C.) of heated hot water in the heating water tank 250 at t−1 seconds, $T_R$ is the temperature (° C.) of remaining hot water, $Q_T$ is the capacity (mℓ) of the heating water tank 250, and $Q_R$ is the water amount (mℓ /s) of remaining hot water that is supplied to the heating water tank 250 at t seconds.

Assuming that remaining hot water supplied to the heating water tank 250 is uniformly mixed with heated hot water in the heating water tank 250, the temperature of heated hot water in the heating water tank 250 decreases with a constant inclination. That is, when the initial temperature of heated hot water in the heating water tank 250 is $T_0$, the target temperature of discharge water is $T_T$, the temperature of remaining hot water is $T_R$, and the supply water amount of hot water $Q_T$, the temperature of heated hot water in the heating water tank 250 is determined as follows.

$$T(t) = -Q_T (T_T - T_R) / 2000 t + T_0 \quad \text{[Equation 24]}$$

According to Equation 24, it can be seen that when the water supply amount of hot water, the initial temperature of heated hot water in the heating water tank 250, and the target temperature of discharge water are constant, the degree of a drop per second of the temperature of heated hot water in the heating water tank 250 depends on the temperature of remaining hot water. The degree of a drop per second of the temperature of heated hot water in the heating water tank 250 according to the temperature of remaining hot water when the water supply amount of hot water is 100 mℓ /sec, the initial temperature of heated hot water in the heating water tank 250 is 60° C., and the target temperature of discharge water is 40° C. is shown in the following table.

[Table 2]

| Temperature of remaining hot water (° C.) | 15 | 20 | 25 | 30 |
|---|---|---|---|---|
| Degree of temperature of heated hot water in heating water tank (° C./sec) | 1.25 | 1.0 | 0.75 | 0.5 |

Accordingly, under the condition that remaining hot water supplied to the heating water tank 250 is uniformly mixed with heated hot water in the heating water tank 250, when the supply water amount of hot water is 100 mℓ /sec, the initial temperature of heated hot water in the heating water tank 250 is 60° C., the target temperature of discharge water is 40° C., and the temperature of remaining hot water is 20° C., the temperature of the heated hot water in the heating water tank 250 drops 1° C. per second. As a result, the temperature of the heated hot water in the heating water tank 250 becomes 40° C. that is the same as target temperature of discharge water at a time point at which 20 seconds elapses from the time point at which the faucet is used. However, hot water that is supplied from the hot water pipe 1 is input to the lower end of the left side of the heating water tank 250 that is applied to the faucet control device according to the present disclosure, and heated hot water in the heating water tank 250 is output to the upper end of the right side. Accordingly, remaining hot water supplied to the heating water tank 250 is not uniformly mixed with heated hot water in the heating water tank 250 and is slowly mixed with heated hot water from the left lower end of the heating water tank 250. As a result, when the temperature of heated hot water that is output from the heating water tank 250 is not substantially changed until a time point at which about 10 seconds elapses from the time point at which the faucet is used, the temperature drops to a predetermined value after the time point at which about 10 seconds elapses from the time point at which the faucet is used. The following table shows a required time and the temperature of heated hot water in the heating water tank 250 until remaining hot water is completely discharged according to the supply water amount of remaining hot water from a time point at which the faucet is used to a time point at which remaining hot water in the hot water pipe 1 is completely used when the capacity of the heating water tank 250 that is applied to the faucet control device according to the present invention is 2 $\ell$, the water amount of remaining hot water in the hot water pipe 1 is 4 $\ell$, the initial temperature of heated hot water in the heating water tank 250 is 60° C., the temperature of remaining hot water is 20° C., and the target temperature of discharge water is 40° C.

[Table 3]
  a. Supply water amount of 80 100 120
     remaining hot water (me/s)
  b. Time required to discharge 50 40 33.3
     remaining hot water (sec)
  c. Temperature of heated hot
     water in heating water tank at time 39.0 41.0 42.2
     point at which remaining hot water
       is completely discharged (° C.)

Meanwhile, the higher the initial value of heated hot water in the heating water tank 250, the higher the heated hot water in the heating water tank 250 is maintained at a time point at which remaining hot water in the hot water pipe 1 is completely discharged from a time point at which the faucet is used. For example, when the capacity of the heating water tank 250 is 2 $\ell$, the water amount of remaining hot water in the hot water pipe 1 is 4 $\ell$, the initial temperature of heated hot water in the heating water tank 250 is 70° C., the temperature of remaining hot water is 20° C., and the target temperature of discharge water is 40° C., the temperature of heated hot water in the heating water tank 250 becomes 51.0° C. at a time point at which the remaining hot water in the hot water pipe 1 is completely used after the time point at which the faucet is used. Accordingly, it is preferable to appropriately set the initial temperature of heated hot water in the heating water tank 250 in accordance with the capacity of the heating water tank 250, the water amount of remaining hot water in the hot water pipe 1, the temperature of remaining hot water, and the target temperature of discharge water. That is, when the heated hot water in the heating water tank 250 is set high, there is an advantage that it is possible to secure the target temperature of discharge water until remaining hot water in the hot water pipe 1 is completely discharged, but there is a problem that power consumption by the heater in the heating water tank 250 increases. Accordingly, the temperature reduction value per second of the heated hot water in the heating water tank 250 is calculated on the basis of the difference between the target temperature of discharge water and the temperature of remaining hot water; and the initial temperature of heated hot water in the heating water tank 250 is determined by driving the heater on the basis of the capacity of the heating water tank 250, the water amount of remaining hot water in the hot water pipe 1, the temperature of remaining hot water, the supply water amount of remaining hot water, and the target temperature of discharge water.

To this end, it is preferable that the controller 270 measures and stores the water amount of remaining hot water in the hot water pipe 1, which is connected from a supply position of hot water to a faucet in an environment in which the faucet control device according to the present invention is installed, and the temperature of remaining hot water in a memory thereof. In this case, the water amount of remaining hot water in the hot water pipe 1, which is connected from a supply position of hot water to a faucet is calculated on the basis of a required time and a supply water amount of hot water until hot water at a maximum supply temperature is supplied from a time point at which the faucet starts to be used. For example, when the required time is 40 seconds and the water supply amount of hot water is 100 $m\ell$/s until hot water at a maximum supply temperature is supplied from a time point at which the faucet starts to be used, the water amount of remaining hot water in the hot water pipe 1 is 4 $\ell$. Further, since the temperature of remaining hot water depends on seasons, it is preferable that the controller 270 measures and stores the temperature of remaining hot water in the memory at an interval of one week or one month. Accordingly, the controller 270 can optimally set the initial heating temperature of hot water in the heating water tank 250 by controlling whether to drive the heater in accordance with the temperature of remaining hot water in an environment in which the faucet control device according to the present invention is installed.

As described above, when a temperature of discharge water desired by a user is set after hot water in the heating water tank 250 is controlled to reach an initial heating temperature by the controller 270, the controller 270 calculates a target temperature corresponding to the desired temperature set by the user. In this case, the target temperature of discharge water may be set to be the same as the desired temperature set by a user or may be set to be lower by a predetermined temperature (e.g., 2° C.) than the desired temperature set by a user. Next, when hot water at a maximum supply temperature (e.g., 60° C.) is supplied from the hot water pipe 1 before the temperature of hot water that is supplied to the faucet reaches a minimum supply temperature (e.g., 40° C.) set for discharge water or a target temperature (e.g., 40° C.) of discharge water, the direct hot water pipe 240 is filled with hot water at the maximum supply temperature. Unlikely, the heating water tank 250 is filled with hot water at a temperature (e.g., 42° C.) immediately before hot water at a maximum supply temperature (e.g., 60° C.) is supplied from the hot water pipe 1. Further, as hot water at the maximum supply temperature is continuously supplied from the hot water pipe 1, the heating water tank 250 is also filled with hot water at the maximum supply temperature when a predetermined time elapse. Accordingly, the controller 270 mixes and provides hot water that is input from the heating water tank 250 and cold water that is input from the cold water pipe 1 to the faucet by controlling the electronic valve 260 from a time point at which hot water at the maximum supply temperature is supplied from the hot water pipe 1. The heating water tank 250 is filled with hot water at the maximum supply temperature at a time point at which the faucet finished being used by this control operation, so driving of the heater can be minimized.

Figure 27:
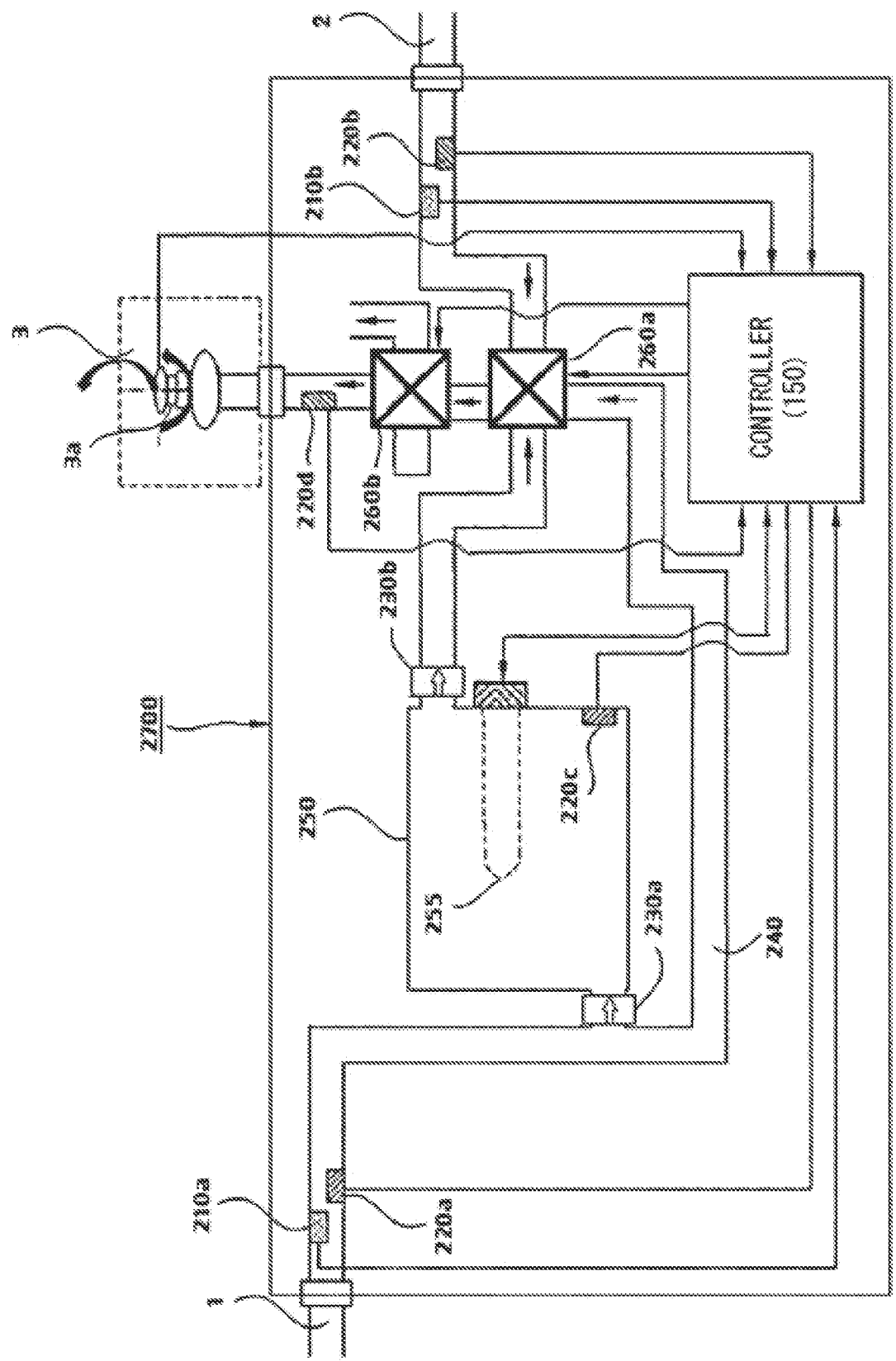
FIG. 27 is a view showing an embodiment of providing discharge water to a faucet by a target water amount by adjusting the discharge amount of the discharge water using a specific electronic valve installed between the electronic valve shown in FIG. 17 and the faucet.

Meanwhile, it may be possible to use an electronic valve equipped with a cartridge shown in FIG. 27 instead of using the electronic valve 260 described with reference to FIG. 18. Referring to FIG. 27, a cartridge includes a first inlet pipe 2710, a second inlet pipe 2720, a third inlet pipe 2730, a discharge pipe 2740, and a rotary knob 2750. The rotary knob 2750 is coupled to the rotary shaft of the step motor described with reference to FIG. 18, and rotate in correspondence to rotation of the step motor. For example, if the rotary knob 2750 is rotated clockwise from 0° to 360° when the step motor is rotated clockwise from 0 step to 3600 steps, the rotary knob 2750 rotates one round every time the step motor rotates by 3600 steps. The operation of an electronic valve according to rotation of a step motor is described under the assumption that the heating water tank 250, the direct hot water pipe 240, and the cold water pipe 2 are connected to the first inlet pipe 2710, the second inlet pipe 2720, and the third inlet pipe 2730 of the cartridge shown in FIG. 27, respectively, in the embodiment shown in FIG. 17. Only heated hot water flowing in the first inlet pipe 2710 is completely discharged to the discharge pipe 2740 when the number of steps of the step motor is 0, only remaining hot water flowing in the second inlet pipe 2720 is completely discharged to the discharge pipe 2740 when the number of steps of the step motor is 1200, and only cold water is completely discharged to the discharge pipe 2740 when the number of steps of the step motor is 2400. Accordingly, when the number of steps of the step motor is changed between 0 and 1200, heated hot water and remaining hot water are mixed at a volume ratio of 1:0 to 0:1, and when the number of steps of the step motor is changed between 1200 and 2400, remaining hot water and cold water are mixed at a volume ratio of 1:0 to 0:1, and when the number of steps of the step motor is changed between 2400 and 3600, cold water and heated hot water are mixed at a volume ratio of 1:0 to 0:1. According to this method, it is possible to achieve the same effect as the electronic valve shown in FIG. 18 using an electronic valve equipped with the cartridge shown in FIG. 27 by selecting two inlet pipes of the first inlet pipe 2710 in which heated hot water flows, the second inlet pipe 270 in which remaining hot water flows, and the third inlet pipe 2730 in which cold water flows and then by adjusting the open ratio of the two selected inlet pipes.

Meanwhile, in the embodiment shown in FIG. 17, the temperature/water amount setter 3a may be implemented in another type. First, the temperature/water amount setter 3a may be configured as the faucet/rotation sensor (e.g., a rotary sensor or an encoder) described with reference to FIGS. 1 and 2. In this case, the target temperature of discharge water is determined by the horizontal rotation amount of a vertical knob and the target water amount of discharge water is determined by the vertical rotation amount of the vertical knob. Next, the temperature/water amount setter 3a, as described above, can receive information corresponding to the vertical and horizontal rotation amounts of the faucet knob instead of the faucet knob from a user through a specific input device. Further, it may be possible to receive a temperature and a water amount of discharge water desired by a user from the user instead of information corresponding to vertical and horizontal rotation amounts of a faucet knob. In this case, the specific input device may be a smartphone, a control panel having an input device and an output device, etc. When a smartphone is used as the input device, it is preferable to install an application for controlling the faucet control device 100 according to the present invention in the smartphone. A cold water temperature, a hot water temperature, a cold water amount, a hot water amount, a discharge water temperature, a discharge water amount, etc. are selectively displayed on the output device of the control panel, depending on selection by a user or a setting state. Further, the input device of the control panel may be a touch screen, a voice recognition device, a button input device, etc. In this case, the faucet control device 100 according to the present invention may include a communication unit for transmitting/receiving data to/from the input device and the output device, and a device that can performed wired or wireless communication, including a Bluetooth module, a WiFi module, etc. may be employed as the communication unit. Further, the temperature/water amount setter 3a may be configured as the faucet/rotation sensor (e.g., a rotary sensor or an encoder) described with reference to FIG. 9. In this case, the target temperature of discharge water is determined by the horizontal rotation amount of the faucet knob and the target water amount of discharge water is physically determined by a cartridge operating in response to the vertical rotation amount of the vertical knob. In this case, the controller 270 finds out the water amount of discharge water on the basis of a value measured by any one or both of the first flow rate sensor 210a and the second flow rate sensor 210b. Unlikely, the water amount of discharge water may also be determined on the basis of the rotation amount of a rotation sensor (e.g., a rotary sensor or an encoder) installed separately from the faucet knob.

Meanwhile, discharging of discharge water to the faucet may be electronically controlled in the embodiment described with reference to FIGS. 17 to 27. For example, it is possible to provide discharge water to the faucet by a target water amount by controlling the discharge amount of discharge water using a specific electronic valve (not shown) installed between the electronic valve 260 shown in FIG. 17 and the faucet 3. FIG. 27 is a view showing an embodiment of providing discharge water to a faucet by a target water amount by adjusting the discharge amount of discharge water using a specific electronic valve installed between the electronic valve 260 shown in FIG. 17 and the faucet 3. The faucet control device 2700 according to another embodiment of the present invention shown in FIG. 27 is different in the number of electronic valves and the corresponding control operation and is substantially the same in the operation of other components, as compared with the configuration of the embodiment described with reference to FIG. 17. Accordingly, the control operations according to variation of the number of electronic valves are described hereinafter.

Referring to FIG. 27, as compared with the embodiment shown in FIG. 17, a second electronic valve 260b is added between the faucet 3 and a first electronic valve 260a corresponding to the electronic valve 260 of FIG. 17. The first electronic valve 260a is operated in the same way as the electronic valve 260 shown in FIG. 17, and the second electronic valve 260b receives and outputs discharge water from an output pipe of the first electronic valve 260a, and adjusts the discharge amount of mixed hot water input from the output pipe of the first electronic valve 260a and then outputs the mixed hot water to the faucet 3 or a showerhead (not shown) in response to a control signal of the controller 270. In the embodiment 2700 shown in FIG. 27, the temperature/water amount setter 3a may be implemented in various types, as described above, and the second direction control valve 230b installed at an outflow end of the heating water tank 250 may be removed.

Figure 28:
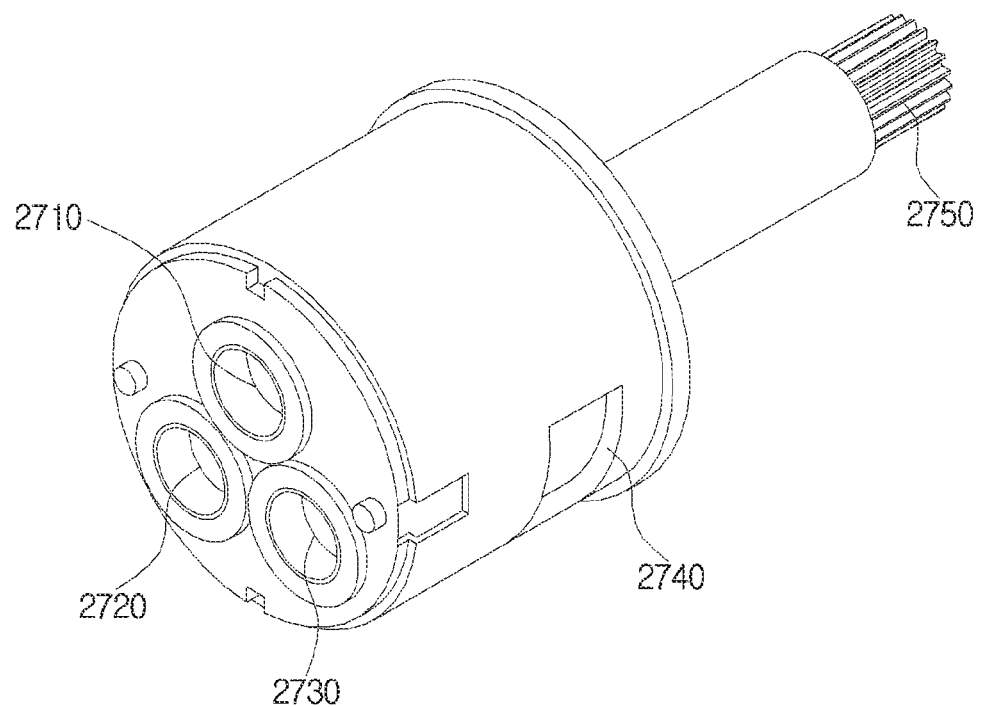
FIG. 28 is a view showing an example of a cartridge that is employed in an electronic valve.
Figure 29:
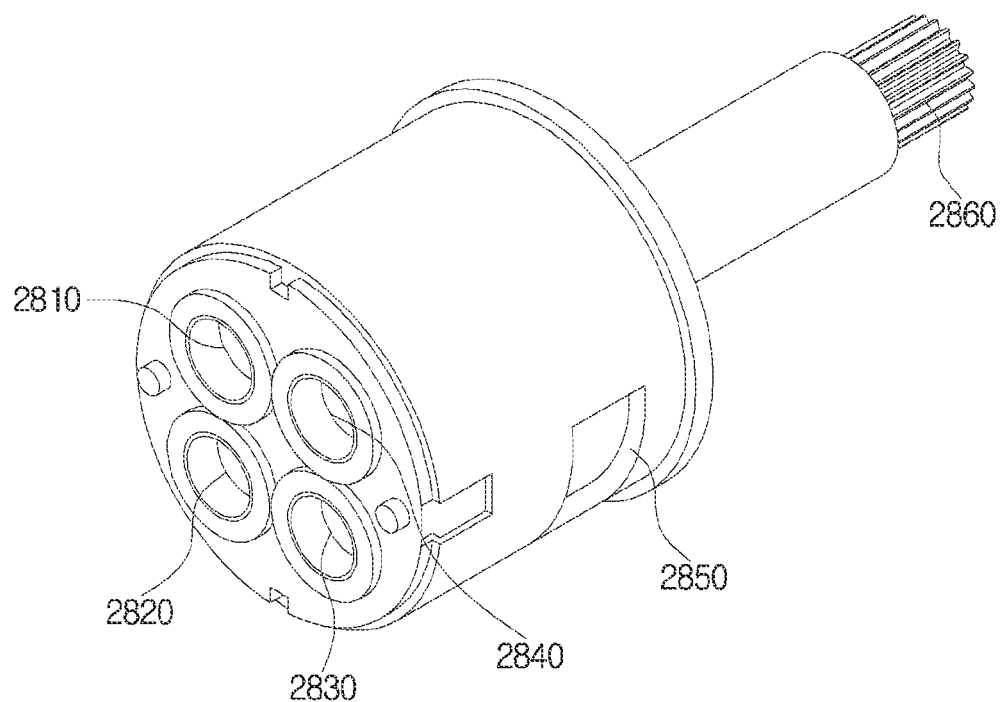
FIG. 29 is a view showing another example of a cartridge that is employed in an electronic valve.

In this case, an electronic valve equipped with a cartridge that adjusts the discharge amount of input water may be used as the second electronic valve 260b. In this case, the controller 270 adjusts the opening/closing amount of the cartridge by controlling the step motor provided at the second electronic valve 260b in correspondence to the target water amount of discharge water such that the water amount of discharge water that is discharged to the faucet or the showerhead becomes the target water amount. Unlikely, the second electronic valve 260b installed between the first electronic valve 260a shown in FIG. 27 and the faucet 3 may be equipped with the cartridge shown in FIG. 28 or 29. If the electronic valve shown in FIG. 28 is employed, the outflow pipe of the first electronic valve 260a shown in FIG. 27 may be connected to a discharge pipe 2740, the faucet 3 may be connected to the first inlet pipe 2710, and a movable showerhead may be connected to the second inlet pipe 2720. In this case, the third inlet pipe 2730 is blocked. Accordingly, when the second electronic valve 260b equipped with the cartridge shown in FIG. 28 is used, discharge water is discharged to the faucet 3 by the controller 270 when the number of steps of the step motor of the second electronic valve 260b is 0, discharge water is discharged to the movable showerhead when the number of steps of the step motor of the second electronic valve 260b is 1200, and discharge water is not discharged to any side when the number of steps is 2400. Unlikely, when the electronic valve shown in FIG. 29 is employed, the water output pipe of the first electronic valve 260a shown in FIG. 27 may be connected to a discharge pipe 2850, the faucet 3 may be connected to the first inlet pipe 2810, and a movable showerhead may be connected to the second inlet pipe 2820, and a fixed showerhead may be connected to the third inlet pipe 2830. In this case, the fourth inlet pipe 2840 is blocked. Accordingly, when the second electronic valve 260b equipped with the cartridge shown in FIG. 29 is used, by the controller 270, discharge water is discharged to the faucet 3 when the number of steps of the step motor of the second electronic valve 260b is 0, discharge water is discharged to the movable showerhead when the number of steps of the step motor of the second electronic valve 260b is 900, discharge water is discharged to the fixed showerhead when the number of steps of the step motor of the second electronic valve 260b is 1800, and discharge water is not discharged to any side when the number of steps of the step motor of the second electronic valve 260b is 2700.

In the above description, when an electronic valve equipped with the cartridge shown in FIGS. 28 and 29 is used as the second electronic valve 260b of the embodiment shown in FIG. 27, the discharge pipe of each cartridge functions as the inflow pipe of the second electronic valve 260b and the water inflow pipe of each cartridge functions as the outflow pipe of the second electronic valve 260b.

Figure 30:
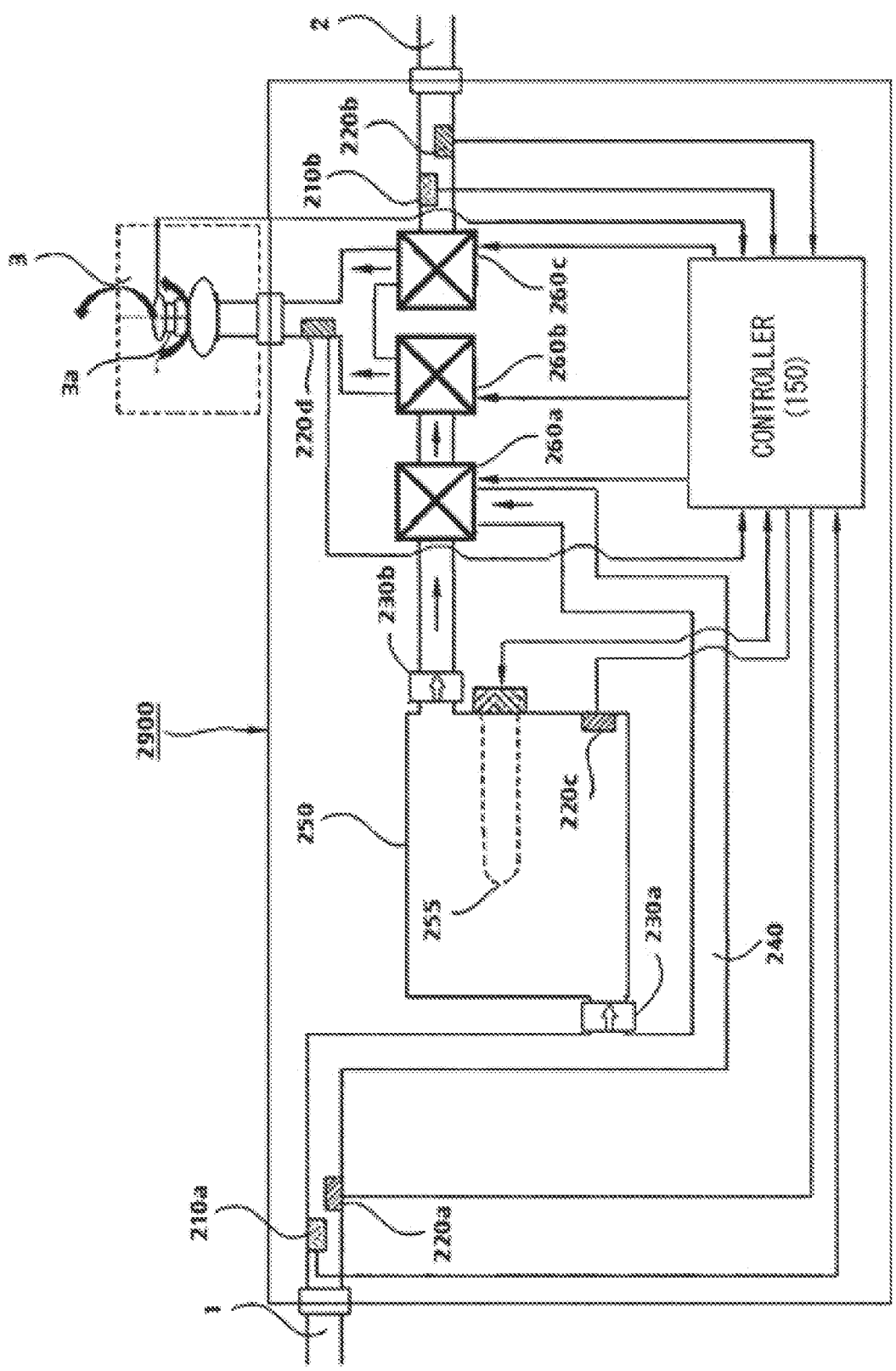
FIG. 30 is a view showing the configuration of a faucet control device according to another embodiment of the present disclosure.

FIG. 30 is a view showing the configuration of a faucet control device according to another embodiment of the present disclosure.

Referring to FIG. 30, the faucet control device 2900 according to another embodiment of the present invention is different in the number of electronic valves and the corresponding control operation and is substantially the same in the operation of other components, as compared with the configuration of the embodiment described with reference to FIG. 17. Accordingly, the control operations according to variation of the number of electronic valves are described hereafter.

Referring to FIG. 30, as compared with the embodiment shown in FIG. 17, the electronic valve 260 of FIG. 17 is divided into a first electronic valve 260a, a second electronic valve 260b, and a third electronic valve 260c in the embodiment 2900 shown in FIG. 30. The first electronic valve 260a has a first input pipe for receiving heated hot water from the heating water tank 250 and a second input pipe for receiving remaining hot water from the direct hot water pipe 240, and mixes and outputs heated hot water and remaining hot water at a volume ratio of 1:0 to 0:1 in response to a control signal of the controller 270. The second electronic valve 260b receives and outputs mixed hot water from the output pipe of the first electronic valve 260a, and adjusts the discharge amount of mixed hot water input from the output pipe of the first electronic valve 260a and then discharges the mixed hot water to the faucet in response to a control signal of the controller 270. The third electronic valve 260c receives and outputs cold water from the cold water pipe 2, and adjusts the discharge amount of cold water input from the cold water pipe 2 and then adjusts the cold water in response to a control signal of the controller 270. In the embodiment 2900 shown in FIG. 30, the temperature/water amount setter 3a may be implemented in various types, as described above, and a fifth temperature sensor may be installed between the first electronic valve 260a and the second electronic valve 260b. Further, the second direction control valve 230b installed at the outflow end of the heating water tank 250 may be removed.

In the embodiment 2900 shown in FIG. 30, the control operation of the controller 270 is as follows when the temperature of remaining hot water measured by the first temperature sensor 220a is 20° C., the temperature of cold water measured by the second temperature sensor 220b is 18° C., the temperature of heated hot water in the heating water tank 250 measured by the third temperature sensor 220c is 60° C., the target temperature of discharge water corresponding to a desired temperature set by a user is 40° C., the water amount of hot water that is supplied from the hot water pipe 2 is 1001 ml/s, the water amount of cold water that is supplied through the cold water pipe 2 is 120 ml/s, the water amount of remaining hot water existing in the hot water pipe 1 between a hot water supply position from the faucet is 4 ℓ, and the capacity of the heating water tank 250 is 4 ℓ. In this case, it is assumed that the temperature variation in the heating water tank 250 that is measured by the third temperature sensor 220c when remaining hot water is supplied to the heating water tank 250 drops 0.1° C. per second for 10 seconds from a time point at which the faucet is used, and then drops 0.8° C. per second for 10 seconds, and then drops 0.5° C. per second. The temperature drop degree in the heating water tank 250 may depend on the shape inside the heating water tank 250, the input position of hot water that is supplied from the hot water pipe 1, the output position of hot water that is output from the heating water tank 250, the installation position of the third temperature sensor 220c, etc., and the temperature variation in the heating water tank 250 that is measured by the third temperature sensor 220c when remaining hot water is supplied to the heating water tank 250 may be experimentally determined. Under this condition, remaining hot water existing in the hot water pipe 1 between the hot water supply position and the faucet is completely used at a time point at which 40 second elapses from a time point at which the faucet is used, and hot water at a maximum supply temperature (e.g., 50° C.) is supplied to the faucet from the hot water pipe 1 from the time point at which remaining hot water is completely used. In this case, the temperature of heated hot water in the heating water tank 250 that is measured by the third temperature sensor 220c installed in the heating water tank 250 is about 40° C.

First, until the temperature of hot water, which is supplied from the hot water pipe 1, measured by the first temperature sensor 220a becomes a maximum supply temperature (e.g., 50° C.), the controller 270 controls the open ratio of the first electronic valve 260a such that the temperature of mixed hot water that is supplied from the first electronic valve 260a becomes 40° C. that is the target temperature of discharge water. Further, until the temperature of hot water, which is supplied from the hot water pipe 1, measured by the first temperature sensor 220a becomes the maximum supply temperature (e.g., 50° C.), the controller 270 closes the third electronic valve 260c such that mixed hot water that is supplied from the first electronic valve 260a is completely discharged to the faucet 3 and cold water is not discharged. Further, the controller 270 controls the second electronic valve 260b such that the water amount of mixed hot water that is supplied to the faucet from the second electronic valve 260b becomes the target water amount of discharge water.

Next, when the temperature of hot water, which is supplied from the hot water pipe 1, measured by the first temperature sensor 220a reaches the maximum supply temperature (e.g., 50° C.), the controller 270 controls the first electronic valve 260a such that hot water that is input from the heating water tank 250 is completely discharged. The heating water tank 250 is filled with hot water at the maximum supply temperature (e.g., 50° C.) by this control operation at a time point at which use of the faucet is ended, so driving of the heater 255 installed in the heating water tank 250 can be minimized. Further, the controller 270 controls the second electronic valve 260b and the third electronic valve 260c in correspondence to the target temperature and the target water amount of discharge water. It is assumed in the following description that heated hot water at 44° C. is input at a water amount of 100 m$\ell$/s to the second electronic valve 260b and cold water at 18° C. is input at a water amount of 120 m$\ell$/s to the third electronic valve 260c. If target temperature and the target water amount of discharge water is 40° C. and 60 m$\ell$/s, respectively, mixed hot water is supplied at 50.8 m$\ell$/s to the faucet 3 from the second electronic valve 260b and cold water is supplied at 9.2 m$\ell$/s to the faucet 3 from the third electronic valve 260c. Unlikely, if target temperature and the target water amount of discharge water is 40° C. and 100 m$\ell$/s, respectively, mixed hot water is supplied at 84.6 m$\ell$/s to the faucet 3 from the second electronic valve 260b and cold water is supplied at 15.4 m$\ell$/s to the faucet 3 from the third electronic valve 260c. Meanwhile, when mixed hot water is supplied at 100 m$\ell$/s, which is the maximum supply amount of mixed hot water, from the second electronic valve 260b to the faucet 3, cold water has only to be supplied at 18. m$\ell$/s to the faucet 3 from the third electronic valve 260c in order to supply hot water at 40° C., which is the target temperature of discharge water, to the faucet 3. Accordingly, under a corresponding condition, the maximum supply amount of discharge water that is supplied to the faucet 3 is 118.2 m$\ell$/s.

As described above, the embodiment described with reference to FIG. 30 has an advantage that it is possible to increase the supply amount of discharge water that is discharged through the faucet, as compared with the embodiment described with reference to FIG. 27. Meanwhile, in the embodiment described with reference to FIG. 30, a diverter that divides discharge water to the faucet 3, a showerhead (not shown), and a bathtub (not shown) may be installed between the faucet 3 and the point at which mixed hot water that is supplied from the second electronic valve 260b and cold water that is supplied form the third electronic valve 260c are mixed. In this case, when a diverter of which the initial position is set as a bathtub is used, it is possible to achieve a function that can fill a bathtub with hot water a time desired by a user through remote control. Of course, an electronic valve equipped with the cartridge shown in FIG. 28 may be installed between the faucet 3 and the point at which mixed hot water that is supplied from the second electronic valve 260b and cold water that is supplied form the third electronic valve 260c are mixed. In this case, by the controller 270, discharge water is discharged to the faucet when the number of steps of the step motor of a corresponding electronic valve is 0, discharge water is discharged to a movable showerhead when the number of steps of the step motor of a corresponding electronic valve is 900, discharge water is discharged to a fixed showerhead when the number of steps of the step motor of a corresponding electronic valve is 1800, and discharge water is not discharged to any side when the number of steps of the step motor of a corresponding electronic valve is 2700.

Meanwhile, the components applied to the various embodiments described with reference to FIGS. 1 to 16 and the control method of the embodiments may be applied to the embodiments described with reference to FIGS. 17 to 30. For example, the configuration of differently setting the target temperature of discharge water for each season or each user in the embodiment described with reference to FIG. 1 may be applied to the embodiments described with reference to FIGS. 17 to 30.

Although the present invention was described above with reference to exemplary embodiments, it should be understood that the present invention may be changed and modified in various ways by those skilled in the art, without departing from the spirit and scope of the present invention described in claims.

The invention claimed is:

1. A faucet control device comprising:
   an input unit receiving a desired water amount and a desired temperature of discharge water set from a user;
   a first water amount sensor and a second water amount sensor measuring water amounts of hot water and cold water that are supplied from a hot water pipe and cold water pipe, respectively;
   a first temperature sensor and a second temperature sensor measuring temperatures of hot water and cold water that are supplied from a hot water pipe and cold water pipe;
   a heating water tank including a heater therein, heating and storing hot water that is supplied from the hot water pipe, and supplying heated hot water to a faucet when the faucet is used by a user;
   a third temperature sensor measuring temperature of water in the heating water tank;
   a direct hot water pipe supplying hot water, which is supplied from the hot water pipe, to the faucet;
   a distributor distributing hot water, which is supplied from the hot water pipe, to the heating water tank and the direct hot water pipe in accordance with a preset ratio;
   an electronic valve supplying discharge water at a desired water amount of a desired temperature input from a user to the faucet through a discharge pipe by mixing heated hot water that is supplied from the heating water tank, hot water that is supplied from the direct hot water pipe, and cold water that is supplied from the cold water pipe;
   a fourth temperature sensor measuring temperature of discharge water that is supplied through a discharge pipe of the electronic valve; and
   a controller controlling whether to drive a heater disposed in the heating water tank on the basis of temperature of water in the water tank, and controlling the degree of opening of the electronic valve such that a water amount and a temperature of the discharge water become a target water amount and a target temperature that are set in correspondence to a desired water amount and a desired temperature of discharge water set by a user.

2. The faucet control device of claim 1, wherein the controller: calculates a heating temperature of hot water in the heating water tank that is supplied to a faucet on the basis of a water amount of remaining hot water existing in the hot water pipe connecting a hot water supply position and the faucet, a capacity of the heating water tank, a measurement value of the first temperature sensor, a measurement value of the third temperature sensor, a supply amount of the remaining hot water, and a minimum supply temperature set for discharge water; and determines whether to drive a heater provided in the heating water tank on the basis of the calculated heating temperature and the measurement value of the third temperature sensor.

3. The faucet control device of claim 1, further comprising a second electronic valve installed between the faucet and the electronic valve and providing discharge water input from the electronic valve to the faucet,
wherein the controller controls the second electronic valve such that a water amount of discharge water input from a discharge pipe of the electronic valve corresponds to a target water amount of the discharge water.

4. The faucet control device of claim 1, wherein the electronic valve includes:
a first inlet pipe receives mixed hot water in which heated hot water that is supplied from the heating water tank and hot water that is supplied from the direct hot water pipe are mixed at a preset volume ratio;
a second inlet pipe receiving cold water that is supplied from the cold water pipe;
a discharge pipe for outputting the discharge water to the faucet;
a switch determines a mixing ratio of heated hot water that is input from the first inlet pipe and cold water that is input from the second inlet pipe and provides water to the discharge pipe;
a motor being controlled to rotate by the controller; and
an actuating module mechanically connecting the motor and the switch and determining a mixing ratio of heated hot water and cold water by the switch in correspondence to a rotation motion of the motor.

5. The faucet control device of claim 4, wherein the controller: calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives the heater disposed in the heating water tank when determining that a measurement value measured by the fourth temperature sensor cannot be maintained at a target temperature of discharge water or more until the remaining hot water is completely used on the basis of a water amount of the remaining hot water.

6. The faucet control device of claim 4, wherein a heater is disposed at the direct hot water pipe, and
the controller: calculates a water amount of remaining hot water in a hot water pipeline from a supply position of hot water to a faucet on the basis of a hot water supply amount measured by the first water amount sensor, a cold water supply amount measured by the second water amount sensor, measurement values measured by the first to third temperature sensors, and a target temperature and a target water amount of the discharge water; and drives at least one of the heater disposed in the heating water tank and the heater disposed in the direct hot water pipe when determining that a measurement value measured by the fourth temperature sensor cannot be maintained at a target temperature of discharge water or more until the remaining hot water is completely used on the basis of a water amount of the remaining hot water.

7. The faucet control device of claim 4, wherein the controller changes a mixing ratio of the heated hot water and the cold water by controlling the electronic valve when a difference between a measurement value of the fourth temperature sensor and a target temperature of the discharge water is a preset second reference error or more such that the difference between a measurement value of the fourth temperature sensor and a target temperature of the discharge water becomes the preset second reference error or less.

8. The faucet control device of claim 4, wherein a blocking device for blocking heat is disposed between the distributor and the heating water tank.

9. The faucet control device of claim 4, wherein the controller removes pressure in the heating water tank by connecting the first inlet pipe and the second inlet pipe every time a measurement value measured by the third temperature sensor increases by a preset reference temperature.

10. The faucet control device of claim 4, wherein the controller: calculates a heating temperature of hot water in the heating water tank that is supplied to a faucet on the basis of a water amount of remaining hot water existing in the hot water pipe connecting a hot water supply position and the faucet, a capacity of the heating water tank, a measurement value of the first temperature sensor, a measurement value of the second temperature sensor, a measurement value of the third temperature sensor, a supply amount of the remaining hot water, and a minimum supply temperature set for discharge water; and determines whether to drive a heater provided in the heating water tank on the basis of the calculated heating temperature and the measurement value of the third temperature sensor.

* * * * *